United States Patent
Guo

(10) Patent No.: US 12,199,870 B2
(45) Date of Patent: Jan. 14, 2025

(54) CONGESTION PROCESSING METHOD, APPARATUS, NETWORK DEVICE AND STORAGE MEDIUM

(71) Applicant: New H3C Technologies Co., Ltd., Hangzhou (CN)

(72) Inventor: Daorong Guo, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 0 days.

(21) Appl. No.: 18/003,942

(22) PCT Filed: Jun. 29, 2021

(86) PCT No.: PCT/CN2021/103303
§ 371 (c)(1),
(2) Date: Dec. 30, 2022

(87) PCT Pub. No.: WO2023/272532
PCT Pub. Date: Jan. 5, 2023

(65) Prior Publication Data
US 2024/0098023 A1    Mar. 21, 2024

(51) Int. Cl.
*H04L 47/11* (2022.01)
*H04L 47/127* (2022.01)
(Continued)

(52) U.S. Cl.
CPC .......... *H04L 47/115* (2013.01); *H04L 47/127* (2013.01); *H04L 47/2483* (2013.01)

(58) Field of Classification Search
CPC . H04L 47/115; H04L 47/127; H04L 47/2483; H04L 47/2441
See application file for complete search history.

(56) References Cited

U.S. PATENT DOCUMENTS

2014/0233421 A1* 8/2014 Matthews ............... H04L 49/35
370/253
2015/0271081 A1* 9/2015 Arumilli ................ H04L 47/32
370/235
(Continued)

FOREIGN PATENT DOCUMENTS

| CN | 108881056 | 11/2018 |
| CN | 110784415 | 2/2020 |

(Continued)

OTHER PUBLICATIONS

Extended European Search Report issued in corresponding European Application No. 21946274.4, dated Sep. 27, 2023.
(Continued)

*Primary Examiner* — Alina A Boutah
(74) *Attorney, Agent, or Firm* — NORTON ROSE FULBRIGHT US LLP

(57) ABSTRACT

The invention relates to a congestion processing method, apparatus, network device and storage medium. The method comprises: receiving a first data packet carrying a congestion mark through a target port; searching, in a preset greedy flow table, a target table entry that includes target flow information carried in the first data packet and an identifier of the target port, and the preset greedy flow table stores flow information of a data flow whose traffic is greater than a preset traffic threshold and an identifier of a port that receives the data flow corresponding to the flow information; processing, if the target table entry is found, the first data packet; removing, if the target table entry is not found, the congestion mark carried in the first data packet to obtain a second data packet, and processing the second data packet.

17 Claims, 17 Drawing Sheets

(51) Int. Cl.
  *H04L 47/2441* (2022.01)
  *H04L 47/2483* (2022.01)

(56) References Cited

U.S. PATENT DOCUMENTS

| | | | | |
|---|---|---|---|---|
| 2015/0281106 | A1* | 10/2015 | Lee | H04L 45/38 |
| | | | | 370/236 |
| 2016/0323194 | A1* | 11/2016 | Lee | H04L 45/38 |
| 2017/0339062 | A1 | 11/2017 | Mayer-Wolf et al. | |
| 2019/0253362 | A1* | 8/2019 | Ruthstein | H04L 43/026 |
| 2019/0280982 | A1 | 9/2019 | Shiraki | |
| 2020/0084155 | A1 | 3/2020 | Song et al. | |
| 2021/0377188 | A1* | 12/2021 | Ghag | H04L 49/90 |
| 2022/0014473 | A1* | 1/2022 | Matthews | H04L 47/2441 |

FOREIGN PATENT DOCUMENTS

| | | | | |
|---|---|---|---|---|
| CN | 110808854 | | 2/2020 | |
| CN | 111865812 | | 10/2020 | |
| CN | 112737964 | | 4/2021 | |
| EP | 2432169 | A1 * | 3/2012 | ......... H04L 12/5695 |
| EP | 3618372 | | 3/2020 | |
| JP | 2015186149 | B1 | 10/2015 | |
| WO | WO-2020236297 | A1 * | 11/2020 | ......... G06F 12/0862 |

OTHER PUBLICATIONS

Liu et al. "Regional congestion mitigation in lossless data center networks", *18th International Conference*, pp. 62-74, 2017.
Office Action issued in corresponding Japanese Application No. 2022-577571, dated Feb. 6, 2024.

* cited by examiner

CONGESTION PROCESSING METHOD, APPARATUS, NETWORK DEVICE AND STORAGE MEDIUM

CROSS-REFERENCE TO RELATED APPLICATIONS

The present application is a national phase under 35 U.S.C. § 371 of International Application No. PCT/CN2021/103303, filed Jun. 29, 2021, which is incorporated herein by reference in its entirety.

TECHNICAL FIELD

The present disclosure relates to the technical field of lossless transmission, and in particular, to a congestion processing method, apparatus, network device and storage medium.

BACKGROUND

In order to alleviate the congestion of network device and improve the quality of lossless Ethernet forwarding services, the currently commonly used data packet transmission methods include: setting PFC thresholds for lossless transmission and ENC (Explicit Congestion Notification) thresholds for congestion control for 8 queues on each port of the network device; for one queue, when data amount of data packets buffered by the queue reaches a preset ECN threshold, mark each data packet buffered in the queue with an ECN mark, to obtain ECN data packets and send the ECN data packets to a destination server; after receiving the ECN data packets, the destination server feeds back a congestion notification packet (CNP) to a source server; after receiving the CNP, the source server reduces the rate of sending data packets to prevent the data amount of the data packets buffered in the queue from reaching the preset PFC threshold.

The above-mentioned transmission methods of data packet can alleviate the congestion of network device and improve the quality of lossless Ethernet forwarding service. However, if the ratio of fan-in port to fan-out port in the network device is N:1, there will be micro-bursts in the network device. Moreover, the larger the N, the larger the instantaneous rate of the micro-burst data flow. In this case, in order to reduce the congestion of network devices and improve the quality of lossless forwarding services, it is necessary to set the ECN threshold to a smaller value.

However, setting the ECN threshold to a smaller value can reduce the congestion of network device and improve the quality of lossless forwarding services, but the rate at which the source server sends data packets will be very small, which will result in a very low utilization of network bandwidth.

In addition, one queue can buffer data packets of multiple data flows. These multiple data flows are divided into elephant flows and mouse flows. Wherein, the elephant flows in the micro-burst contribute more to the congestion. Therefore, when congestion occurs, the network device only needs to perform congestion notification on the elephant flows, and then only perform congestion control on the elephant flows. However, in the above-mentioned transmission methods of data packet, after the ECN threshold is adjusted, the network device will perform congestion notification on all data flows based on the adjusted ECN threshold. This causes great damage to the mouse flows, and this congestion control mechanism is unfair.

SUMMARY

The purpose of examples of the present disclosure is to provide a congestion processing method, apparatus, network device, and storage medium, so as to reduce the damage to the mouse flow, improve the fairness of the congestion control, and improve the utilization of network bandwidth. Specifically, the technical solutions are as follows.

In a first aspect, an example of the present disclosure provides a congestion processing method, and the method includes:

receiving a first data packet carrying a congestion mark through a target port;

searching, in a preset greedy flow table, a target table entry that includes target flow information carried in the first data packet and an identifier of the target port, and the preset greedy flow table stores flow information of a data flow whose traffic is greater than a preset traffic threshold and an identifier of a port that receives a data flow corresponding to the flow information;

processing, if the target table entry is found, the first data packet;

removing, if the target table entry is not found, the congestion mark carried in the first data packet to obtain a second data packet, and processing the second data packet.

In a second aspect, an example of the present disclosure provides a congestion processing apparatus, and the apparatus includes:

a receiving unit to receive a first data packet carrying a congestion mark through a target port;

a searching unit to search, in a preset greedy flow table, a target table entry that includes target flow information carried in the first data packet and an identifier of the target port, and the preset greedy flow table stores flow information of a data flow whose traffic is greater than a preset traffic threshold and an identifier of a port that receives a data flow corresponding to the flow information;

a processing unit to process, if the target table entry is found, the first data packet, and to remove, if the target table entry is not found, the congestion mark carried in the first data packet to obtain a second data packet, and process the second data packet.

In a third aspect, an example of the present disclosure provides a network device, including a processor and a machine-readable storage medium, where the machine-readable storage medium stores machine-executable instructions that can be executed by the processor, and the processor is caused by the machine executable instructions to implement the following operations:

receiving a first data packet carrying a congestion mark through a target port;

searching, in a preset greedy flow table, a target table entry that includes target flow information carried in the first data packet and an identifier of the target port, and the preset greedy flow table stores flow information of a data flow whose traffic is greater than a preset traffic threshold and an identifier of a port that receives a data flow corresponding to the flow information;

processing, if the target table entry is found, the first data packet; removing, if the target table entry is not found, the congestion mark carried in the first data packet to obtain a second data packet, and processing the second data packet.

In a fourth aspect, an example of the present disclosure provides a machine readable storage medium, wherein a computer program is stored in the machine readable storage medium, and when the computer program is executed by a processor, any of the methods described above is implemented.

In a fifth aspect, an example of the present disclosure provides a computer program, which implements any of the methods described above when it is executed by the processor.

In the technical solution provided by the examples of the present disclosure, a greedy flow table is preset to identify greedy flows in the network, so as to retain the congestion control of the greedy flows, and remove the congestion control of the non-greedy flows, which reduces the damage of mouse flow, and improves the fairness of the congestion control.

In addition, because the technical solutions provided by the examples of the present disclosure are aimed at the processing after the ECN threshold is triggered, greedy flows that exceed the ECN threshold can be independently identified, and the congestion control of the greedy flows is retained. Therefore, even if the ECN threshold is set larger, the impact on the congestion processing in the example of the present disclosure is not great. Therefore, the technical solution provided by the examples of the present disclosure can use a larger ECN threshold for congestion control, which can effectively improve the utilization rate of network bandwidth while reducing the damage to the mouse flow and improving the fairness of congestion control.

BRIEF DESCRIPTION OF THE DRAWINGS

In order to more clearly describe the technical solution of the examples of the disclosure and the prior art, drawings needed in the examples and the prior art will be briefly described below. Obviously, the drawings described below are for only some examples of the present disclosure, one of ordinary skills in the art can also obtain other drawings based on these drawings without any creative efforts.

DETAILED DESCRIPTION

Figure 1:
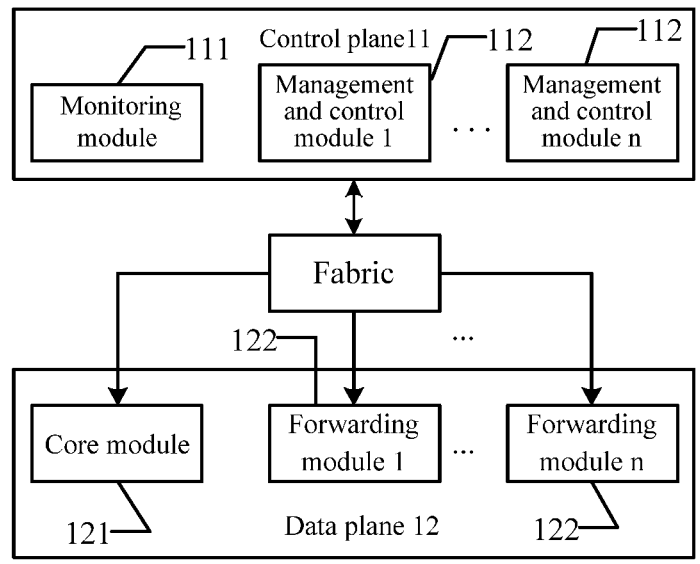
FIG. 1 is a schematic diagram of a lossless transmission system provided by an example of the present disclosure.

In order to make objectives, technical solutions and advantages of the present disclosure more apparent, the present disclosure now will be described in detail with reference to the accompanying drawings and the detailed description. Obviously, the examples described are only some of the examples of the present disclosure instead of all the examples. All further examples obtained by those of ordinary skills in the art based on the examples herein without any creative efforts are within the scope of the present disclosure.

For ease of understanding, the words appearing in the examples of the present disclosure are explained below.

Elephant flow is a data flow that transmits a large amount of data continuously through a network link.

Mouse flow is a data flow that transmits a small amount of data in a short time through a network link.

Greedy flow (GF) refers to a data flow whose traffic is greater than a preset traffic threshold. In the examples of the present disclosure, the greedy flow can be understood as an elephant flow. Non-greedy flow can be understood as a mouse flow.

Greedy flow table (GFT) refers to a table in which each entry stores a piece of GF information.

Candidate of greedy flow (CGF) refers to a data flow whose traffic is greater than a preset candidate traffic threshold. The candidate of greedy flow is a data flow that is suspected to be a greedy flow.

Candidate of greedy flow table (CGFT) refers to a table in which each entry stores a piece of CGF information.

The lossless transmission of data packets on the Ethernet is based on Priority Flow Control (PFC). In the lossless network architecture, 8 queues with different priorities are set in a buffer area of each port, and each queue is set with a corresponding PFC threshold. The priority of the queue can be set according to actual needs. For example, the priority of the queue can be a priority based on an 802.1p protocol, or it can be a priority defined based on Request For Comments (RFC) 2474.

The source server sends a data packet to a destination server through the network device. When the rate of the data flow to which a data packet sent by the source server belongs is greater than a processing rate of the network device, the network device buffers the data packet in the queue corresponding to the port that receives the data packet.

When the amount of data packets buffered in one queue (such as queue 1) is greater than or equal to a preset PFC threshold, the network device sends a congestion notification packet to the source server, so that the source server temporarily stops sending the data packets corresponding to the priority of queue 1 to the network device.

When the amount of data packets buffered in one queue (such as queue 1) is less than the preset PFC threshold, the network device sends a decongestion data packet to the source server, so that the source server sends the data packets corresponding to the priority of queue 1.

Through the above-mentioned back pressure method, lossless transmission of data packets can be realized and the problem of packet loss can be solved. At this time, each queue is a lossless queue. However, when the amount of data packets buffered in one queue is greater than or equal to the preset PFC threshold, it indicates that congestion has already occurred in the network device. This congestion problem is also an urgent problem to be solved.

At present, in order to alleviate the congestion problem, an ECN threshold is set in the network device, that is, a preset ECN threshold. The preset ECN threshold is less than the preset PFC threshold.

For one queue (such as queue 1), when the amount of data packets buffered in queue 1 reaches the preset ECN threshold, the network device marks each data packet in queue 1 that exceeds the preset ECN threshold with an ECN mark, and the preset ECN threshold is reached when buffering n data packets, the network device marks the data packets of n+1 to X with the ENC marks to obtain an ECN data packet; the ECN data packet is sent to a destination server.

After receiving the ECN data packet, the destination server feeds back CNP to a source server.

After receiving the CNP, the source server reduces the rate of sending data packets corresponding to the priority of queue 1 to prevent the congestion of the network device from further aggravating, and to prevent that the amount of the data packets buffered in queue 1 reaches a preset PFC threshold, resulting in the whole network stopping sending packets corresponding to the priority of queue 1.

In the above congestion mitigation method, after sensing the congestion, the network device sends n data packets before sending the ECN data packet, which will result in the failure to notify the destination server of buffer congestion in time.

In order to notify the destination server of buffer congestion in time, the above method for solving congestion is improved. Specifically, when congestion is sensed, the network device marks each data packet in the queue with an ECN mark. In this way, the destination server can be notified in advance that buffer congestion has occurred. This method is called fast ECN.

In addition, in the above method for solving congestion, if the path between the destination server and the source server is too long, that is, the path for transmitting CNP is too long, the rate at which the source server sends data packets cannot be reduced immediately. This directly leads to the result that: the amount of the data packets buffered in the queue reaches a preset PFC threshold, and the source server stops sending the data packets.

In view of this situation, the improvement method is: when the network device forwards the data packets, it records flow information of the data flow to which the data packets belongs in a flow table entry; when the ECN data packet is obtained, the corresponding CNP is constructed according to the learned flow information and the CNP is sent to the source server. At this time, the CNP is sent to the source server by the network device located between the source server and the destination server, and the path for transmitting CNP is shortened. In this way, the rate at which the source server sends data packets can be adjusted in time, thereby reducing the congestion of the buffer area of the network device. This method is called fast CNP.

In order to improve the quality of lossless Ethernet forwarding service as much as possible, the method of dynamically adjusting the ECN threshold is currently used to solve the congestion problem. In this method, the control plane of the network device collects traffic characteristics, and determines the ECN threshold based on the ratio of the fan-in port and the fan-out port, as well as the ratio of the elephant flow and the mouse flow through an artificial intelligence (AI) algorithm, and configures the ECN threshold to the forwarding plane of the network device, so as to dynamically adjust the ECN threshold of lossless queue. The larger the number of fan-in ports, the higher the burst pressure that the buffer area of the network device may bear.

In theory, this method can effectively prevent the amount of the data packets buffered by the network device from reaching the PFC threshold, and meet the bandwidth requirements of delay-sensitive mouse flow and throughput-sensitive elephant flow as much as possible.

However, there are micro-bursts in the network. When an instantaneous rate of the micro-burst data flow exceeds the forwarding capability of the network device, the network device will buffer the data packet of micro-burst for later transmission.

For example, if port 1 and port 2 send 5 Mbyte (MB) of data to port 3 at 10 Gigabit (G) of bit rate (Bit Per Second, bps), the total sending rate is 10+10=20 Gbps. When the buffer area of the network device is only 1 MB, 4 MB of data will be discarded or back pressured due to insufficient buffer space.

Without considering overhead data such as frame gap, preamble, frame check and data packet header, the burst duration is 5 MB/10 Gbps=4 ms. Because the burst duration is very short, only a few milliseconds, it is almost impossible for the control plane to identify such a data flow.

It is difficult for the network device to implement millisecond-level data flow statistics for the following reasons:

(1) There are many ports on the network device, and the network device cannot support high-density queries;
(2) There are limitations in the existing technology. For the high-rate pipeline design, the statistical storage unit cannot be shared between the fan-in port and the fan-out port, therefore it is impossible to know the consumption of buffer space by the data flow;
(3) There are many data flows, and it is difficult to identify the data flows that contribute greatly to congestion at a macro level.

For the increasingly popular 25G/40G/50G/100G/400G ports, it is even more difficult to identify the elephant flow in the micro-burst in the control plane. It is difficult for the control plane to identify the data flows that occupy a large bandwidth in the micro-burst by using a common statistical method of netstream.

Based on the above, for the lossless network, because there is PFC, no packet loss can be achieved. Therefore, all solutions are to solve how to improve bandwidth utilization and reduce congestion of the network device under the premise of ensuring no packet loss, while reducing the damage to the mouse flow. However, due to the complexity of data flow, no solution can completely eliminate congestion while ensuring high bandwidth utilization.

After in-depth analysis, the inventor found that the current improvement methods have the following problems:

1. When performing congestion notification, all data flows in a shared queue will send a congestion notification, and then congestion control is performed on all data flows in the shared queue. In this way, it is very unfair to the data flow with very small traffic (i.e., mouse flow). When solving the congestion problem, the expectation is to only perform congestion control on the elephant flow.

2. For the case where the ratio of the fan-in port and the fan-out port is N:1, it is difficult to identify the elephant flow in the micro-burst at a macro level, and the control plane recognition is very extensive. Therefore, the ECN threshold of the lossless queue is dynamically adjusted according to the traffic percentage of elephant flow and mouse flow, it is difficult to obtain practical effects in some disclosure scenarios.

For the second point above, it is easy to think of processing in the data plane to solve the congestion problem. However, there were technical limitations in the early days, so there was no relevant implementation solution. With the development of technology, the solution of the congestion problem has been feasible in the data plane processing, but there are still a lot of restrictions and technical problems to be solved. For example, implement related algorithms and processes on the data plane needs to fully consider the characteristics of hardware, and cannot lead to pipeline interlocking, so as to avoid low transmission efficiency. Implementing overly complex algorithms and processes on the data plane may also result in excessive resource occupation. Therefore, there is still no system solution.

In order to reduce the damage to the mouse flow when micro-bursts occur, the fairness of congestion control is improved, and the utilization rate of network bandwidth is increased, an example of the present disclosure provides a lossless transmission system, as shown in FIG. 1. The lossless transmission system includes a control plane 11 and a data plane 12. Wherein, the control plane 11 includes a monitoring module 111 and a management and control module 112. The data plane 12 includes a core module 121 and a forwarding module 122.

The monitoring module 111 is used to cooperate with the core module 121 to implement corresponding software functions.

The core module 121 includes software and hardware implementations, which is to: complete the identification of GF under high load on a forwarding plane, and store flow information of the GF in GFT; monitor CNP in a received data flow, analyze the corresponding flow information, and query the analyzed flow information in the GFT; clear, if the query is unsuccessful, a congestion mark of the data packet; and keep, if the query is successful, the data packet unchanged; then query a forwarding table, and forward the data packet.

The management and control module 112 is to manage and control modules such as the monitoring module 111 in the control plane 11, and manage and control modules such as the core module 121 and the forwarding module 122 in the data plane 12. The specific management and control logic of the management and control module 112 can be configured by the user, which is not limited here. In the example of the present disclosure, the control plane 11 may include multiple management and control modules 112. Only one management and control module 112 is used as an example for description, which is not limited here.

The forwarding module 122 includes multiple ports for forwarding data packets. In the examples of the present disclosure, the data plane 12 may include multiple forwarding modules 122. Only one forwarding module 122 is used as an example for description, which is not limited here.

In the examples of the present disclosure, the control plane may also be a completely independent server, and the data plane may be a switching device.

In the examples of the present disclosure, the lossless transmission system may be a highly abstract network device.

For example, if the network device is a box-type router or switch device, the above-mentioned control plane 11 corresponds to a main control board of the network device, and the forwarding module corresponds to a line card. Multiple line cards constitute the data plane 12, and Fabric connecting the control plane 11 and the data plane 12 corresponds to a network board.

If the network device is a box-type device, the above-mentioned control plane 11 corresponds to a main control board of the network device, and the forwarding module corresponds to a line card. Multiple line cards constitute the data plane 12, and Fabric connecting the control plane 11 and the data plane 12 may be a switching chip, or Fabric may be degenerated into a point-to-point interconnection bus.

For large-traffic information collection, the processing capability of an application specific integrated circuit (ASIC) chip can be used, but it will be more difficult to realize GF identification in the ASIC chip. The main reason is that the hardware pipeline is not as flexible as the software and has resource constraints. If the ASIC chip needs to perform GF identification on data flows up to 10K or even 100K, a careful design is needed. Therefore, in the examples of the present disclosure, when collecting GF, the CGF is initially identified through a method that is more suitable for the hardware characteristics, but this method will have a larger error; after the CGF is identified, the GF is further identified in the range of CGF.

Many of the existing network devices are distributed box-type devices. The network devices contain multiple line cards, and each of the line cards has multiple ports. Some single ports have very large forwarding capacity. Therefore, it is very challenging to identify GF in the data plane, and it is almost impossible to identify the entire frame of GF at the same time.

Therefore, the basic idea of the technical solution provided by the examples of the present disclosure is that the core module 121 is used as an independent processing unit (similar to a line card) to be hung on Fabric of the lossless transmission system, and the monitoring module 111 in the technical solution provided by the examples of the present disclosure takes a physical port in the network device as a unit, the data flow sent by each physical port is mirrored to the core module 121 in a round-robin manner for GF identification. GFT is formed based on the identified GF, and then the CNP received in the entire lossless transmission system is monitored based on GFT; when the data flow corresponding to the CNP is GF, the original CNP is forwarded to a destination address; if the data flow corresponding to the CNP is not GF, the congestion mark in the CNP is cleared and forward to the destination address. Since the number of CNPs is small, all physical ports can be monitored.

The technical solution provided by the examples of the present disclosure is applicable to the following scenarios:

1. Most of the monitored data flows are data flows that exist for a long time. This is a premise for the ECN/CNP mechanism to function, and the premise for the disclosure of the technical solution provided in the examples of the present disclosure is no exception.

2. There is a gap between the GF identification of each physical port, but any AI algorithm or other optimization solution can only take effect based on the inherent characteristics of the data flow in change that are inherently unchanged, the technical solution provided by the example of the present disclosure is no exception. Therefore, once the GFT exists, the technical solution provided in the examples of the present disclosure can take effect. Because of the basic role of PFC, it can be lossless, and there is a gap that does not work in a short period of time, and will not cause catastrophic consequences; and the technical solution provided by the example of the present disclosure will continue to optimize the flow control accuracy of CNP after online running.

3. The process of identifying GF is carried out continuously and cyclically, and network topology changes can be automatically adapted.

4. The technical solution provided by the examples of the present disclosure have wide applicability, because the GF is identified port by port, it can be applied to network devices with large forwarding capacity.

5. Congestion is often the result of the joint action of multiple data flows, but it is most necessary and only need to control some GFs, and it is not necessary to control all GFs to achieve the effect. Since the technical solution provided by the examples of the present disclosure will continue to run online and automatically adjust adaptively, the effect will improve as the running time accumulates.

6. A large number of small-traffic data flows (i.e. mouse flows) can be effectively protected to achieve greater fairness, and the transmission peak of the elephant flows in the micro-burst is cut off, thereby increasing the forwarding capacity of the network and increasing the utilization rate of the network bandwidth.

The technical solution provided by the examples of the present disclosure mainly consider the following problems:

1. Large flow. For the ports of existing network device, the forwarding capacity of some single ports is 400 G, so the processing efficiency should be considered first;

2. There are many data flows in network device, and the constraints of limited hardware resources must be fully considered;

3. It is necessary to be able to identify data flows that occupy a large bandwidth in micro-bursts (i.e. elephant flows);

4. It is necessary to be applicable to environments with a high number of data flows;

5. The hardware resources can be reused, and the resource recovery algorithm should be simple;

6. Automatic adaptation to network topology changes;

7. Selectively control of the data flows to avoid over control of some data flows.

Based on the above applicable scenarios and the problems considered, the technical solution provided by the examples of the present disclosure has the following features:

1. It is realized by the cooperation of the monitoring module of the control plane and the core module of the data plane, the monitoring module is embodied in the form of software modules, and the core module is a subsystem realized by the combination of software and hardware;

2. The monitoring module of the control plane is responsible for the configuration of the lossless transmission system and the migration of the physical state of the lossless transmission system, as well as the periodic repetition of the configuration of the lossless transmission system and the migration of the physical state of the lossless transmission system;

3. The lossless transmission system is divided into 3 physical states during running: idle state, information collection state and monitoring state;

4. Information collection state is divided into CGF information collection state and GF information collection state;

5. Periodically collecting GF information and monitoring GF on the control plane. The technical solution provided by the examples of the present disclosure can adapt to dynamic changes of network topology and data flow;

6. The core module based on the data plane realizes information collection and analysis, and can better identify the GF in the micro-burst;

7. The implementation solution has a wide range of adaptability, with a slight expansion, and can be used as an analysis tool for network device such as routers or switches to locate congestion, so as to assist in network optimization;

8. The implementation solution fully considers the hardware resource constraints of the data plane, reuses hardware resources to complete different functions, and can support the disclosure of large-scale frame device to the maximum extent;

9. The monitoring module on the control plane has a monitoring port information table, which is used to store output port information of the GF that needs to be collected, and each table entry in the table stores one output port information. Using this information, the data flow of an output port can be mirrored to an information collection input port of the core module of the data plane through a relevant configuration of ACL;

10. The core module on the data plane has CGFT and GFT;

11. The newly added core module of the implementation solution can be inserted into a main board of a box-type device in the form of a plug-in card, or integrated into the main board of the box-type device;

12. Because the technical solution provided by the examples of the present disclosure is absolutely independent, the monitoring module of the control plane can also be implemented as a separate device, and the monitoring module can reside anywhere, for example, the monitoring module resides on the network controller; in addition, there are many ways to obtain the forwarding table that the monitoring module depends on.

Figure 2:
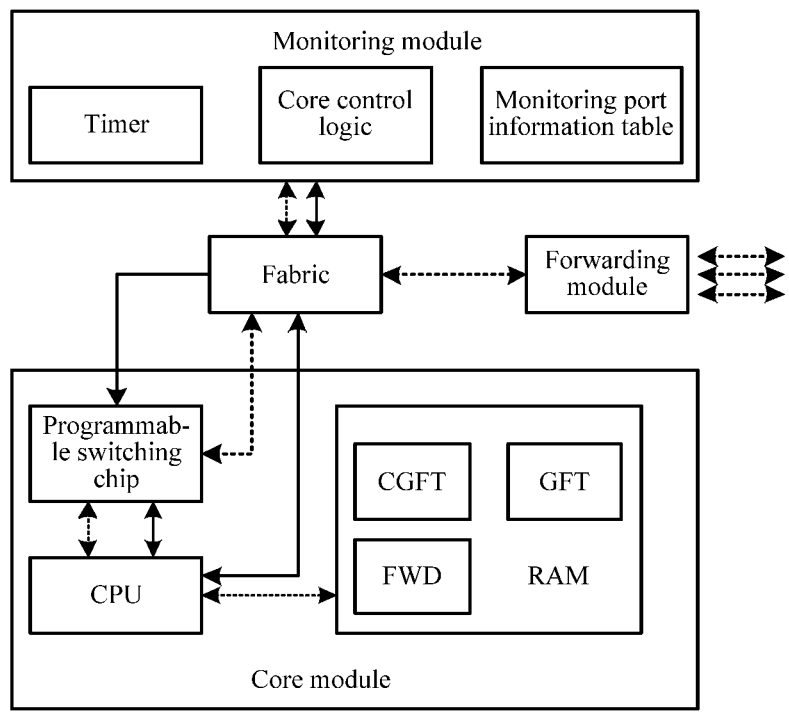
FIG. 2 is a detailed schematic diagram of a lossless transmission system in FIG. 1.

Based on the characteristics of the technical solution provided in the above examples of the present disclosure, the lossless transmission system provided in the examples of the present disclosure can be refined, as shown in FIG. 2. In Fabric, independent data flow channels (dashed lines with arrows as shown in FIG. 2) and control flow channels (solid lines with arrows as shown in FIG. 2) are provided. The monitoring module 111 of the control plane may include a timer, a core control module, a monitoring port information table, and the like. The core module of the data plane may include a programmable switch chip, a central processing unit (CPU), and a random access memory (RAM), etc. RAM includes CGFT, GFT and Forward (FWD), etc. Wherein, the CPU and the programmable switch chip can communicate through the Peripheral Component Interconnect Express (PCIE) bus and the X Gigabit Ethernet (XGE) port. Wherein, the XGE bus includes 10GE, 40GE, 50GE, 100GE, and 400GE ports, etc.

Figure 3:
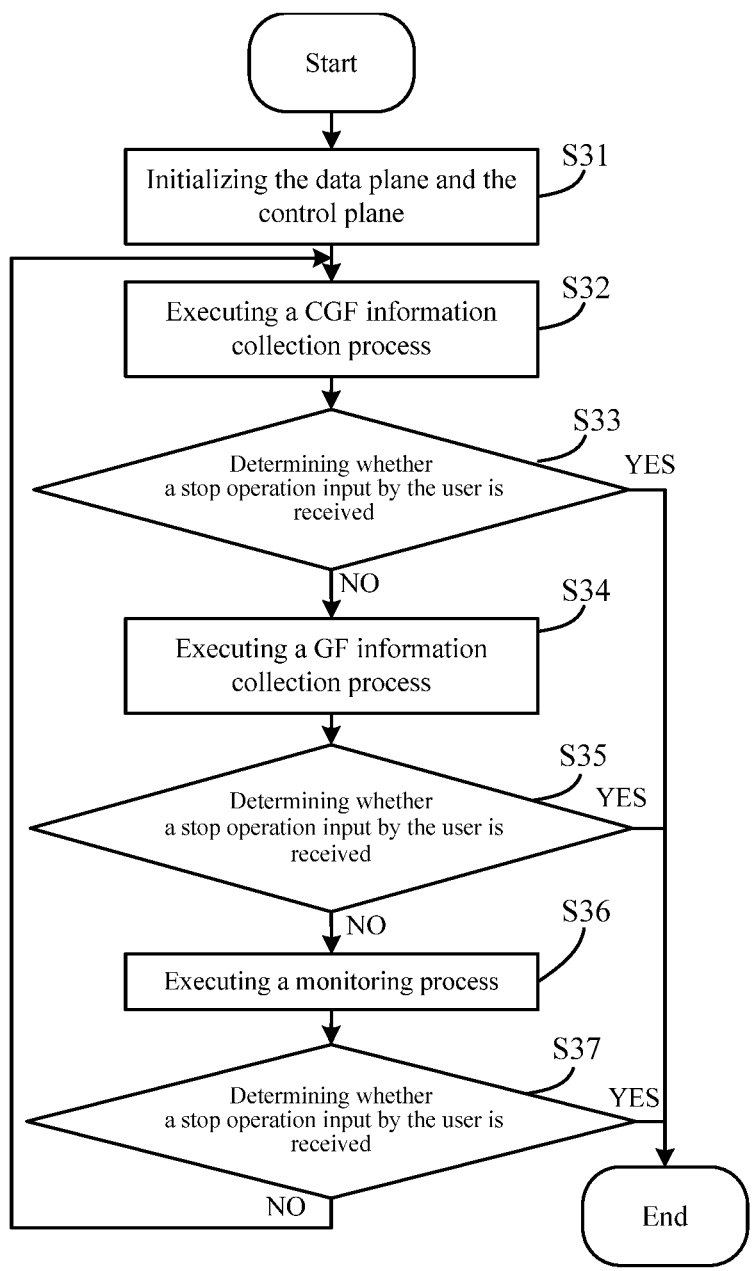
FIG. 3 is a schematic flow diagram of an information processing method of a monitoring module of a control plane according to an example of the present disclosure.

Based on the above lossless transmission system, an example of the present disclosure provides an information processing method for a monitoring module of a control plane, as shown in FIG. 3, which may include the following blocks:

Block S31, initializing the data plane and the control plane.

In order to improve the accuracy of subsequent congestion processing, the monitoring module initializes each module of the data plane and control plane. The initial configuration may specifically include the initial configuration of the monitoring module of the control plane and the core module of the data plane.

Block S32, executing a CGF information collection process.

In the example of the present disclosure, the monitoring module cooperates with the core module of the data plane to complete CGF information collection, so as to subsequently determine GF information from the CGF information.

Block S33, determining whether a stop operation input by the user is received. If not, go to block S34. If yes, this process ends.

After the CGF information collection is completed, the monitoring module monitors whether the user inputs a stop operation in real time. If the stop operation is monitored, it is determined that the user does not need to update GF information, and the monitoring module ends this process.

If the stop operation is not monitored, the monitoring module continues to execute the process to update and improve the learned GF information and improve the effect of solving the congestion problem.

Block S34, executing a GF information collection process.

Block S35, determining whether a stop operation input by the user is received. If not, go to block S36. If yes, this process ends.

After the GF information collection is completed, the monitoring module monitors whether the user inputs a stop operation in real time. If the stop operation is monitored, it is determined that the user does not need to update GF information, and the monitoring module ends this process.

If the stop operation is not monitored, the monitoring module continues to execute the process to update and improve the learned GF information and improve the effect of solving the congestion problem.

Block S36, executing a monitoring process.

The monitoring module monitors data flow forwarded by the data plane, and identifies the elephant flow in the data flow, so as to perform congestion control on only the elephant flow in the data flow.

Block S37, determining whether a stop operation input by the user is received. If not, go to block S32. If yes, this process ends.

In this way, the monitoring module cyclically executes the above-mentioned process, to continuously update and improve the learned GF information, and improve the effect of solving the congestion problem.

In one example of the present disclosure, the initialization configuration of block S31 may include the following processes.

a) Resource allocation and initialization of the control plane, and related configuration of physical ports.

b) The monitoring module of the control plane and the core module of the data plane jointly agree on the format of a data packet, a control packet, and a return message after the transmission is completed.

c) According to a physical port to be monitored in the lossless transmission system, the monitoring module of the control plane initializes a monitoring port information table, and synchronously refreshes the monitoring port information table when the physical port in the lossless transmission system changes.

d) The monitoring module of the control plane sends configuration management data packets to the core module of the data plane to configure the core module of the data plane.

e) The core module of the data plane receives the configuration management data packet, analyzes and allocates the core module resources of the data plane, and initializes the resources of the core module. Wherein the initialized resources include but are not limited to forwarding table, CGFT, GFT, timer, physical state, etc.

f) After the resource initialization of the core module of the data plane is completed, the core module presents an initialization completion state to the monitoring module of the control plane in an agreed manner, such as sending an initialization completion message.

g) The entire lossless transmission system enters an idle state.

h) The monitoring module of the control plane periodically queries the physical state of the core module of the data plane, the core module of the data plane responds accordingly, and the monitoring module of the control plane queries the physical state of the responding core module.

In the example of the present disclosure, the control plane and the data plane may be connected by a dedicated bus. The monitoring module can perform the above initialization configuration on the core module through a dedicated bus. In the example of the present disclosure, other methods may also be used to implement the initialization configuration of the monitoring module.

After the initial configuration is completed, the monitoring module of the control plane and the core module of the data plane cooperate with each other to realize the collection of CGF information and GF information.

Figure 4:
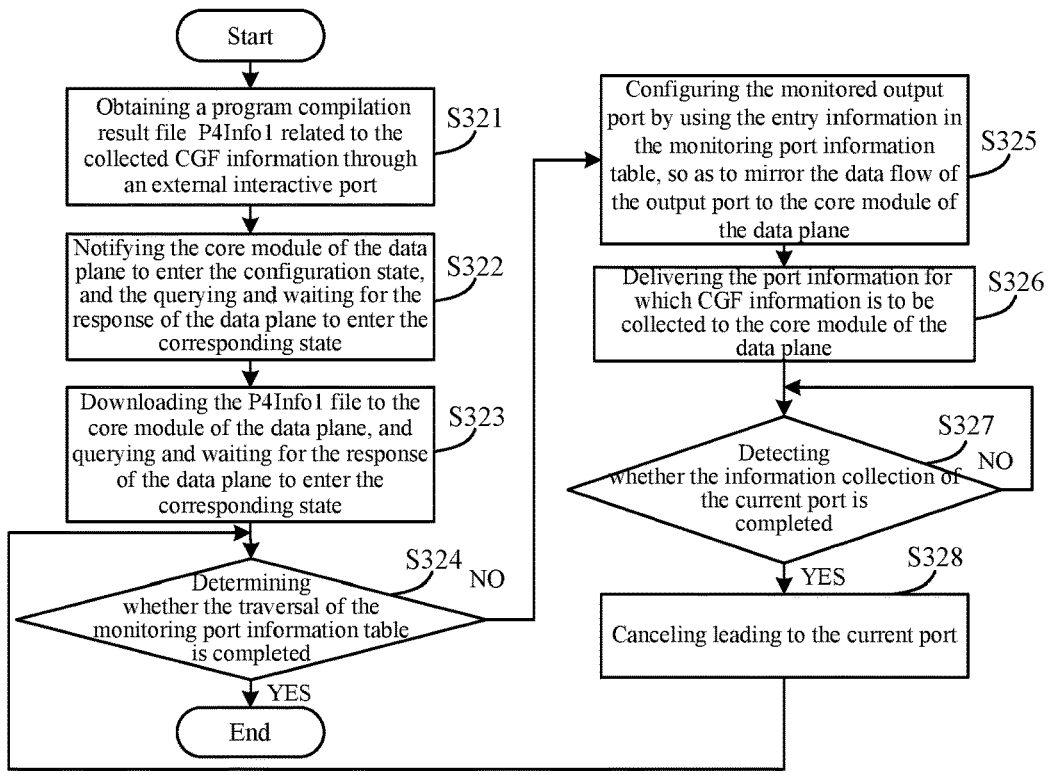
FIG. 4 is a schematic diagram of a CGF information collection process on a monitoring module side in FIG. 3.

In one example of the present disclosure, in the above block S32, the CGF information collection process is shown in FIG. 4, which may include the following blocks:

Block S321, obtaining a program compilation result file related to the collected CGF information through an external interactive port. Wherein the program compilation result file may be a P4 program compilation result file. For the convenience of distinction, the file name of the program compiled result file is named P4Info1. This is not limited. The P4Info1 file contains relevant information needed to complete the collection of CGF information. The relevant information is a P4 program compilation result, which is configured for configuring a programmable switching chip to complete the collection of CGF information.

Block S322, notifying the core module of the data plane to enter the configuration state, and querying and waiting for the response of the data plane to enter the corresponding state.

After the monitoring module obtains the P4Info1 file, it determines that the CGF information collection process needs to be executed, so a configuration state message is sent to the core module. The core module sets the physical state of the core module to a configuration state according to the configuration state message, and returns a message indicating that the physical state of the core module is the configuration state to the monitoring module. After the monitoring module obtains the message indicating that the physical state of the core module is the configuration state, it determines that the data plane enters the configuration state, and the data plane can be configured accordingly.

Block S323, downloading the P4Info1 file to the core module of the data plane, and querying and waiting for the response of the data plane to enter the corresponding state.

After the monitoring module determines that the physical state of the core module is the configuration state, the P4Info1 file is downloaded to the core module of the data plane. The core module downloads the P4Info1 file to a programmable switching chip, and then sets the physical state of the core module to an idle state, and returns a message indicating that the physical state of the core module is the idle state to the monitoring module. After the monitoring module obtains the message indicating that the physical state of the core module is the idle state, it determines that the data plane configuration is completed and enters the idle state, and the data plane can perform other processes, such as information collection.

Block S324: determining whether the traversal of the monitoring port information table is completed. If yes, ending the processing; if not, go to block S325.

In the example of the present disclosure, the following blocks S325-S328 are processed for each table entry in the monitoring port information table.

The monitoring module can process table entries in the monitoring port information table in batches, and at the same time execute the following blocks S325-S328 for output ports indicated by multiple table entries. The monitoring module can also process each of the table entries in the monitoring port information table in batches, and individually execute the following blocks S325-S328 for output ports indicated by each of the table entries.

The specific processing method can be determined jointly according to the processing capability of the module of the data plane that performs information collection and the channel bandwidth leading to the module.

Block S325, configuring the monitored output port by using the entry information in the monitoring port information table, so as to mirror the data flow of the output port to the core module of the data plane.

Block S326, delivering the port information for which CGF information is to be collected to the core module of the data plane.

After the monitoring module delivers the port information to the core module, the core module sets the physical state to the information collection state, clears the registers storing collection results in the programmable switching chip, clears the CGFT, and configures the register RegToTB. The register RegToTB is to store a traffic threshold of the identified elephant flow.

In the example of the present disclosure, the physical state of the core module is the physical state of the data plane.

After the configuration of register RegToTB by the core module is completed, the CGF information is started to collect.

Block S327, detecting whether the information collection of the current port is completed. If not, executing block S327 circularly; if yes, executing block S328.

Block S328, canceling leading to the current port, and returning to execute block S324. If the monitoring module detects that the information collection of the current port is not completed, that is, the CGF information collection of the current port is not completed, block S327 is executed again to detect whether the information collection of the current port is completed.

If the monitoring module detects that the information collection of the current port is completed, that is, the CGF information collection of the current port is completed, block S328 is executed to cancel leading to the current port, and the CGF information of the next port can be collected until the CGF information collection of all ports is completed.

Figure 5:
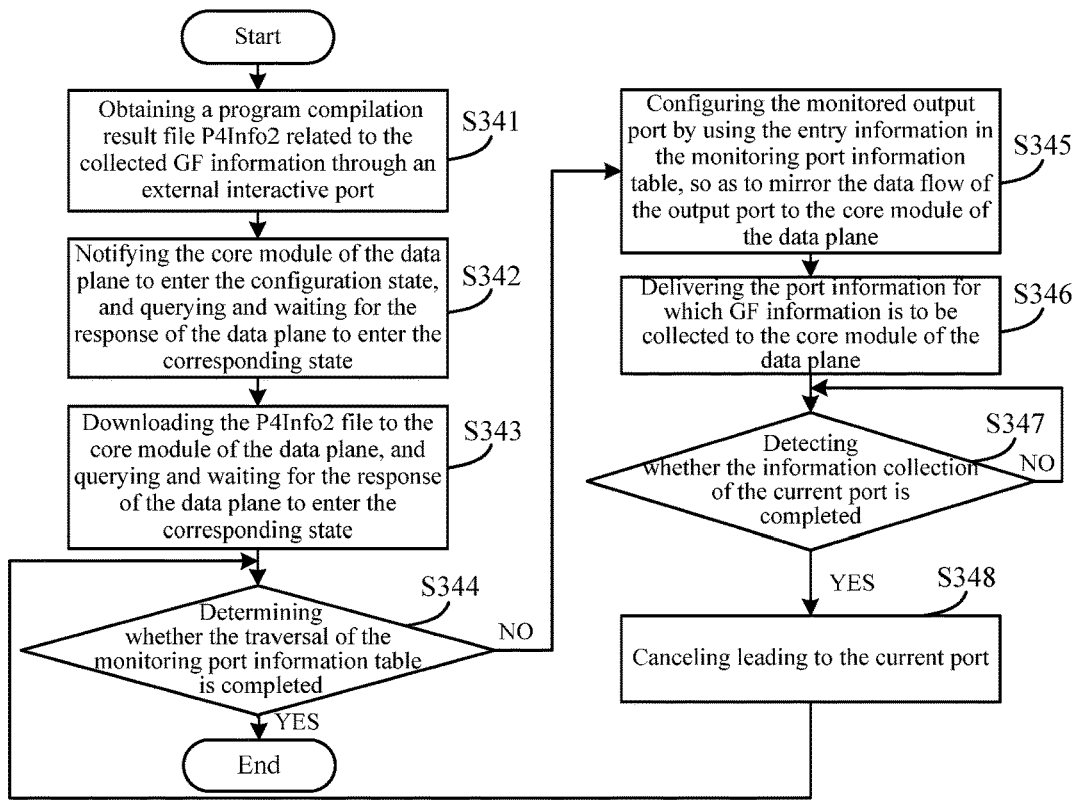
FIG. 5 is a schematic diagram of a GF information collection process on a monitoring module side in FIG. 3.

After the CGF information collection is completed, the GF information is collected within the scope of the CGF information. In one example of the present disclosure, in the above block S34, the GF information collection process is shown in FIG. 5, which may include the following blocks:

Block S341, obtaining a program compilation result file related to the collected GF information through an external interactive port. Wherein the program compilation result file may be a P4 program compilation result file. For the convenience of distinction, the file name of the program compiled result file is named P4Info2. This is not limited. The P4Info2 file contains relevant information needed to complete the collection of GF information. The relevant information is a P4 program compilation result, which is to configure a programmable switching chip to complete the collection of GF information.

Block S342, notifying the core module of the data plane to enter the configuration state, and querying and waiting for the response of the data plane to enter the corresponding state. For details, please refer to the description of block S322 above.

Block S343, downloading the P4Info2 file to the core module of the data plane, and querying and waiting for the response of the data plane to enter the corresponding state. For details, please refer to the description of block S323 above.

Block S344: determining whether the traversal of the monitoring port information table is completed. If yes, ending the processing; if not, executing block S345. For details, please refer to the description of block S324 above.

Block S345, configuring the monitored output port by using the entry information in the monitoring port information table, so as to mirror the data flow of the output port to the core module of the data plane. For details, please refer to the description of block S325 above.

Block S346, delivering the port information for which GF information is to be collected to the core module of the data plane. For details, please refer to the description of block S326 above.

Block S347, detecting whether the information collection of the current port is completed. If not, executing block S347 circularly; if yes, executing block S348. For details, please refer to the description of block S327 above.

Block S348, canceling leading to the current port, and returning to execute block S344. For details, please refer to the description of block S328 above.

Through the above blocks, the collection of GF information within the scope of CGF information is completed.

Figure 6:
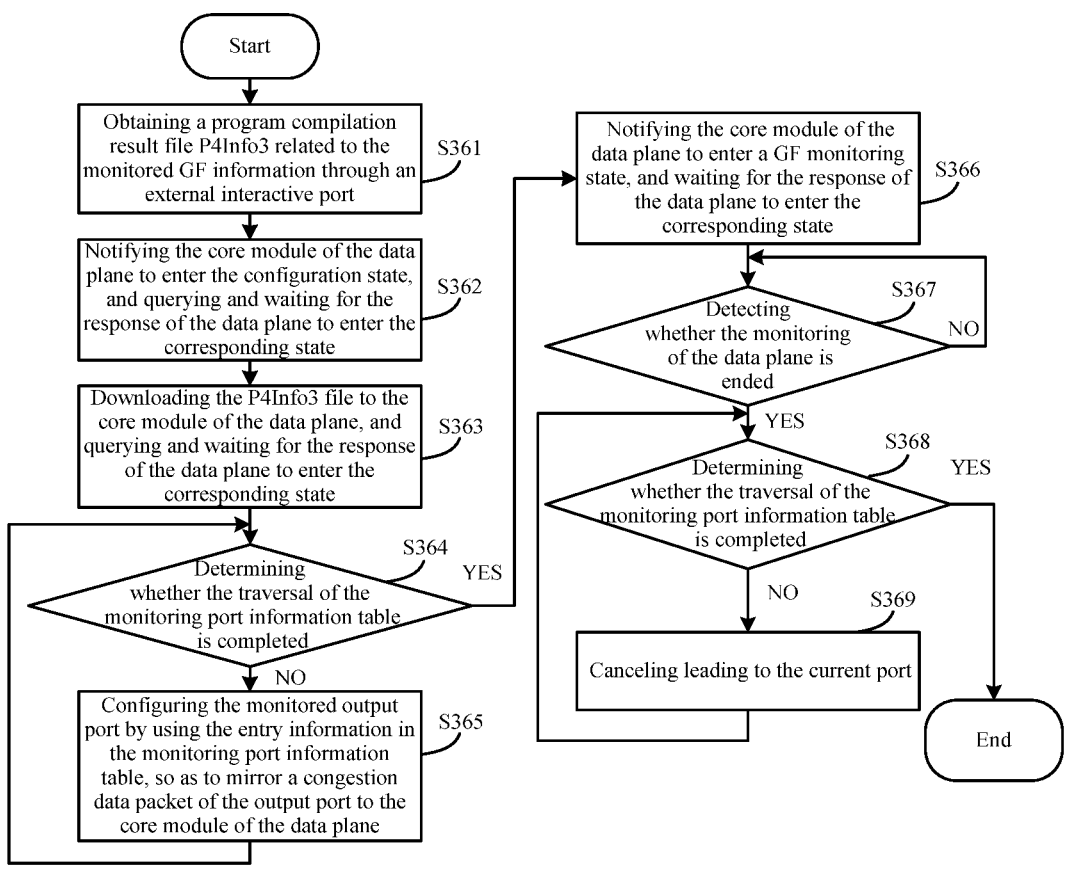
FIG. 6 is a schematic diagram of a monitoring process on a monitoring module side in FIG. 3.

After completing the GF information collection, based on the collected GF information, the monitoring module executes the monitoring process to realize the identification of elephant flows in the network and perform the congestion control on the elephant flows. In one example of the present disclosure, in the above block S34, the monitoring process is shown in FIG. 6, which may include the following blocks:

Block S361, obtaining a program compilation result file related to the monitored GF information through an external interactive port. Wherein the program compilation result file may be a P4 program compilation result file. For the convenience of distinction, the file name of the program compiled result file is named P4Info3. This is not limited. The P4Info3 file contains relevant information needed to complete the monitoring of GF. The relevant information is a P4 program compilation result, which is configured for configuring a programmable switching chip to complete the monitoring of GF.

Block S362, notifying the core module of the data plane to enter the configuration state, and querying and waiting for the response of the data plane to enter the corresponding state. For details, please refer to the description of block S322 above.

Block S363, downloading the P4Info3 file to the core module of the data plane, and querying and waiting for the response of the data plane to enter the corresponding state. For details, please refer to the description of block S323 above.

Block S364: determining whether the traversal of the monitoring port information table is completed. If yes, executing block S366; if not, executing block S365. For details, please refer to the description of block S324 above.

Block S365, configuring the monitored output port by using the entry information in the monitoring port information table, so as to mirror a congestion data packet of the output port to the core module of the data plane.

Wherein the congestion data packet may include CPN and ECN data packets.

In the example of the present disclosure, the monitoring module can configure access control list (ACL) rules to lead the received congestion data packet to the input port of the core module of the data plane, and add corresponding information in the data packet, such as receiving port information of congestion data packet, etc. In addition, the monitoring module discards the original congestion data packet while leading the congestion data packet to the core module, so as to avoid that the congestion data packet of the mouse flow is transmitted to the corresponding device, thereby performing congestion control on the mouse flow, and causing damage to the mouse flow.

The above CNP may be a data packet with an ECN response (ECN-Echo) mark, such as a transfer control protocol (TCP) acknowledgment (ACK) packet with an ECN-Echo mark. The ECN data packets are data packets with ECN marks, such as TCP data packets with ECN marks.

Block S366, notifying the core module of the data plane to enter a GF monitoring state, and waiting for the response of the data plane to enter the corresponding state.

Specifically, the monitoring module delivers a GF monitoring state notification to the core module. The core module sets the physical state of the core module to a monitoring state after receiving the notification, and returns a message indicating that the physical state of the core module is the monitoring state to the monitoring module.

After that, the core module monitors the received CNP and/or ECN data packets, matches the flow information of the received CNP and/or ECN data packets with the GF information, and then performs corresponding processing.

Block S367, detecting whether the monitoring of the data plane is ended.

The monitoring period of the data plane is preset. For example, the monitoring period is 600 seconds (s) or 700 s, etc.

The monitoring module detects in real time whether the monitoring of the data plane is ended. If it is detected that the monitoring of the data plane is not ended, block S367 is cyclically executed to wait for the monitoring of the data plane to end. If it is detected that the monitoring of the data plane is ended, block S368 is executed.

Block S368, determining whether the traversal of the monitoring port information table is completed. If yes, ending the processing; if not, executing block S369.

Block S369, canceling leading to the current port. After that, return to execute block S368. Through the above blocks S368 and 369, when the monitoring module closes the leading to each port, the monitoring process ends.

In one example of the present disclosure, if the forwarding table changes during the running phase of the lossless transmission system, the monitoring module of the control plane delivers the changed forwarding table to the core module of the data plane, and waits for the next cycle to execute the corresponding information collection.

Corresponding to the processing flow on the monitoring module side described above, the example of the present disclosure also provides a processing flow on the core module side.

Figure 7:
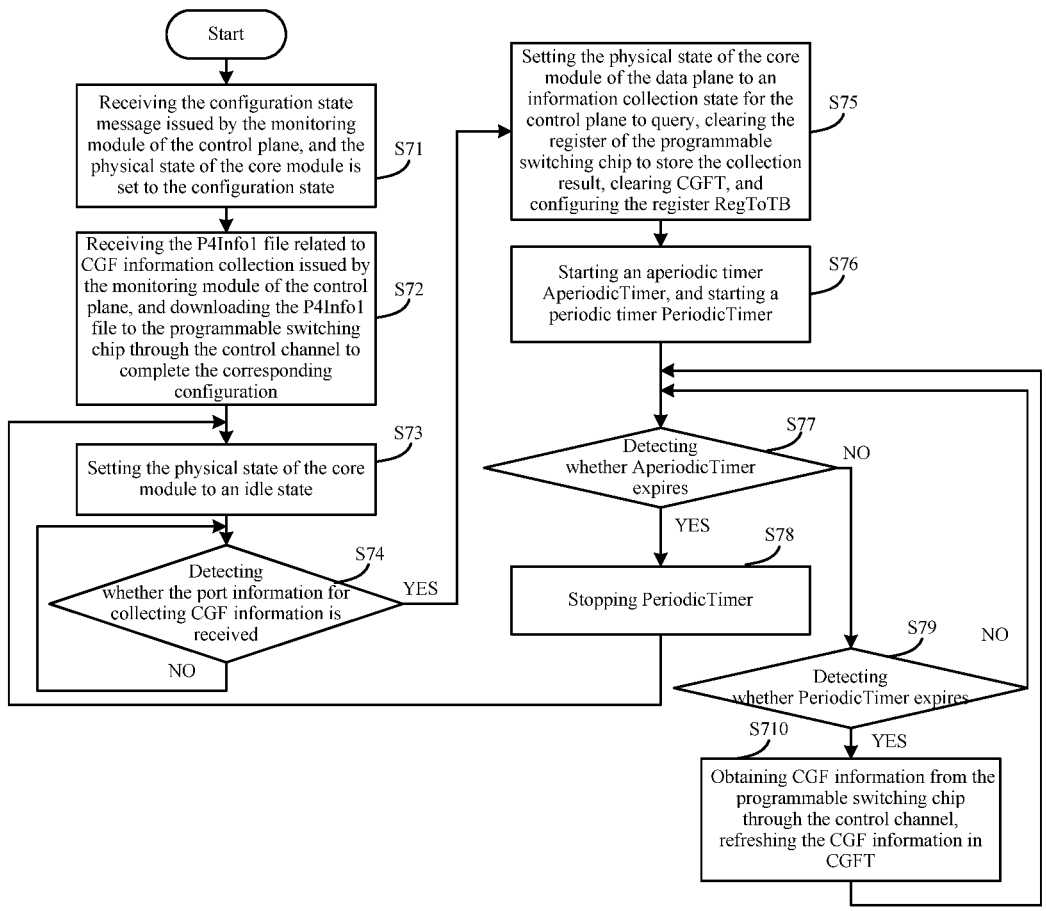
FIG. 7 is a schematic diagram of a CGF information collection process on a core module side in FIG. 3.

In one example of the present disclosure, corresponding to the CGF information collection process of the monitoring module shown in FIG. 4, the example of the present disclosure provides a CGF information collection process on the core module side, as shown in FIG. 7, which may include the following blocks:

Block S71, receiving the configuration state message issued by the monitoring module of the control plane, and the physical state of the core module is set to the configuration state.

Block S72, receiving the P4Info1 file related to CGF information collection issued by the monitoring module of the control plane, and downloading the P4Info1 file to the programmable switching chip through the control channel to complete the corresponding configuration.

It can be understood that the information in the P4Info1 file is the configuration information for configuring the programmable switching chip.

Block S73, setting the physical state of the core module to an idle state.

Block S74: detecting whether the port information for collecting CGF information is received. If not, executing block S74 circularly; if yes, executing block S75. Wherein, the port information is entry information in the monitoring port information table issued by the monitoring module.

Block S75, setting the physical state of the core module of the data plane to an information collection state for the control plane to query, clearing the register of the programmable switching chip to store the collection result, clearing CGFT, and configuring the register RegToTB.

Block S76, starting an aperiodic timer AperiodicTimer, and starting a periodic timer PeriodicTimer.

Wherein, the expiration durations of AperiodicTimer and PeriodicTimer are the collection durations customized by the user. For example, the expiration duration of AperiodicTimer can be 1 s, and the expiration duration of PeriodicTimer can be 20 milliseconds (ms). At this time, CGF information can be collected 50 times within 1 s.

Block S77, detecting whether AperiodicTimer expires. If yes, executing block S78. If not, executing block S79.

Block S78, stopping PeriodicTimer, and returning to block S73.

Block S79, detecting whether PeriodicTimer expires. If not, executing block S77. If yes, executing block S710.

Block S710, obtaining CGF information from the programmable switching chip through the control channel, refreshing the CGF information in CGFT, and then returning to execute block S77.

In one optional example, block S710 can be subdivided into the following blocks.

a) Taking out a register array A5.

In the register array A5, each register corresponds to a hash value generated by a quintuple of the data flow, and the value stored in each register is the maximum value of traffic statistics of the corresponding data flow in the PeriodicTimer period. In practical disclosures, there may be multiple data flows with the same hash value of the quintuple. Therefore, these data flows correspond to the same register in the register array A5, that is, one register corresponds to multiple data flows, so the traffic of the data amount corresponding to the quintuple with the same hash value is counted together.

b) Taking out the registers whose value is greater than threshold of candidate (ToC) in the register array A5, and identify the data flow corresponding to these registers as CGF.

The following processing is performed for each register that meets the conditions: traversing the forwarding table and taking out the corresponding table entry information; performing hash calculation on the quintuple in each table entry information to obtain the hash value; taking table entry information whose hash value obtained by calculation is the same as the hash value corresponding to the register and adding the table entry information to the CGF.

Wherein the table entry information is flow information, and the flow information includes a quintuple. The hash value corresponding to the register is a hash value generated by the quintuple of the data flow corresponding to the register. The hash value corresponding to the register is an index of the register. ToC represents a traffic threshold at which the data flow is identified as CGF, that is, a preset candidate traffic threshold.

The algorithm of the above-mentioned core module for hash calculation is the same as that in the programmable switching chip. For example, the algorithm for hash calculation in the core module and the programmable switching chip is: AND by byte and then take the Modulo. The algorithm for hash calculation can also be in other forms, which is not limited.

Figure 8:
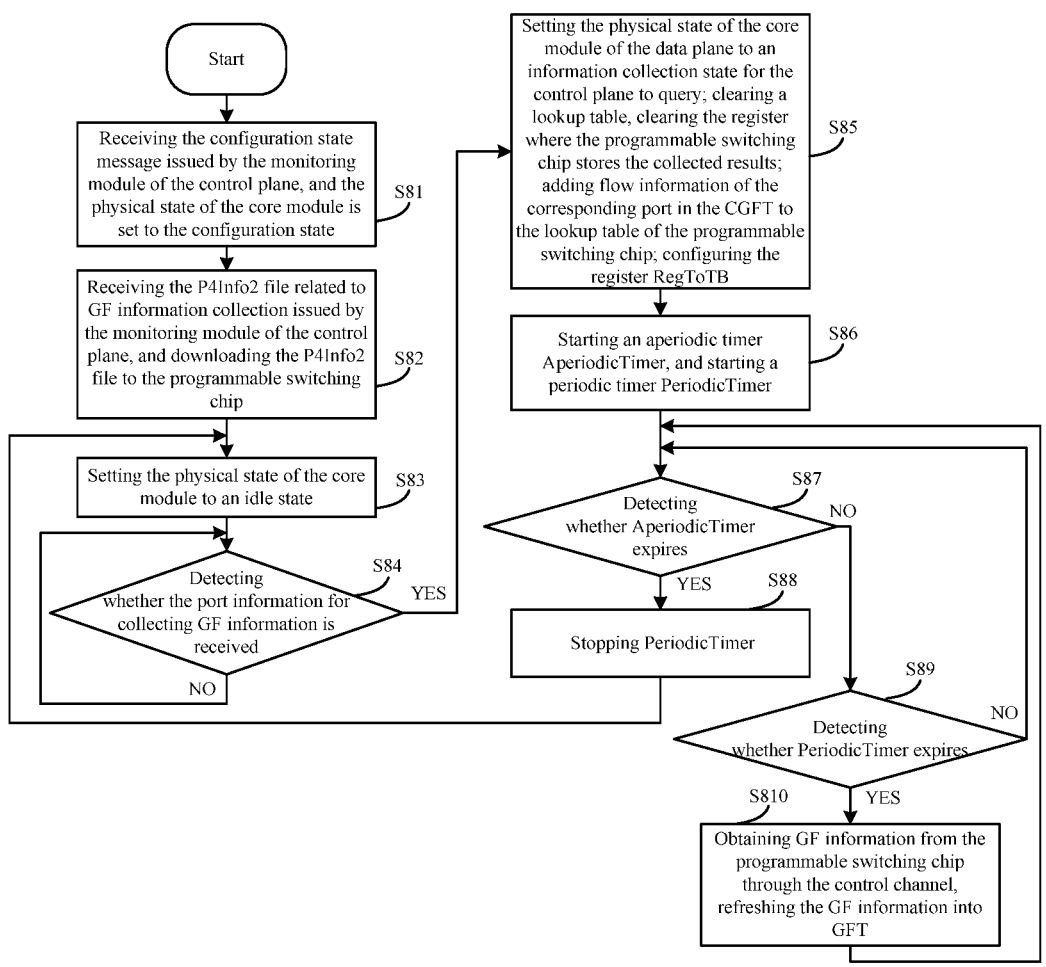
FIG. 8 is a schematic diagram of a GF information collection process on a core module side in FIG. 3.

In one example of the present disclosure, corresponding to the GF information collection process of the monitoring module shown in FIG. 5, the example of the present disclosure provides a GF information collection process on the core module side, as shown in FIG. 8, which may include the following blocks:

Block S81, receiving the configuration state message issued by the monitoring module of the control plane, and the physical state of the core module is set to the configuration state.

Block S82, receiving the P4Info2 file related to GF information collection issued by the monitoring module of the control plane, and downloading the P4Info2 file to the programmable switching chip through the control channel to complete the corresponding configuration.

It can be understood that the information in the P4Info2 file is the configuration information for configuring the programmable switching chip.

Block S83, setting the physical state of the core module to an idle state.

Block S84: detecting whether the port information for collecting GF information is received. If not, executing block S84 circularly; if yes, executing block S85. Wherein, the port information is entry information in the monitoring port information table issued by the monitoring module.

Block S85, setting the physical state of the core module of the data plane to an information collection state for the control plane to query; clearing a lookup table, clearing the register where the programmable switching chip stores the collected results; adding flow information of the corresponding port in the CGFT to the lookup table of the programmable switching chip; configuring the register RegToTB.

In an optional example, adding the flow information of the corresponding port in the CGFT to the lookup table of the programmable switching chip through the control channel may specifically be: finding flow information of the corresponding port in the CGFT, and selecting a preset number of flow information with the largest traffic. The flow identifier (FlowID) and the register index value (RegIndex) of the selected flow information are formed into table entries, and are added to the lookup table of the programmable switching chip through the control channel.

Wherein, FlowID is the information of data flow, which may include but is not limited to the quintuple. RegIndex is an index value of the register storing the collection result in the programmable switching chip. The value range of RegIndex corresponding to FlowID selected from CGFT is: 0~preset number−1. The preset number can be set according to actual needs. For example, the preset number can be 255.

Block S86, starting an aperiodic timer AperiodicTimer, and starting a periodic timer PeriodicTimer.

Wherein, the expiration durations of AperiodicTimer and PeriodicTimer are collection durations customized by the user. For example, the expiration duration of AperiodicTimer can be 2 s, and the expiration duration of PeriodicTimer can be 20 ms. At the point, GF information can be collected 100 times within 2 seconds.

Block S87, detecting whether AperiodicTimer expires. If yes, executing block S88. If not, executing block S89.

Block S88, stopping PeriodicTimer, and returning to block S83.

Block S89, detecting whether PeriodicTimer expires. If not, executing block S87. If yes, executing block S810.

Block S810, obtaining GF information from the programmable switching chip through the control channel, refreshing the GF information into GFT, and then returning to execute block S87.

In an optional example, block S810 may be subdivided into the following blocks.

a) Taking out the register array A5; wherein, the register array A5 includes a preset number+1 registers, the previous preset number of registers correspond to the RegIndex selected from CGFT, that is, the previous preset number of registers correspond to the data flow of FlowID selected in CGFT, and the last register corresponds to all data flows except the data flow of FlowID.

b) Taking out the registers whose value in the register array A5 (except the last register) is greater than Threshold of Greedy Flow (ToGF), and identify the data flow corresponding to these registers as GF.

The following processing is performed for each register that meets the conditions:

taking out corresponding table entry information according to the index of the register in the lookup table, querying CGFT, the table entry information being table entry information of the GF; querying GFT according to the table entry information of the GF in the CGFT; setting, if the table entry information of the GF is existed in GFT, an aging count corresponding to the table entry information of the GF to a maximum value ff, and setting an active value of the table entry information of the GF to the maximum value; otherwise, adding the table entry information of the GF to the GFT, and setting the aging count to the maximum value ff, and setting the active value of the table entry information of the GF to the maximum value.

ToGF represents a traffic threshold at which the data flow is identified as GF, that is, a preset traffic threshold.

Figure 9:
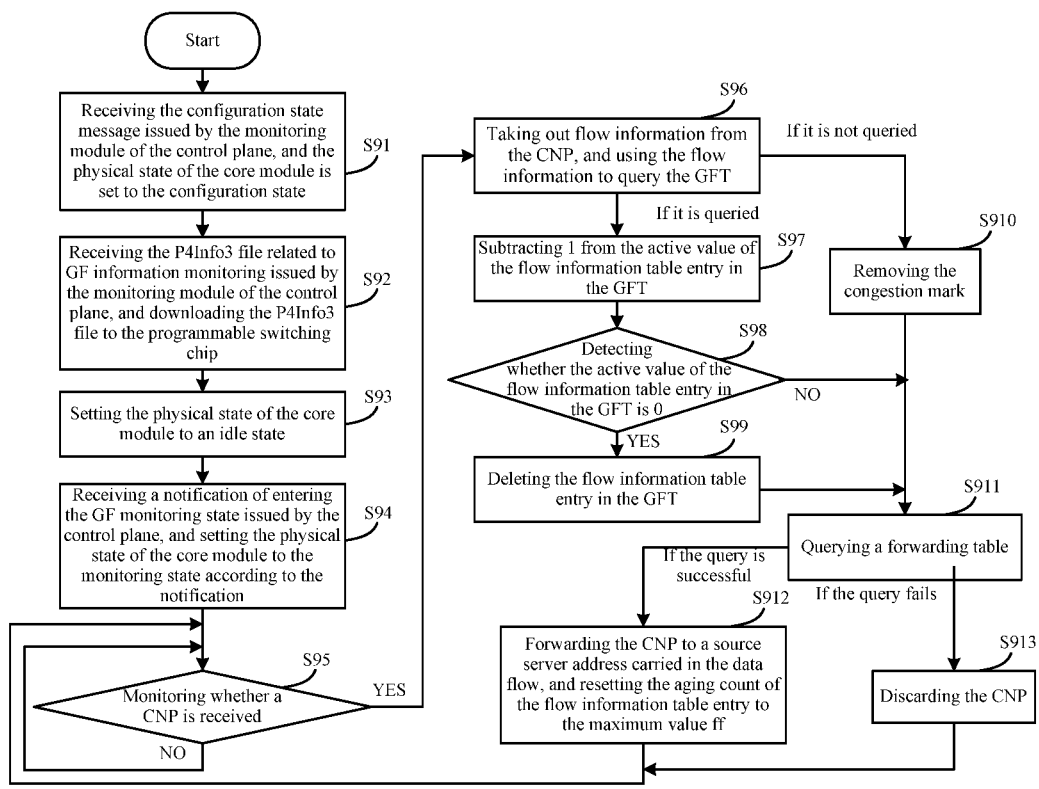
FIG. 9 is a schematic diagram of a monitoring process on a core module side in FIG. 3.

In one example of the present disclosure, corresponding to the monitoring process of the monitoring module shown in FIG. 6, the example of the present disclosure provides a monitoring process on the core module side, as shown in FIG. 9, which may include the following blocks:

Block S91, receiving the configuration state message issued by the monitoring module of the control plane, and the physical state of the core module is set to the configuration state.

Block S92, receiving the P4Info3 file related to GF information monitoring issued by the monitoring module of the control plane, and downloading the P4Info3 file to the programmable switching chip through the control channel to complete the corresponding configuration.

It can be understood that the information in the P4Info3 file is the configuration information for configuring the programmable switching chip.

In one example of the present disclosure, after the above configuration is completed, the following two objectives need to be achieved:

a) leading the data packets received from Fabric to the core module of the data plane;

b) forwarding the data packet sent by the core module of the data plane to Fabric.

Block S93, setting the physical state of the core module to an idle state.

Block S94: receiving a notification of entering the GF monitoring state issued by the control plane, and setting the physical state of the core module to the monitoring state according to the notification.

At this time, the core module starts an aging timer for GF. The aging timer is a periodic timer. The period duration of the aging timer can be set according to actual needs, such as 1 s, 2 s, or 3 s, etc.

Block S95, monitoring whether a CNP is received. If not, executing block S95 circularly; if yes, executing block S96.

In the example of the present disclosure, for the monitored port, the monitoring module of the control plane will configure the corresponding ACL rules so that the data packets received by the port are filtered, and the CNP is reserved and processed accordingly, for example: port information that receives the CNP is received in the CNP. At the same time, the CNP processed by ACL is leaded to the programmable switching chip. The programmable switching chip further leads the CNP to the core module of the data plane for further processing.

Block S96: taking out flow information from the CNP, and using the flow information to query the GFT. Executing, if the flow information table entry is queried, block S97; executing, if the flow information table entry is not queried, block S910. Wherein, the flow information table entry is a table entry that includes the flow information.

Block S97: subtracting 1 from the active value of the flow information table entry in the GFT, and then executing S98.

Block S98: detecting whether the active value of the flow information table entry in the GFT is 0. If yes, executing block S99; if not, executing block S911.

Block S99: deleting the flow information table entry in the GFT. Then, executing block S911.

Block S910, removing the congestion mark. For example, removing ECN-Echo mark, and then executing block S911.

Block S911, querying a forwarding table. If the query is successful, executing block S912; otherwise, executing block S913.

Block S912, forwarding the CNP to a source server address carried in the data flow, and resetting the aging count of the flow information table entry to the maximum value ff.

In the block S912, CNP received by the core module is the CNP leaded from the programmable switching chip, and the corresponding ACL field is added to the CNP. In order to ensure the normal forwarding of subsequent data packets and achieve transparent transmission of data packets, the core module can also remove the added ACL field.

Block S913, discarding the CNP.

The core module fails to query the forwarding table, it indicates that the network topology has changed, and the CNP is discarded to save network resources. In an example, the core module may request a synchronous forwarding table from the control plane to ensure normal forwarding of subsequent data packets.

In one example of the present disclosure, the core module can also implement monitoring of ECN data packets. In this case, after the core module sets its physical state to the monitoring state, it can perform the following blocks:

1) monitoring whether an ECN data packet is received. If yes, executing block 2); if not, executing block 1) circularly.

2) taking out flow information from the ECN data packet, and using the flow information to query GFT. Executing, if the flow information table entry is queried, block 3); executing, if the flow information table entry is not queried, block 7).

3): subtracting 1 from the active value of the flow information table entry in the GFT, and then executing block 4).

4): detecting whether the active value of the flow information table entry in the GFT is 0. If yes, executing block 5); if not, executing block 6).

5): deleting the flow information table entry in the GFT. Then, executing block 6). 6) constructing CNP, and then executing block 8).

7) removing the congestion mark. For example, removing ECN mark, and then executing block 8).

8) querying the forwarding table. executing, if the query is successful, block 9); otherwise, executing block 10).

9) forwarding the data packet to a source server address carried in the data flow, and resetting the aging count of the flow information table entry to the maximum value ff.

10) otherwise, discarding the data packet.

In blocks 9) and 10), the data packet includes the CNP constructed in block 6) and the data packet with the ECN mark removed.

In the example of the present disclosure, the core module starts an aging timer for GF.

When the core module receives the aging timer event, it traverses the GFT and decrements the aging count by 1 for each GF table entry. When the aging count is 0, the core module deletes the GF table entry. When the core module does not receive CNP or ECN corresponding to the GF table entry within a maximum value ff, it is likely that the data flow corresponding to the GF table entry no longer needs congestion control, the GF table entry is deleted to save GFT table entry resources.

In one example of the present disclosure, the collection of CGF information for the current port in each PeriodicTimer can be implemented using a P4 programming language. Specifically, the control module uses the P4Info1 file to configure the programmable switching chip. The core module collects CGF information in each PeriodicTimer based on configuration. When collecting CGF information in each PeriodicTimer, the following configuration is completed in advance:

1) defining the register RegToTB in the programmable switching chip; the core module of the data plane can read and write this register RegToTB through the control channel.

The register RegToTB stores a traffic threshold for the heavy load to be identified based on the bandwidth occupation of the current port in a statistical period. The traffic threshold can also be called a byte count threshold. The value stored in the corresponding register RegToTB can be different for different ports, which can be set according to a forwarding capacity of the port. In the example of the present disclosure, the traffic threshold T1 is taken as an example for description.

2) In an input pipe stage, the core module analyzes data packets to identify various types of data packets. In the example of the present disclosure, recognizing a TCP data packet is taken as an example. The core module extracts a quintuple of the TCP data packet, calculates a hash value of the quintuple, and saves the hash value of the quintuple to input metadata IngMeta.

In the example of the present disclosure, the range of the hash value is preset, for example, 0-1023. The value range can be set according to actual needs.

3) designing multiple register arrays, the number of register arrays is the number of statistical periods that one calculation period can divided into+2. In the following, a calculation period is divided into 4 statistical periods as an example for description, which is not limited. At this time, six register arrays A0, A1, A2, A3, A4, and A5 are designed. Each register array includes multiple registers, and the initial values of the registers in the register arrays A0, A1, A2, A3, A4, and A5 are 0. The number of registers included in a register array is the same as the number of hash values included in the preset hash value range. For example, if the preset hash value range is 0~1023, each register array includes 1024 registers.

The register array BytesTotal is designed to contain multiple 32-bit registers. The initial value of the register in the register array BytesTotal is 0. The number of registers included in the register array BytesTotal is the same as the number of statistical periods that one calculation period can divided into. The following takes a calculation period divided into 4 statistical periods as an example. The register array BytesTotal includes 4 registers.

One register Ta is designed, and the initial value of the register Ta is 0.

In the example of the present disclosure, in the output pipe stage:

a register array in A0~A3 is indexed with a value in IngMeta. Assuming that the calculation period of the data flow is T and the statistical period is t, where t=T/4, that is, the statistical period is a quarter of the calculation period. For the convenience of presentation, the statistical period $t_i$ (range of i is 0~3) corresponds to the time period: 0~T/4, T/4~2T/4, 2T/4~3T/4, 3T/4~T; that is, $t_0$~$t_3$ corresponds to 0~T/4, T/4~2T/4, 2T/4~3T/4, 3T/4~T; then the register in A0 is operated during time period $t_0$, the register in A1 is operated during time period $t_1$, the register in A2 is operated during time period $t_2$, and the register in A3 is operated during time period $t_3$. In the example of the present disclosure, take that the calculation period T is approximately 1 ms and the statistical period is approximately 256 μs as an example for description.

The registers in A0~A3 are to store statistical traffic of the data flow corresponding to the index value in the corresponding statistical period.

A register in A4 is to store a timestamp of the data flow corresponding to an index value in PeriodicTimer period.

A register in A5 is to store the maximum value of the statistical traffic of the data flow corresponding to the index value in PeriodicTimer period.

The registers in BytesTotal are to store a total traffic of data flows corresponding to the index value in the corresponding statistical period.

Ta is used to record global timestamp.

The time when the data packet arrives at the output port can be obtained according to the information provided by the metadata of the output pipe of the programmable switching chip, to calculate a current statistical period.

For example, according to the global timestamp (global_tstamp) field in the internal metadata (egress_intrinsic_metadata_from_parser_t) of the output port provided by a parser, the time when the current data packet arrives at the output pipe can be obtained ta=global_tstamp>>shift. >> means shift right. That is, $t_a$ means that global_tstamp is shifted right by shift, which is equal to dividing by the shift power of 2. Because the unit of global_tstamp is nanoseconds (ns), the calculation period statistics in the example of the present disclosure are much thicker, and the specific shift value can be determined by the user. In the example of the present disclosure, shift is set to 10, if the calculation period T is approximately 1 ms and each counting unit of $t_a$ is approximately 1 μs, then global_tstamp shift is shifted right by shift, which is equal to divide by 10 power of 2 (i.e., 1024), it is approximately equal to 1 μs, and $t_a$ is shifted right by shift, which is equal to divide by 10 power of 2, it is approximately equal to 1 ms.

In the example of the present disclosure, the calculation period is determined by shifting right by shift. The calculation of the calculation period is convenient and fast, which saves calculation resources and improves the efficiency of information collection.

In the example of the present disclosure, when collecting CGF information of each port, the core module performs the above configuration to complete the configuration required for CGF information collection on each port.

Figure 10:
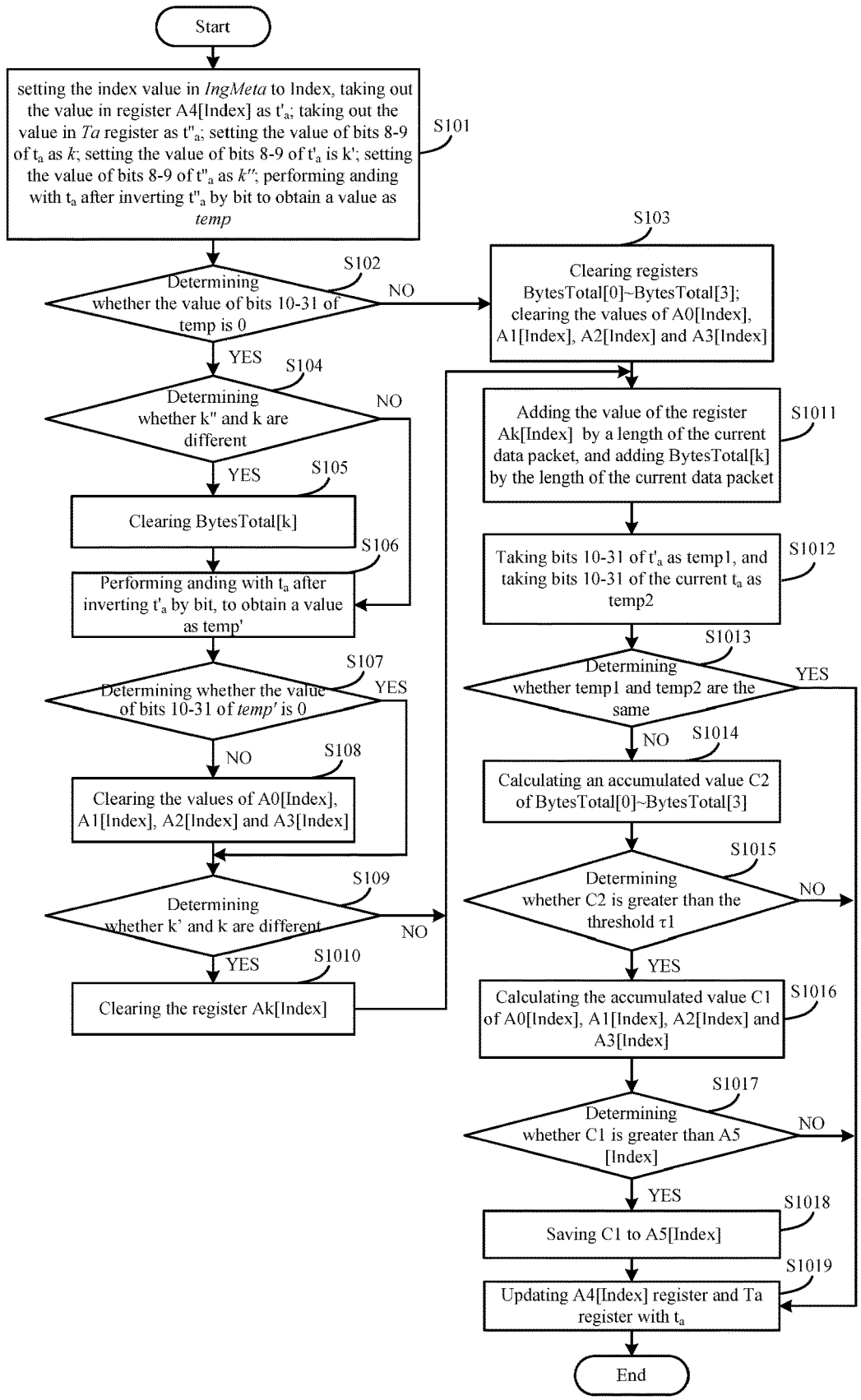
FIG. 10 is a schematic diagram of an information collection process provided by an example of the present disclosure.

Based on the above configuration, collecting CGF information in each PeriodicTimer, as shown in FIG. 10, may include the following blocks:

Block S101, setting the index value in IngMeta to Index, taking out the value in register A4[Index] as $t'_a$; taking out the value in Ta register as $t''_a$; setting the value of bits 8-9 of $t_a$ as k; setting the value of bits 8-9 of t'a is k'; setting the value of bits 8-9 of $t''_a$ as k''; performing anding with $t_a$ after inverting $t''_a$ by bit to obtain a value as temp.

Wherein, the time duration recorded by bits 0-9 of $t_a$ is 10 power of 2, it is approximately equal to 1 ms, which is the time duration of a calculation period. The time duration recorded by bits 0-7 of $t_a$ is 8 power of 2, it is approximately equal to 256 μs, which is the time duration of a quarter of a calculation period, and the time duration of a statistical period. When the bits 8-9 of $t_a$ change, it can be understood that the time has passed at least one statistical period.

The binary value of bits 8-9 can be 00, 01, 10 and 11. It can be understood that when the binary value of bits 8-9 is 00, it is currently in the first statistical period in the calculation period; when the binary value of bits 8-9 is 01, it is currently in the second statistical period in the calculation period; when the binary value of bits 8-9 is 10, it is currently in the third statistical period in the calculation period; when the binary value of bits 8-9 is 11, it is currently in the fourth statistical period in the calculation period.

When the bits 10-31 of $t_a$ change, it can be understood that the time has passed at least one calculation period.

Block S102, determining whether the value of bits 10-31 of temp is 0. If not, executing block S103. If yes, executing block S104.

Temp is the value obtained by performing anding with $t_a$ after inverting $t''_a$ by bit. As described in block S101, when bits 10-31 of $t_a$ change, it can be understood that the time has passed at least one calculation period; if bits 10-31 of $t_a$ have not changed, it is still in the current calculation period. The binary AND calculation rule is, 1&1=1, and the other AND calculation results are all 0. Based on this, if the binary value of bits 10-31 of $t''_a$ is 0000, and the binary value of bits 10-31 of $t_a$ is 0001, then temp is 0001; if the binary value of bits 10-31 of $t''_a$ is 0001, and the binary value of bits 10-31 of $t_a$ is 0011, then temp is 0010; if the binary value of bits 10-31 of $t''_a$ is 0011, and the binary value of bits 10-31 of $t_a$ is 0100, then temp is 0100; in other cases, for example, if the binary value of bits 10-31 of $t''_a$ is 0000, and the binary value of bits 10-31 of $t_a$ is 0000, then temp is 0000.

It can be seen that when the time has passed at least one calculation period, the value of bits 10-31 of temp is not 0; otherwise, the value of bits 10-31 of temp is 0.

Based on this, when it is determined that the value of bits 10-31 of temp is 0 in block S102, it means that the bits 10-31 of $t''_a$ and $t_a$ are the same, and the current time is still within the calculation period, and block S104 is executed. Otherwise, the global timestamp difference is greater than 1 ms, it means that the global statistical data is too old, and the time has passed at least one calculation period, and block S103 is executed.

In the example of the present disclosure, the core module may also use the difference value between $t''_a$ and $t_a$ as temp to accurately calculate whether the time has passed one calculation period. There is no limitation on this.

Block S103, clearing the BytesTotal[0]~BytesTotal[3] registers; clearing the values of A0[Index], A1[Index], A2[Index] and A3[Index]. Then, executing block S1011.

The global timestamp difference exceeds 1 ms, and the timestamp of the current data flow is also exceed 1 ms. In order to ensure the accuracy of subsequent statistical traffic, BytesTotal[0]~BytesTotal[3], and the values of registers A0[Index], A1[Index], A2[Index] and A3[Index] corresponding to the current data flow are cleared.

Block S104, determining whether k'' and k are different. If yes, that is, k'' is different from k, then executing block S105; if not, that is, k'' is the same as k, then executing block S106.

Block S105, clearing BytesTotal[k]. Then, executing block S106.

In the example of the present disclosure, if k'' is different from k, as described in block S101, it means that the global time has passed at least one statistical period, the time window moves forward by T/4, and block S105 is executed to clear BytesTotal[k] corresponding to the current statistical period, in order to accurately count the traffic in the current statistical period k.

If k'' is the same as k, it means that the global time has not passed one statistical period, and the time window has not moved forward by T/4, and block S106 is directly executed.

Block S106, performing anding with $t_a$ after inverting $t'_a$ by bit, to obtain a value as temp'. Block S107, determining whether the value of bits 10-31 of temp' is 0. If yes, executing block S109. If not, executing block S108.

The principle of block S107 is the same as the principle of block S102, which will not be repeated here.

When it is determined that the value of bits 10-31 of temp' is 0 in block S107, it means that the bits 10-31 of $t''_a$ and $t_a$ are the same, and the current time is still within the calculation period, and block S109 is executed. Otherwise, the difference value between the last recorded timestamp of the current data flow and the current timestamp is greater than 1 ms, it indicates that the statistical data of the current data flow is too old, and the time has passed at least one calculation period, and block S108 is executed.

Block S108, clearing the values of A0[Index], A1[Index], A2[Index] and A3 [Index]. Then, executing block S109.

Block S109, determining whether k' and k are different. If yes, that is, k' is different from k, then executing block S1010; if not, that is, k' is the same as k, then executing block S1011.

Block S1010, clearing the register Ak[Index]. Then, executing block S1011.

In the example of the present disclosure, if k' is different from k, as described in block S101, it means that the statistical time has passed at least one statistical period, the time window moves forward by T/4, and block S1010 is executed to clear the register Ak[Index] corresponding to the current data flow. For example, if k=1, then the register A1[Index] is cleared, so as to clearly count the traffic of the current data flow in a current statistical period k.

If k' is the same as k, it means that the statistical time of the current data flow has not passed one statistical period, and the time window has not moved forward by T/4, and block S1011 is directly executed.

Block S1011, adding the value of the register Ak[Index] by a length of the current data packet, and adding BytesTotal[k] by the length of the current data packet.

Block S1012, taking bits 10-31 of $t'_a$ as temp1, and taking bits 10-31 of the current $t_a$ as temp2.

Block S1013, determining whether temp1 and tempt are the same. If they are not the same, then executing block S1014; if they are the same, executing block S1019.

When temp1 is different from tempt, it means that the statistical time of the current data flow has passed at least one calculation period, and block S1014 is executed to determine the possible CGF in the current calculation period.

Block S1014: calculating an accumulated value C2 of BytesTotal[0]~BytesTotal[3].

C2 is the total traffic in a calculation period.

Block S1015, determining whether C2 is greater than the threshold τ1. If yes, it means that the current statistical period has reached a heavy load threshold, and block S1016 is executed; if not, block S1019 is executed.

Block S1016, calculating the accumulated value C1 of A0[Index], A1 [Index], A2[Index] and A3[Index].

C1 is the total traffic of the current data flow corresponding to Index in a calculation period. Block S1017, determining whether C1 is greater than A5 [Index]. If yes, it means that the traffic counted during the current calculation period is larger than the previous counted traffic, and block S1018 is executed; if not, block S1019 is executed.

A5[Index] stores a larger traffic of the current data flow corresponding to the Index. C1 is compared with A5 [Index]. If C1 is greater than A5 [Index], then the traffic counted during the current calculation period is greater than the previous traffic, and block S1018 is executed. Otherwise, block S1018 is executed to save C1 to A5[Index].

Through this method, it is possible to find a burst value that reaches the heavy load and the most serious burst of the data flow corresponding to Index in each calculation period in the current PeriodicTimer.

Block S1019, updating A4[Index] register and Ta register with t a.

After that, blocks S101-S1019 can be executed cyclically until a stop operation of the user is received.

In one example of the present disclosure, the collection of GF information for the current port in each PeriodicTimer can be implemented using a P4 programming language. Specifically, the control module uses the P4Info2 file to configure the programmable switching chip. The core module collects GF information in each PeriodicTimer based on configuration. When collecting GF information in each PeriodicTimer, the following configuration is completed in advance:

1) defining the register RegToTB in the programmable switching chip; the core module of the data plane can read and write this register RegToTB through the control channel.

The register RegToTB stores a traffic threshold for the heavy load to be identified based on the bandwidth occupation of the current port in a statistical period. In the example of the present disclosure, the traffic threshold T1 is taken as an example for description.

2) In an input pipe stage, the core module analyzes data packets to identify various types of data packets. In the example of the present disclosure, recognizing a TCP data packet is taken as an example. The core module extracts a quintuple of the TCP data packet, and queries a lookup table IngTable based on the extracted quintuple.

If a table entry in the lookup table IngTable is queried based on the exacted quintuple, a register index value is extracted from the table entry, and saved in the input metadata IngMeta. In the example of the present disclosure, it is assumed that the lookup table includes 256 table entries, wherein 255 table entries include FlowID and register index values, and one is an empty table entry. The range of the register index value in the lookup table IngTable is 0~254.

If a table entry in the lookup table IngTable is not queried based on the exacted quintuple, a maximum register index value is saved in the input metadata IngMeta. In the example of the present disclosure, it is assumed that the value range of the register index value is 0~255, where the maximum index value is 255; the register index value 0~254 can be obtained by looking up the lookup table. When a table entry in the lookup table IngTable is not queried based on the exacted quintuple, the maximum register index value of 255 is saved to the input metadata IngMeta.

3) designing multiple register arrays, the number of register arrays is the number of statistical periods that one calculation period can divided into+2. In the following, a calculation period is divided into 4 statistical periods as an example for description, which is not limited. At this time, six register arrays A0, A1, A2, A3, A4, and A5 are designed. Each register array includes multiple registers, and the initial values of the registers in the register arrays A0, A1, A2, A3, A4, and A5 are 0. The number of registers included in a register array is the same as the number of values included in the register index value range. For example, if the range of the register index value is 0~255, each register array includes 256 registers.

The register array BytesTotal is designed to contain multiple 32-bit registers. The initial value of the register in the register array BytesTotal is 0. The register array BytesTotal includes the same number of registers as the number of statistical periods that one calculation period can divided into. In the following, a calculation period is divided into 4 statistical periods as an example. The register array BytesTotal includes 4 registers.

One register Ta is designed, and the initial value of the register Ta is 0.

In the example of the present disclosure, in the output pipe stage: if the output port of the data packet is a discarding port, no processing is performed. Otherwise, GF information collection is performed. The specific GF information collection process can be seen in FIG. 10, which is not limited here.

In the example of the present disclosure, in order to achieve better effects and improve the efficiency of GF information collection, the following conditions are met, and corresponding beneficial effects can be achieved.

1. When implementing the solution in the programmable switching chip, each link of the pipe cannot be operated too much, refer to portable switch architecture (PSA) specification; at the same time, for the efficiency of the pipeline, actions for analyzing and looking up the table are placed in an input pipe, and register operations are placed in an output pipe.

2. Since the number of data flows may be very large, for example, most of them are long-link data flows with very small traffic. In this case, it is impossible to put all data flows into the programmable switching chip from the beginning, because if all data flows are put into the programmable switching chip, the resources of the programmable switching chip will be insufficient; therefore, in the example of the present disclosure, two-stage collection is adopted. The first stage only performs rough hash clustering to collect potential elephant flows (i.e. CGF), after reducing the range of the data flows, elephant flows (GF) are accurately captured during the second stage.

3. The P4Info files corresponding to different P4 programs are used in the two stages, which is also for resource considerations; according to public information, the inventor found that it takes less than 20 ms to program and load the programmable switching chip through the direct memory access (DMA) port, it takes less time for a small-scale P4Info file. Therefore, the technical solution provided by the example of the present disclosure based on the P4Info file is practical and feasible.

4. In the implementation solution, the example of the present disclosure also refers to the total traffic size when capturing burst data flows with large traffic. The purpose is: when the total traffic is large in the calculation period, capturing data flows with large bandwidth has more practical value, indicating that these data flows contribute greatly to congestion.

5. The statistic of each data flow is achieved by using 4 registers to form a circular queue; and, as time changes, the register resources can be naturally released.

6. In the programmable switching chip, the capture granularity (i.e., the calculation period) is about 1 ms, and the statistical window is moved with a period of about 0.25 ms, which achieves the precision that the control plane cannot achieve. The technical solutions provided by the examples of the present disclosure can identify the elephant flow when congestion occurs (including the elephant flow in the microburst), and perform precise congestion control on the elephant flow that causes the congestion, so as to slow down the micro-burst, which plays an important role in improving the transmission quality of lossless network.

7. Each time CGF information is collected, CGFT will be emptied, but GFT will not be emptied. Instead, the table entries in GFT will be naturally aged, and the GFT will be refreshed when new GF information is collected; if the CNP of a GF is not received for 256 consecutive seconds and the GF is not recognized as GF again, the table entry of the GF in the GFT will be deleted;

8. The aging count of GFT is used for controlling the existence time of GF entries; the active value is used for controlling the number of times the data flow is regulated. To avoid excessive regulation of GF, the active value can be set to a small number, such as 3 or 4. Each time GF is regulated, the active value of the GF table entry is reduced by 1, and after the active value of the GF table entry is reduced to 0, the GF table entry is deleted.

9. For network devices implemented based on the programmable switching chip, the GFT obtained in the technical solutions provided in the examples of the present disclosure can also be issued to the programmable switching chip. By checking the GFT, ECN data packets of the GF corresponding to table entries in the GFT are constructed, instead of constructing the ECN data packets for each data flow; or, the output port is identified as: leading the ECN data packets to the core module of the data plane; a CNP response is performed for the ECN data packets with corresponding table entries in GFT, and the ECN data packets without corresponding table entries in GFT are discarded, so as to realize optimized fast CNP.

Existing networks have factors such as increasing traffic, increasing scale of data flow, increasing complexity of network disclosures, and inevitable micro-bursts. The existing congestion control mechanism cannot identify the elephant flow in the micro-bursts, and when congestion occurs, congestion control is performed on all data flows in a one-size-fits-all manner, which is obviously unfair. Due to the inaccuracy of data flow control, many small-traffic data flows are greatly harmed, resulting in the inability to improve the utilization of network bandwidth.

The technical solution provided by the examples of the present disclosure can identify the elephant flow in the micro-bursts, and through its accurate control, it can effectively protect a large number of small-traffic data flows and achieve greater fairness. After the transmission peak value of the elephant flow in the micro-bursts is cut off, the forwarding capacity of the network can be effectively improved; because the technical solution provided by the examples of the present disclosure will continue to run online and automatically adjust adaptively, therefore, the congestion control effect will become better with the accumulation of running time. Using the technical solution provided by the examples of the present disclosure can improve the user experience of the network and greatly enhance the competitiveness of the product.

Figure 11:
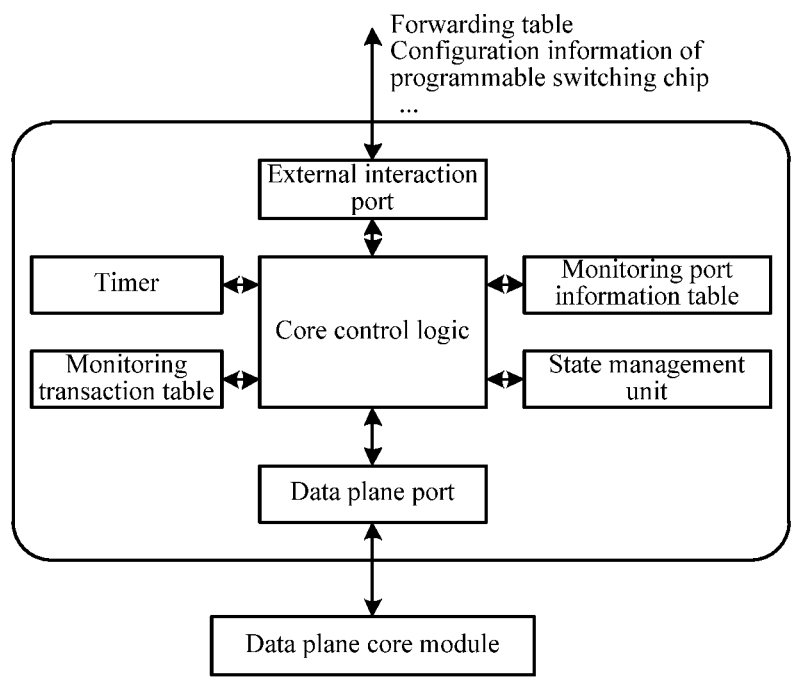
FIG. 11 is a schematic diagram of a monitoring module of a control plane according to an example of the present disclosure.

Corresponding to the aforementioned lossless transmission system, in one example of the present disclosure, an example of the present disclosure provides a monitoring module of a control plane, as shown in FIG. 11. The monitoring module may include: a monitoring port information table, a monitoring transaction table, a state management unit, a timer, an external interaction port, and a data plane port.

(1) Monitoring port information table.

Each table entry in the monitoring port information table can include the following information:

1) Physical port identification (InterfaceID): is to identify a specific physical port. InterfaceID can be represented by a slot number, or a port number, or a combination of a slot number and a port number. This information is required when configuring and canceling traffic flow during the information collection or monitoring phase. It corresponds to OutIf in GFT in the core module of the data plane.

2) Threshold of Total Band (ToTB): is to indicate a total traffic threshold of the port, that is, a traffic threshold that is recognized as a heavy load, such as a physical port of 100 Gbits/s reaches 80 Gbits/s in the calculation period (assumed to be 1 ms), it is considered to be a heavy load. Under the heavy load, it is more practical to identify GF; at this time, meaningless bytes such as frame gap and preamble are ignored, the conversion of ToTB into byte threshold is: 10M bytes.

3) Threshold of Candidate (ToC): is to indicate a traffic threshold recognized as a table entry in CGFT; for example, the calculation period is 1 ms, and the ToC can be set as 0.1M bytes.

4) Threshold of Greedy Flow (ToGF): is to indicate a traffic threshold recognized as a table entry in GFT; for example, the calculation period is 1 ms, and ToGF can be set as 0.05M bytes.

Because the bandwidths of different ports are different, the corresponding flow thresholds are also different, so it is necessary to set a relevant traffic threshold separately for each port. The monitoring module will issue the information in the monitoring port information table to the core module of the data plan.

(2) Monitoring transaction table.

The monitoring transaction table includes characteristics of the executed transaction, such as duration, etc. Each transaction contains 2 characteristics:

1) Transaction type (TransType): 16-bit encoding, the upper 8 bits are the main type, and the lower 8 bits are the subtype:
   a) configuration transaction: 0x0000, downloading the P4Info1 file related to collecting CGF information to the programmable switching chip; 0x0001, downloading the P4Info2 file related to collecting GF information to the programmable switching chip; 0x0002, downloading the P4Info3 file related to monitoring GF information to the programmable switching chip; 0x0003, synchronizing a forwarding table to the core module of the data plane; 0x0004, configuring the designated port to be collected; 0x0005, canceling the collection of the designated port; 0x0006, configuring the designated port to be monitored; canceling the monitoring of the designated port; . . . ;
b) collecting CGF transaction: 0x0100;
c) collecting GF transaction: 0x0200;
d) monitoring transaction: 0x0300.

2) Expected execution time (ExpectTime): 32-bit encoding, counting unit is second, users can configure according to needs. For example:
a) for collection CGF transaction, the estimated execution time can be 1 s;
b) for collection GF transaction, the estimated execution time can be 2 s;
c) for monitoring transaction, the estimated execution time can be 600 s; For configuration transaction, this item does not take effect, the state can be queried to determine whether the configuration transaction is completed.

After the basic initialization of the lossless transmission system is completed, the execution of the collection CGF transaction, the collection GF transaction or the monitoring transaction needs to start the timer, which is configured for controlling the execution time of the corresponding transaction. This time information is issued to the core module of the data plane as a duration of the timer of a start-up related transaction.

(3) State management unit.
The state management unit can realize the following functions:
1) interacting state information with the core module of the data plane;
2) receiving the information that the forwarding table has changed, and synchronizing the forwarding table to the data plane in conjunction with core control logic;
3) cooperating with the core control logic to realize the configuration process.

(4) Timer, used to provide various timer events.
(5) External interactive port.
Performing information interaction with each module, such as obtaining the P4Info file from external storage media in conjunction with core control logic, or obtaining the forwarding table from outside, or interacting with external GF information, etc.

(6) Data plane port is used for the interaction between the monitoring module and the core module of the data plane.

Figure 12:
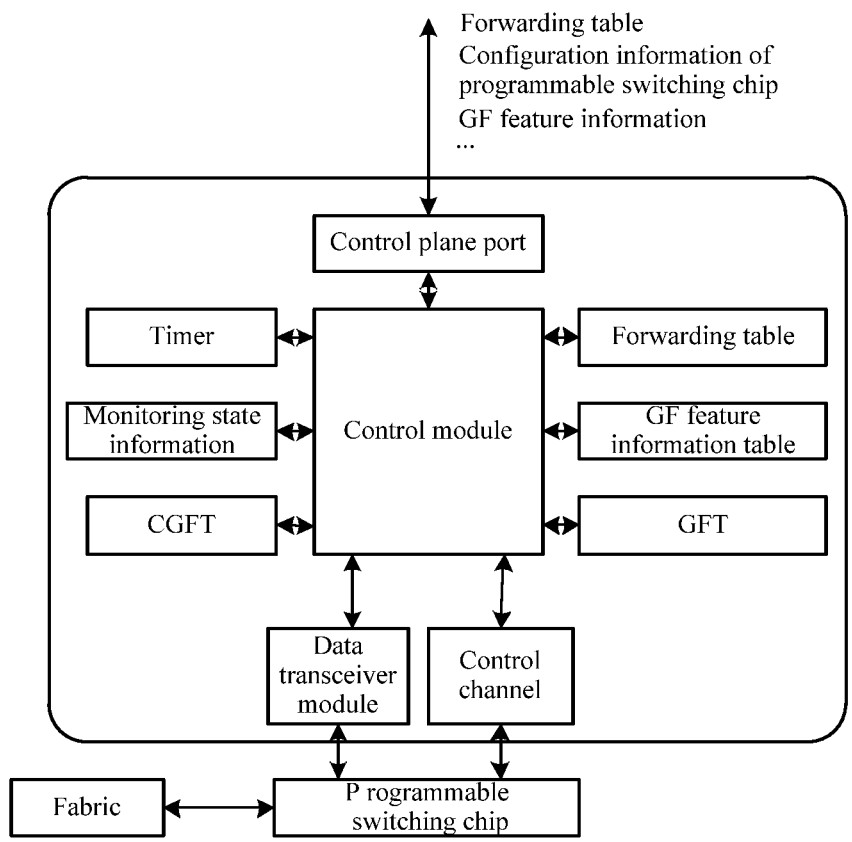
FIG. 12 is a schematic diagram of a core module of a data plane according to an example of the present disclosure.

Corresponding to the aforementioned lossless transmission system, in one example of the present disclosure, an example of the present disclosure provides a core module of a data plane, as shown in FIG. 12. The core module may include: monitoring state information, GF feature information table, CGFT, GFT, forwarding table, timer, data transceiver module, control channel, control module, control plane port, etc.

(1) Monitoring state information.
The monitoring state information may include multiple physical states of the core module, which is used to represent the current physical state of the core module, and may also be understood as the system state of the data plane.

Figure 13:
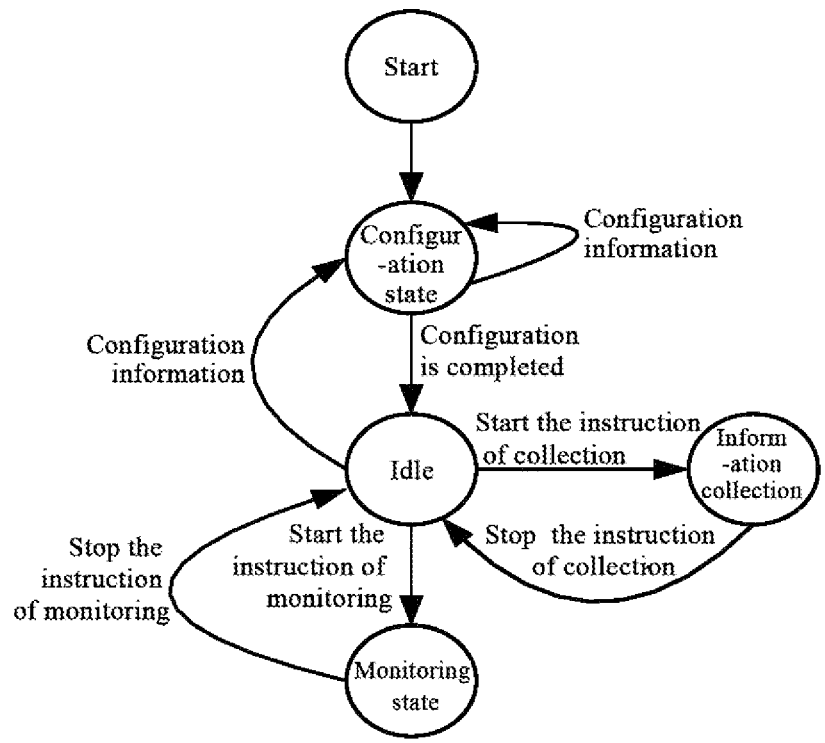
FIG. 13 is a schematic diagram of a transition between physical states of core modules provided by an example of the disclosure.

In one example, the monitoring state information includes 4 physical states, namely: configuration state, idle state, information collection state, and monitoring state. The transition between the physical states is shown in FIG. 13. It corresponds to the system state of the control plane. Due to limited hardware resources, different functions are required to reuse hardware resources, which require different configurations. In order to avoid the system disorder of the core module, multiple physical states are designed in the example of the present disclosure, and the transition between states is performed as shown in FIG. 13.

After the control plane issues each stage operation to the data plane, a physical state of the core module of the data plane must be queried, and the next stage operation can be performed only when the physical state is in an idle state. In this way, the implementation of the control plane is simplified.

(2) GF feature information table.
In the technical solution provided by the examples of the present disclosure, the GF feature information table of the core module of the data plane stores GF features configured by the user, including:
1) OutIf: identifying the port, which is uniformly defined by the user;
2) ToTB: used to indicate the traffic threshold that is recognized as a heavy load;
3) ToC: used to indicate the traffic threshold that is recognized as a table entry in CGFT;
4) ToGF: used to indicate the traffic threshold that is recognized as a table entry in GFT;

Because the bandwidths of different ports are different, the corresponding flow thresholds are also different, so it is necessary to set a relevant traffic threshold separately for each port. The monitoring port information table of the monitoring module includes ToTB, ToC and ToGF. The monitoring module will issue the information in the monitoring port information table to the GF feature information table of the core module of the data plan.

(3) CGFT.
Each CGF table entry of CGFT includes:
1) FlowID: flow information, for example, quintuple: source Internet Protocol (IP) address, destination IP address, protocol number, source port and destination port;
2) OutIf;
3) Hash value: the hash value calculated according to the FlowID of the data flow;
4) RegValue: the collection result; it is collected from the programmable switching chip and stored here; it can be used as a further extended disclosure, such as being provided to the control plane for display;
RegValue is the value stored in the aforementioned register A5.
5) RegIndex: an index value of the register storing the collection result in the programmable switching chip.

In the programmable switching chip, due to resource constraints, it is impossible to directly perform bandwidth occupancy statistics on data flows. Therefore, data flows with the same hash value are counted, but there will be different data flows with the same hash value, that is, Hash conflict. Therefore, in the example of the present disclosure, the hash value whose bandwidth occupation with the same hash value meets a certain threshold is selected. In combination with the information in the forwarding table, the data flows with the same hash value of the FlowID in the forwarding table as the hash value meeting the threshold are filled into the CGFT. These data flows are used as data flows that need to be further identified. When the GF information collection is initialized, the CGFT is issued to the flow table of the programmable switching chip for accurate statistics of GF.

(4) GFT.

The GFT of the core module stores GF that meet the traffic threshold requirements. Each GF table entry includes:
1) FlowID;
2) OutIf;
3) Age: aging count. In the example of the present disclosure, the maximum value ff of the aging count can be set to 255;
4) Active: active value. In the example of the present disclosure, the maximum value of the active value can be set to 4. Each time the GF table entry is queried, the active value decreases by 1;

In the monitoring phase, the data packets leading to the core module carry input port information, wherein, after port ID in the input port information matches port ID of OutIf, FlowID is further matched. If it matches, the forwarding table is queried, and the data packets are forwarded through Fabric according to the information in the forwarding table.

(5) Forwarding table.

The forwarding table is issued by the control plane, and the forwarding information can be obtained by looking up the table through the destination IP address. The forwarding information is configured for constructing a header of a data packet to be transmitted. This is similar to the forwarding table of the line card of the box-type device.

(6) Timer is used to provide timer events and trigger corresponding processing.

(7) Data transceiver module.

In the monitoring phase, when a certain GF table entry is queried by a data packet led to the core module, the forwarding table is further queried, and a data packet is reconstructed according to the forwarding information in the forwarding table and the flow information included in the data packet led to the core module, and the reconstructed data packet is sent to the programmable switching chip through the transceiver module, the programmable switching chip is determined by the relevant configuration. The reconstructed data packet is sent to the corresponding output port of the network device through Fabric, and sent to an original destination device of the led data packet.

(8) Control channel.

The control channel between CPU of the core module and the programmable switching chip. Tofino2 switching chip is taken as an example. The control channel can be a PCIE channel. Through the control channel, Tofino2 switching chip can be configured, and it can also interact configuration information and lookup table information of the programmable switching chip, etc. with Tofino2 switching chip through single read/write mode or DMA mode.

(9) Control module is used to control cooperative work of various modules.

(10) Control plane port is used for interaction between the core module and the monitoring module of the control plane.

In the example of the present disclosure, the programmable switching chip may include the following after programming: lookup table, key metadata, register, etc.

(1) Lookup table.

The lookup table is used in the GF information collection phase, and each table entry includes 2 fields:
1) FlowID: quintuple; FlowID is used as the key to look up the table;
2) RegIndex: an index value of the register corresponding to the data flow. The 6 register arrays A0~A5 above are all indexed by RegIndex.

When a data packet is received, in the analysis stage of the input pipe, an IP header in the data packet header is extracted, and a quintuple is used as the key to perform the table lookup action in the control stage of the input pipe; after the table lookup succeeds, RegIndex is taken out and set into metadata (IngMeta), and is used to index the registers in the 6 register arrays A0~A5 in the output pipe.

(2) Key metadata.

The key metadata includes the following fields:
1) IngMeta, saving a register index value determined in an input pipe, and using the register index value saved in IngMeta in an output pipe; in the CGF information collection stage, the register index value is obtained by performing hash calculation by the quintuple in the input pipe; In the GF collection stage, the register index value is obtained by querying the lookup table by the quintuple in the input pipe;
2) timestamp $t_a$, $t'_a$ and $t''_a$;
3) counters C1 and C2;
4) global_tstamp field of inherent metadata provided by Tofino switching chip architecture, such as global_t-stamp field in the egress_intrinsic_metadata_from_parser_t mentioned above.

(3) Register.

The programmable switching chip includes 6 register arrays A0~A5. Considering the large number of data flows, the length of the array defined in the CGF stage is 1024 to reduce hash conflicts. The 6 register arrays A0~A5 can be represented as follows:
Register<bit<32>,_>(1024) A0;
Register<bit<32>,_>(1024) A1;
Register<bit<32>,_>(1024) A2;
Register<bit<32>,_>(1024) A3;
Register<bit<32>,_>(1024) A4;
Register<bit<32>,_>(1024) A5;

The above Register<bit<32> represents a 32-bit register, and _>(1024) represents a total of 1024 registers.

In the GF collection stage, the length of the register array is defined as 256, that is, 255 CGFs that are most likely to be GFs are selected for further collection. Except for these 255 CGFs, the rest of the data flows belongs to the last register. At this time, the 6 register arrays A0~A5 can be represented as follows:
Register<bit<32>,_>(256) A0;
Register<bit<32>,_>(256) A1;
Register<bit<32>,_>(256) A2;
Register<bit<32>,_>(256) A3;
Register<bit<32>,_>(256) A4;
Register<bit<32>,_>(256) A5;

The above Register<bit<32> represents a 32-bit register, and _>(256) represents a total of 256 registers.

In addition, the programmable switching chip also includes the register RegToTB, which is to record the traffic threshold of the identified heavy load based on the bandwidth occupation of the current port; the register array BytesTotal, which is to count all the received traffic of the port during the calculation period; the register Ta is to record a global timestamp. RegToTB, BytesTotal and Ta can be expressed as follows:
Register<bit<32>,_>RegToTB;
Register<bit<32>,_>(4) BytesTotal;
Register<bit<32>,_>Ta;

The above Register<bit<32> represents a 32-bit register, _> represents a total of 1 register, and _>(4) represents a total of 4 registers.

In the CGF and GF information collection stage, the output pipe processing is the same. The register index value of CGF comes from the hash value of the quintuple of the data flow. The register index value of GF is obtained by querying the lookup table. Specifically, if the corresponding table entry is queried in the lookup table, the register index value included in the table entry is used as the register index value of the GF; if the corresponding table entry is not queried in the lookup table, the register index value of the last register in the register array is taken as the register index value of GF.

Figure 14:
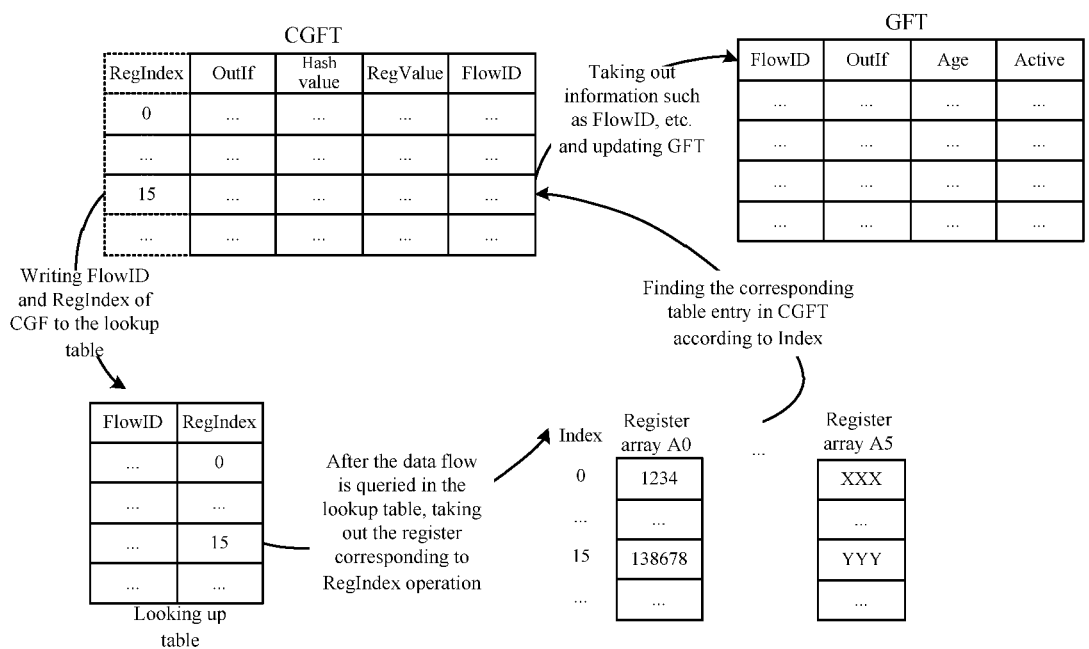
FIG. 14 is a schematic diagram of a data structure transition provided by an example of the present disclosure.

In the GF information collection stage, as shown in FIG. 14, the core module of the data plane selects up to 255 CGFs from CGFT and downloads them to the lookup table of the programmable switching chip. Wherein FlowID and RegIndex of the 255 CGFs are all from CGFT, RegIndex does not need to exist in CGFT, it is replaced by an implicit positional relationship. The number of table entries included in the CGFT+1 is equal to the number of table entries included in the lookup table. After receiving the data packet, the core module forms a lookup table key according to the flow information of the data packet. After the lookup table is successfully queried, the register index value RegIndex is taken out from the lookup table, RegIndex is used as an index for operating the register later. If the query of the lookup table fails, the register index value of the last register in the register array is taken and used as an index for operating the register later.

After collecting the GF information, according to the register index value except the maximum register index value, the CGFT is queried backward to obtain the flow information FlowID, and the GFT is updated through the FlowID and the register statistical value.

The technical solution provided by the examples of the present disclosure is implemented through a combination of software and hardware. Through the combination of software and hardware, the technical solution provided by the examples of the present disclosure have wide applicability:

1. In the technical solution provided by the examples of the present disclosure, a newly added core module can be inserted into a main board of a box-type device in the form of a plug-in card, or integrated into the main board of the box-type device.

2. Because the technical solution provided by the examples of the present disclosure is absolutely independent, the core module of the control plane can also be implemented as a separate device, and the monitoring module can reside anywhere, for example, the monitoring module resides on the network controller; in addition, there are many ways to obtain the forwarding table that the monitoring module depends on.

3. For the forwarding device implemented by the programmable switching chip, the GFT obtained by the technical solution provided in the examples of the present disclosure can also be issued to the programmable switching chip, and the ECN threshold of the GF corresponding to the table entry in the GFT is constructed through looking up the GFT, instead of constructing an ECN data packet for every data flow; in the technical solution provided by the examples of the present disclosure, the GF identification can also be integrated into the programmable switching chip.

4. In the monitoring phase, the ECN data packet sent by the monitored port can be led to the technical solution provided by the examples of the present disclosure for processing similar to CNP, and a fast CNP response is performed on the GF.

5. The technical solution provided by the examples of the present disclosure can be used as an analysis tool for routers or switches to locate congestion, and are used to assist network optimization.

Figure 15:
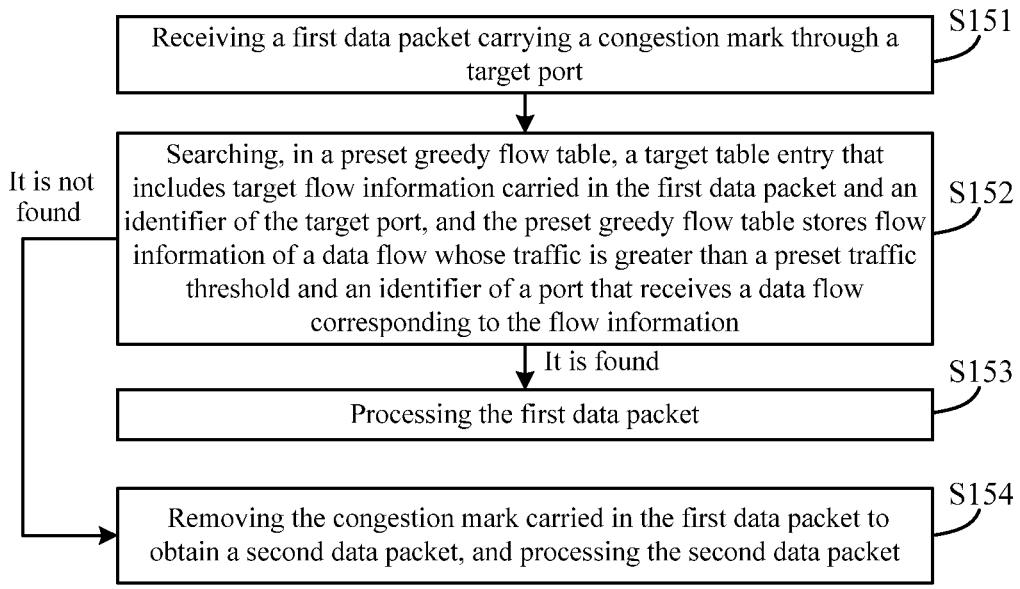
FIG. 15 is a first schematic flow diagram of a congestion processing method according to an example of the present disclosure.

Based on the above lossless transmission system, an example of the present disclosure provides a congestion processing method, as shown in FIG. 15. The method is applied to the core module of the data plane shown in FIG. 2, and the method includes the following blocks:

block 151, receiving a first data packet carrying a congestion mark through a target port.

In the example of the present disclosure, the data plane includes multiple ports, and the target port may be any one port. Here, only the target port is taken as an example for description, and its function is not limited. The first data packet is any data packet carrying a congestion mark received through the target port. Here, only the first data packet is taken as an example for description, and its function is not limited. The congestion mark can be a CNP mark, that is, an ECN-Echo mark; the congestion mark can also be an ECN mark.

After the congestion control function is enabled, the core module receives data packets through the target port, and selects the first data packet carrying the congestion mark from the received data packets.

Block 152, searching, in a preset greedy flow table, a target table entry that includes target flow information carried in the first data packet and an identifier of the target port, and the preset greedy flow table stores flow information of a data flow whose traffic is greater than a preset traffic threshold and an identifier of a port that receives a data flow corresponding to the flow information. If the target table entry is found, block S153 is executed; if the target table entry is not found, block S154 is executed.

In the example of the present disclosure, the flow information carried in the first data packet is used as target flow information.

A greedy flow table is preset in the core module, that is, a preset greedy flow table. Each table entry of the preset greedy flow table stores a correspondence between flow information and port identifiers. The traffic of the data flow corresponding to the flow information in the table entry is greater than a preset traffic threshold, and the port corresponding to the flow information is the port that receives the corresponding data flow.

After receiving the first data packet, the core module looks up a target table entry including the target flow information and the identifier of the target port in the preset greedy flow table. If the target table entry is found, it means that the traffic of the data flow to which the first data packet belongs is greater than the preset traffic threshold, that is, the data flow to which the first data packet belongs is a greedy flow, and block S153 is executed.

If the target table entry is not found, it means that the traffic of the data flow to which the first data packet belongs is less than or equal to the preset traffic threshold, that is, the data flow to which the first data packet belongs is a nongreedy flow, and block S154 is executed.

Block S153: processing the first data packet.

In the case of determining that the data flow to which the first data packet belongs is a greedy flow, the core module directly processes the first data packet according to the forwarding table, so that subsequent congestion control can be performed on the greedy flow to which the first data packet belongs, so as to reduce network congestion.

Block S154: removing the congestion mark carried in the first data packet to obtain a second data packet, and processing the second data packet.

In the case of determining that the data flow to which the first data packet belongs is a non-greedy flow, the core module removes the congestion mark carried in the first data packet to obtain the second data packet. After that, the core module can process the second data packet that does not carry the congestion mark according to the forwarding table. In this way, congestion control is not performed on the non-greedy flow to which the first data packet belongs, which reduces the damage to a mouse flow and improves the fairness of congestion control.

In the technical solution provided by the examples of the present disclosure, a greedy flow table is preset to identify greedy flows in the network, so as to retain the congestion control of the greedy flows, and remove the congestion control of the non-greedy flows, which reduces the damage of mouse flow, and improves the fairness of the congestion control.

In addition, because the technical solutions provided by the examples of the present disclosure are aimed at the processing after the ECN threshold is triggered, greedy flows that exceed the ECN threshold can be independently identified, and the congestion control of the greedy flows is retained. Therefore, even if the ECN threshold is set larger, the impact on the congestion processing in the example of the present disclosure is not great. Therefore, the technical solution provided by the examples of the present disclosure can use a larger ECN threshold for congestion control, which can effectively improve the utilization rate of network bandwidth while reducing the damage to the mouse flow and improving the fairness of congestion control.

In one example of the present disclosure, each table entry in the preset greedy flow table is set with an initial active value. Wherein, the initial active value can be set according to actual needs. For example, the initial active value can be 4, 5, or 6, etc.

Figure 16:
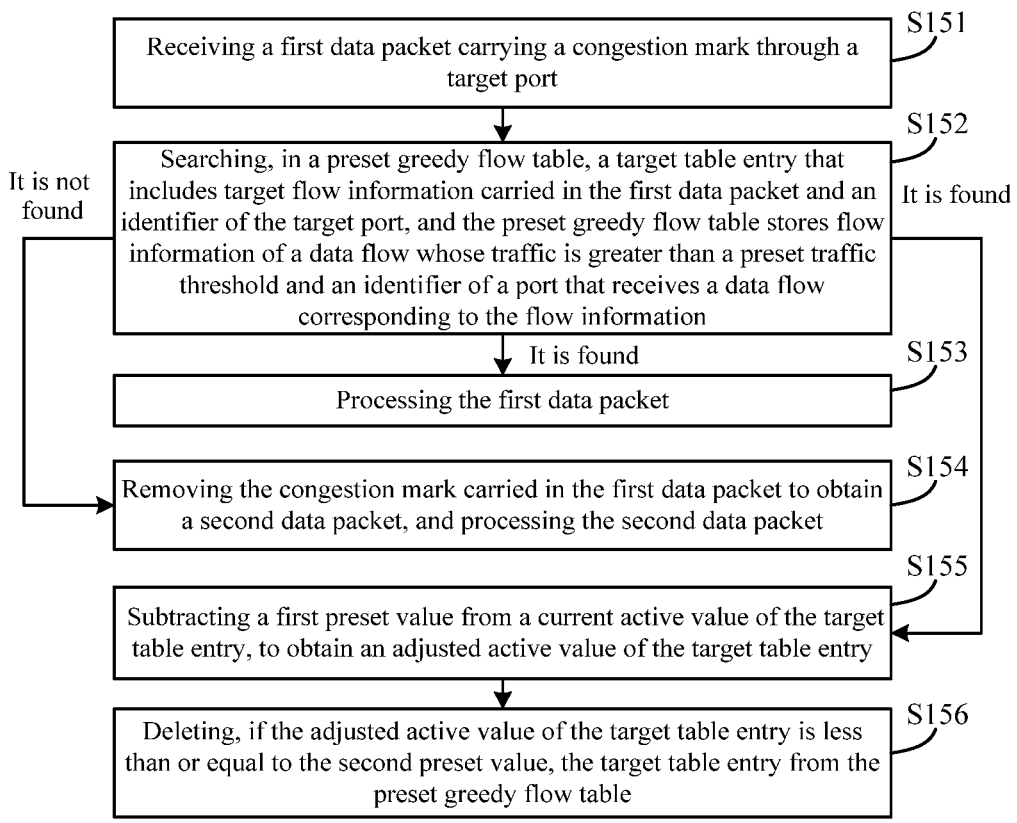
FIG. 16 is a second schematic flow diagram of a congestion processing method according to an example of the present disclosure.

In this case, as shown in the flowchart of congestion processing in FIG. 16, after block S152 is executed, if the target table entry is found, blocks S155 and S156 are executed.

Block S155, subtracting a first preset value from a current active value of the target table entry, to obtain an adjusted active value of the target table entry.

Block S156, deleting, if the adjusted active value of the target table entry is less than or equal to a second preset value, the target table entry from the preset greedy flow table.

The above-mentioned first preset value and second preset value can be set according to actual needs. For example, the first preset value can be 1, 2, or 3, etc. The second preset value can be 0, 1, 2, or 3, etc. In one example, the first preset value is 1, and the second preset value is 0.

In the example of the present disclosure, whenever a table entry matches the flow information of a data packet, the activity value of the table entry is reduced by the first preset value; when the activity value of the table entry is reduced to less than or equal to the second preset value, the table entry is deleted from the preset greedy flow table. In this way, when a data packet that matches the table entry is received, since the table entry has been deleted, the core module will not find the matching table entry in the preset greedy flow table, that is, it will not regulate the data flow to which the data packet belongs, which solves the problem of excessive regulation of the data flow.

In one example of the present disclosure, if the first data packet is CNP, the above block S153 can be refined as follows:

removing, if the target flow information is included in a forwarding table, the identifier of the target port carried in the first data packet; forwarding the first data packet with the identifier of the target port removed, and resetting an aging count of the target table entry to an initial aging number; otherwise, discarding the first data packet;

The above block S154 can be refined as follows:

removing, if the target flow information is included in the forwarding table, the identifier of the target port carried in the second data packet; forwarding the second data packet with the identifier of the target port removed; otherwise, discarding the second data packet.

In another example of the present disclosure, if the first data packet is an ECN data packet, the above block S153 can be refined as follows:

forwarding, if target flow information is included in the forwarding table, CNP corresponding to the first data packet; and resetting the aging count of the target table entry to the initial aging number; otherwise, discarding the first data packet.

The above block S154 can be refined as follows:

removing, if the target flow information is included in the forwarding table, the identifier of the target port carried in the second data packet; forwarding the second data packet with the identifier of the target port removed; otherwise, discarding the second data packet.

The above-mentioned initial aging number can be set according to actual needs. For example: the initial aging number can be 256, 300, or 350, etc.

In another example of the present disclosure, if the first data packet is an ECN data packet, the above block S153 can be refined as follows:

constructing CNP corresponding to the first data packet; forwarding, if target flow information is included in the forwarding table, the CNP; and resetting the aging count of the target table entry to the initial aging number; otherwise, discarding the first data packet.

Figure 17:
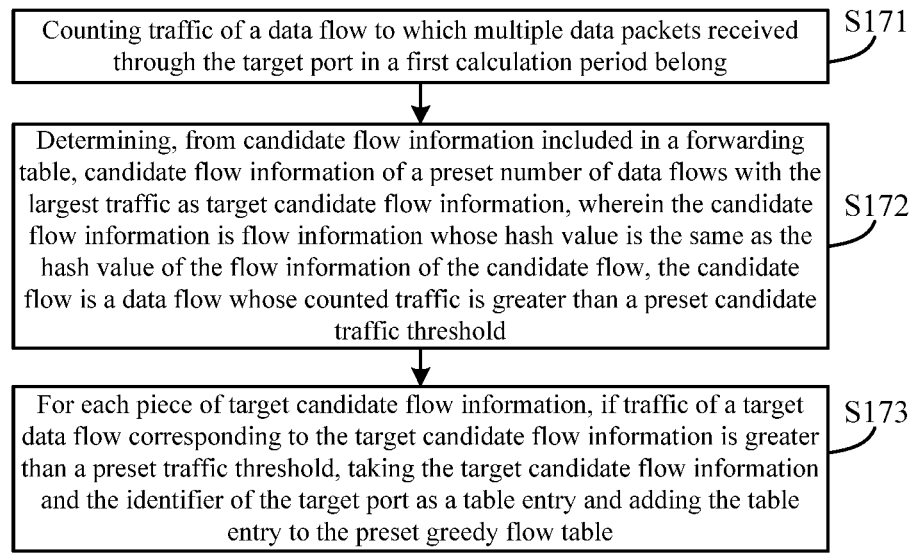
FIG. 17 is a first schematic flow diagram of a method for constructing a preset greedy flow table provided by an example of the present disclosure.

In one example of the present disclosure, the example of the present disclosure provides a method for constructing a preset greedy flow table. As shown in FIG. 17, the method may include the following blocks:

block S171: counting traffic of a data flow to which multiple data packets received through the target port in a first calculation period belong.

Before the above block S151, the core module counts the traffic of the data flow to which the multiple data packets received through the target port in the first calculation period belong, to construct a preset greedy flow table.

The duration of the first calculation period can be set according to actual needs. The duration of the first calculation period can be 1s, 2 s, 3 s, etc. The setting of the duration of the first calculation period can refer to the setting of AperiodicTimer in FIG. 7 above.

Block S172, determining, from candidate flow information included in a forwarding table, candidate flow information of a preset number of data flows with the largest traffic as target candidate flow information, wherein the candidate flow information is flow information whose hash value is the same as the hash value of the flow information of the candidate flow, the candidate flow is a data flow whose counted traffic is greater than a preset candidate traffic threshold.

In the example of the present disclosure, the core module uses the data flow whose counted traffic is greater than the preset candidate traffic threshold as a candidate flow, and uses the flow information whose hash value is the same as the hash value of the flow information of the candidate flow as the candidate flow information. From the candidate flow information included in the forwarding table, the core module determines candidate flow information of a preset number of data flows with the largest traffic as target candidate flow information.

Wherein, the preset number can be set according to actual needs. For example, the preset number can be 256 or 300, etc.

Block S173: for each piece of target candidate flow information, if traffic of a target data flow corresponding to the target candidate flow information is greater than a preset traffic threshold, taking the target candidate flow information and the identifier of the target port as a table entry and adding the table entry to the preset greedy flow table.

For each piece of target candidate flow information, the core module detects whether the traffic of the data flow corresponding to the target candidate flow information is greater than a preset traffic threshold. If the traffic of the data flow corresponding to the target candidate flow information is greater than the preset traffic threshold, then the data flow corresponding to the target candidate flow information is a greedy flow, the target candidate flow information and the identifier of the target port are taken as a table entry and the table entry is added to the preset greedy flow table. Otherwise, the block is not processed.

In the example of the present disclosure, the identification of the greedy flow is completed by the core module of the data plane, and the duration of the first calculation period for identifying the greedy flow can be very small. Therefore, a micro-burst flow can be accurately identified, a corresponding preset greedy flow table can be established, and the greedy flow can be regulated accurately.

Figure 18:
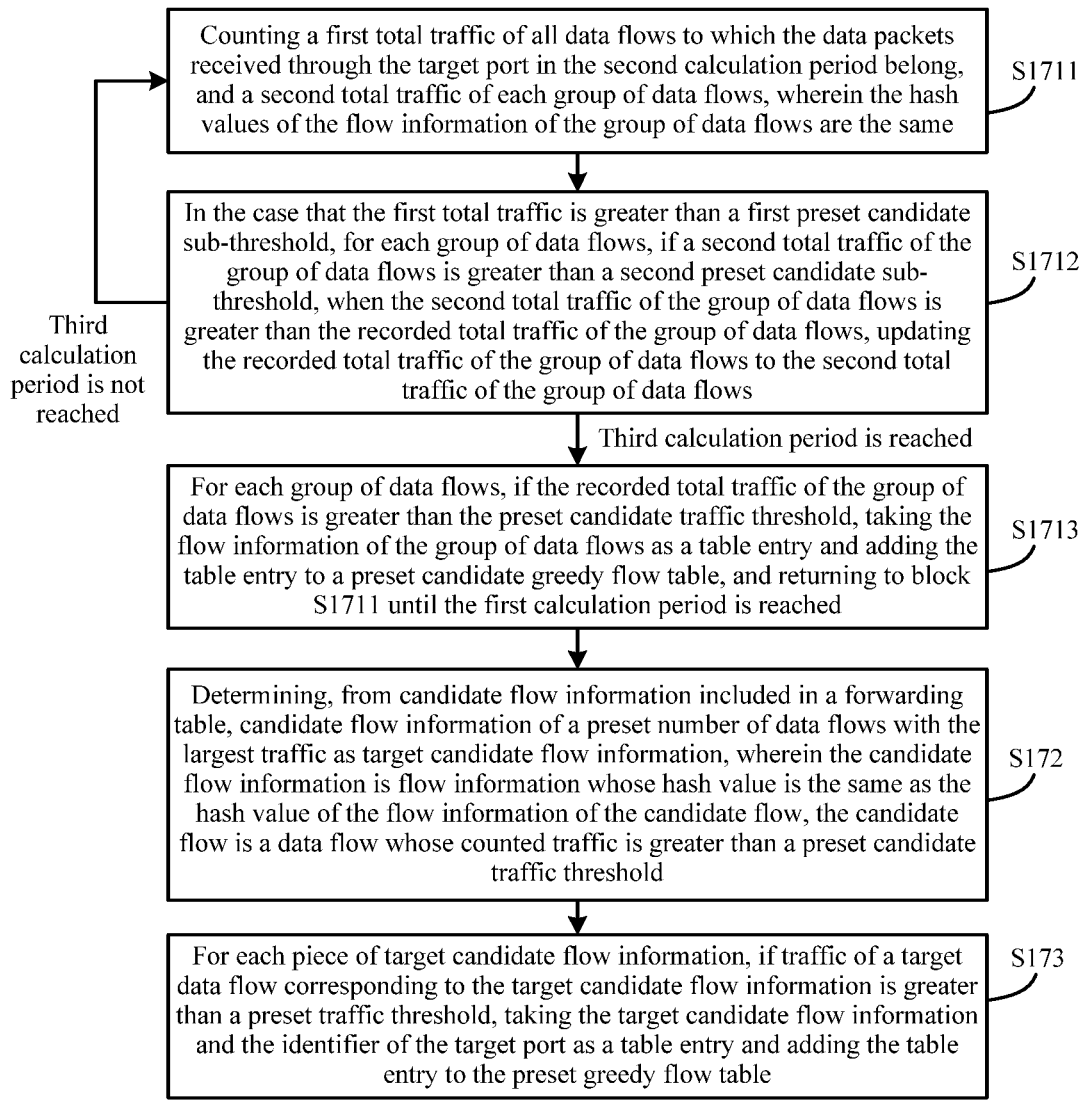
FIG. 18 is a second schematic flow diagram of a method for constructing a preset greedy flow table provided by an example of the present disclosure.

In one example of the present disclosure, the example of the present disclosure provides a method for constructing a preset greedy flow table. As shown in FIG. 18, the above block S171 may be refined as the following blocks:

block S1711: counting a first total traffic of all data flows to which the data packets received through the target port in the second calculation period belong, and a second total traffic of each group of data flows, wherein the hash values of the flow information of the group of data flows are the same.

In the example of the present disclosure, the core module divides the flow information with the same hash value as one group. Taking the total traffic of all data flows received through the target port as a first total traffic, and the total traffic of a group of data packets received through the target port as a second total traffic as an example, the core module counts the first total traffic in the first calculation period, and counts the second total traffic in the second calculation period.

The duration of the second calculation period can be set according to actual needs. The first calculation period can be 1 ms or 2 ms, etc. The setting of the second calculation period can refer to the setting of the calculation period T in FIG. 10 above.

Block S1712, in the case that the first total traffic is greater than a first preset candidate sub-threshold, for each group of data flows, if a second total traffic of the group of data flows is greater than a second preset candidate sub-threshold, when the second total traffic of the group of data flows is greater than the recorded total traffic of the group of data flows, updating the recorded total traffic of the group of data flows to the second total traffic of the group of data flows.

After obtaining the first total traffic, the core module detects whether the first total traffic is greater than the first preset candidate sub-threshold. If it is greater than the first preset candidate sub-threshold, for each group of data flows, the core module detects whether the second total traffic of the group of data flows is greater than the second preset candidate sub-threshold. If it is greater than the second preset candidate sub-threshold, the core module compares the second total traffic of the group of data flows with the recorded total traffic of the group of data flows. When the second total traffic of the group of data flows is greater than the recorded total traffic of the group of data flows, the core module updates the recorded total traffic of the group of data flows to the second total traffic of the group of data flows.

If the third calculation period has not been reached, returning to execute block S1711. If the third calculation period is reached, executing block S1713.

Block S1713: for each group of data flows, if the recorded total traffic of the group of data flows is greater than the preset candidate traffic threshold, taking the flow information of the group of data flows as a table entry and adding the table entry to a preset candidate greedy flow table, and returning to block S1711 until the first calculation period is reached.

The duration of the third calculation period can be set according to actual needs. The third calculation period can be 20 ms or 30 ms, etc. For the setting of the third calculation period, refer to the setting of PeriodicTimer in FIG. 7.

In the example of the present disclosure, after counting of the first total traffic and the second total traffic of a second calculation period, the core module detects whether the third calculation period is reached. If the third calculation period has not been reached, returning to execute block S1711, to count the first total traffic and the second total traffic of the next second calculation period.

If the third calculation period is reached, for each group of data flows, the core module detects whether the total traffic of the recorded group of data flows is greater than the preset candidate traffic threshold. If it is greater than the preset candidate traffic threshold, the core module uses the flow information of the group of data flows as a table entry and adds the table entry to a preset candidate greedy flow table.

The above blocks S1711-S1713 are executed cyclically in this way until the first calculation period is reached.

The specific implementation of the above blocks S1711-S1713 can refer to the description of the above blocks S1014-S1018 in FIG. 10.

Through the above examples, it is possible to filter data flows that are likely to be greedy flows as much as possible, which can reduce the scope of filtering greedy flows, and facilitate the identification of greedy flows on the data plane.

Figure 19:
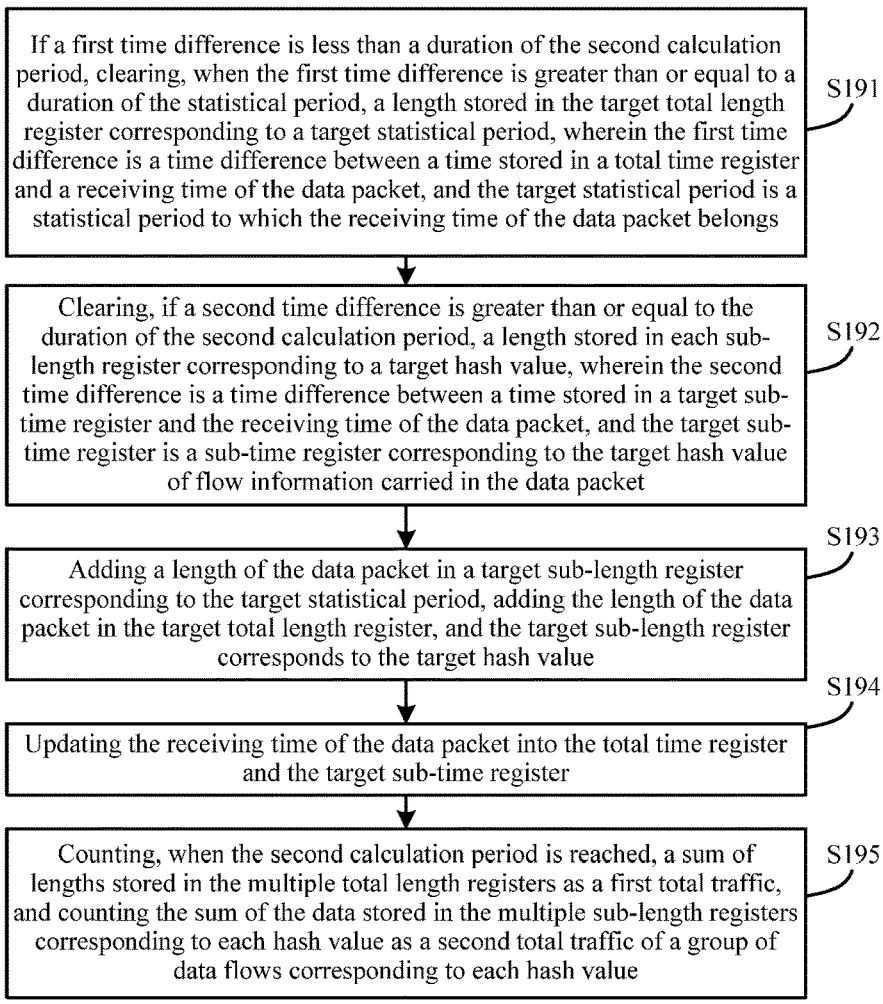
FIG. 19 is a first detailed schematic diagram of block S1711 in FIG. 18.

In one example of the present disclosure, the example of the present disclosure also provides a traffic statistics method, as shown in FIG. 19. In this method, the second calculation period is divided into multiple statistical periods. Each statistical period corresponds to a sub-length register array, each statistical period corresponds to a total length register, each sub-length register array includes sub-length registers corresponding to multiple hash values, and one hash value corresponds to one sub-time register.

Wherein, the sub-length register array can refer to registers A0~A3 in FIG. 10, the total length register can refer to register BytesTota in FIG. 10, and the sub-time register can refer to register A4 in FIG. 10.

In this case, in the above block S1711, for each data packet received through the target port, the following blocks can be performed:

block S191: if a first time difference is less than a duration of the second calculation period, clearing, when the first time difference is greater than or equal to a duration of the statistical period, a length stored in the target total length register corresponding to a target statistical period, wherein the first time difference is a time difference between time stored in a total time register and a receiving time of the data packet, and the target statistical period is a statistical period to which the receiving time of the data packet belongs.

Wherein, if the first time difference is less than the duration of the second calculation period, when the first time difference is less than the duration of the statistical period, block S192 is directly executed.

Block S192: clearing, if a second time difference is greater than or equal to the duration of the second calculation period, a length stored in each sub-length register corresponding to a target hash value, wherein the second time difference is a time difference between time stored in a target sub-time register and the receiving time of the data packet, and the target sub-time register is a sub-time register corresponding to the target hash value of flow information carried in the data packet.

Block S193: adding a length of the data packet in a target sub-length register corresponding to the target statistical period, adding the length of the data packet in the target total length register, and the target sub-length register corresponds to the target hash value.

Block S194, updating the receiving time of the data packet into the total time register and the target sub-time register.

Block S195: counting, when the second calculation period is reached, a sum of lengths stored in the multiple total length registers as the first total traffic, and counting a sum of the data stored in the multiple sub-length registers corresponding to each hash value as the second total traffic of a group of data flows corresponding to each hash value.

Figure 20:
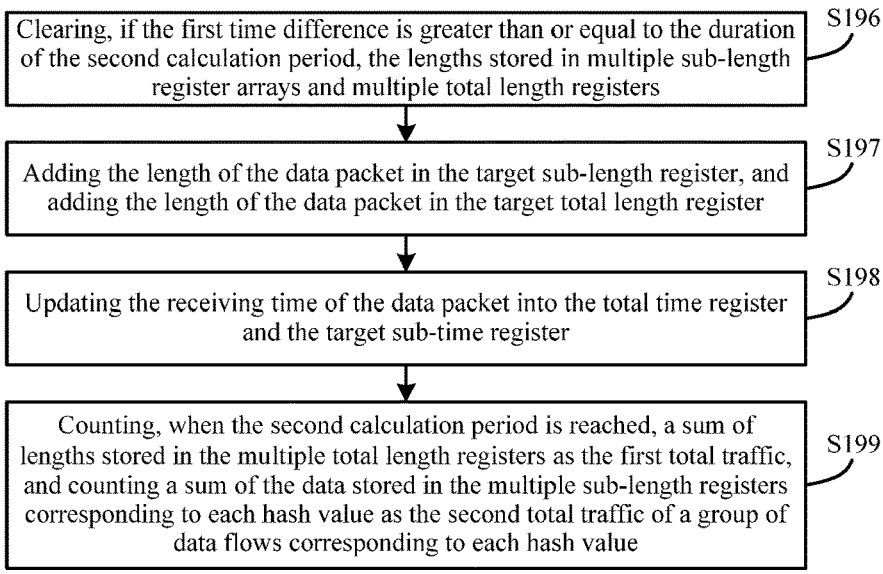
FIG. 20 is a second detailed schematic diagram of block S1711 in FIG. 18.

In another example of the present disclosure, on the basis of FIG. 19, the example of the present disclosure also provides a traffic statistics method, as shown in FIG. 20. In the method, for each data packet received through the target port, the following blocks can be performed:

Block S196, clearing, if the first time difference is greater than or equal to the duration of the second calculation period, lengths stored in multiple sub-length register arrays and multiple total length registers.

Block S197, adding the length of the data packet in the target sub-length register, and adding the length of the data packet in the target total length register.

Block S198, updating the receiving time of the data packet into the total time register and the target sub-time register.

Block S199, counting, when the second calculation period is reached, a sum of lengths stored in the multiple total length registers as the first total traffic, and counting a sum of the data stored in the multiple sub-length registers corresponding to each hash value as the second total traffic of a group of data flows corresponding to each hash value.

Figure 21:
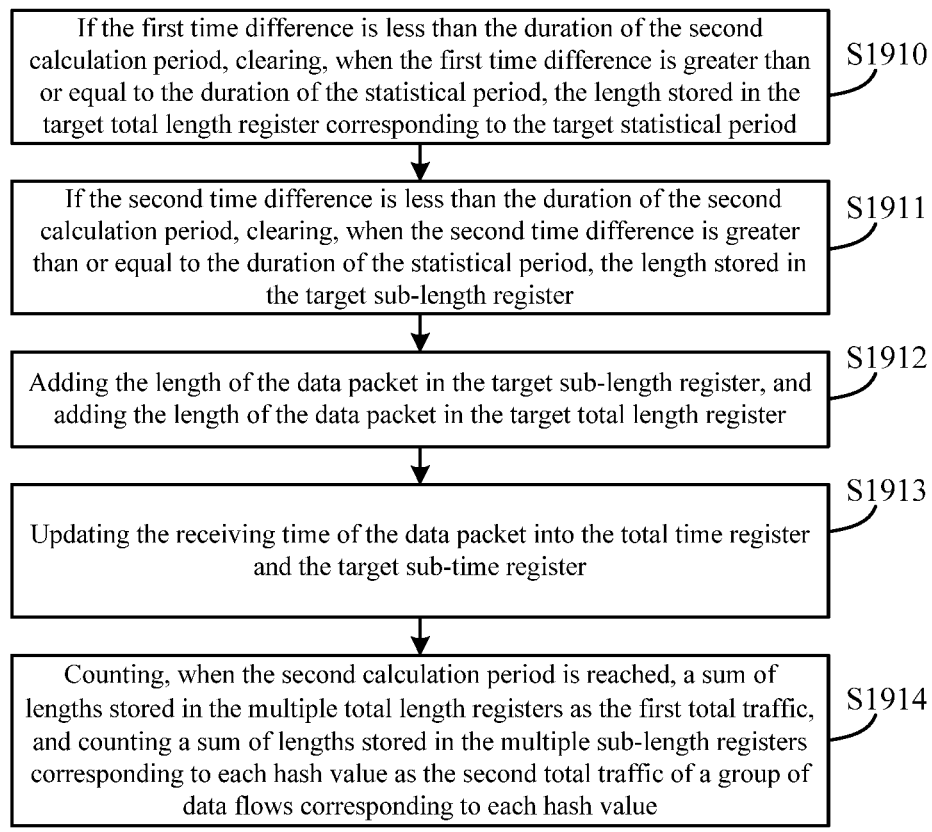
FIG. 21 is a third detailed schematic diagram of block S1711 in FIG. 18.

In another example of the present disclosure, on the basis of FIG. 19 or 20, the example of the present disclosure also provides a traffic statistics method, as shown in FIG. 21. In the method, for each data packet received through the target port, the following blocks can be performed:

Block S1910, if the first time difference is less than the duration of the second calculation period, clearing, when the first time difference is greater than or equal to the duration of the statistical period, the length stored in the target total length register corresponding to the target statistical period.

Block S1911, if the second time difference is less than the duration of the second calculation period, clearing, when the second time difference is greater than or equal to the duration of the statistical period, the length stored in the target sub-length register.

Wherein, if the second time difference is less than the duration of the second calculation period, when the second time difference is less than the duration of the statistical period, block S192 is directly executed.

Block S1912, adding the length of the data packet in the target sub-length register, and adding the length of the data packet in the target total length register.

Block S1913, updating the receiving time of the data packet into the total time register and the target sub-time register.

Block S1914, counting, when the second calculation period is reached, a sum of lengths stored in the multiple total length registers as the first total traffic, and counting a sum of lengths stored in the multiple sub-length registers corresponding to each hash value as the second total traffic of a group of data flows corresponding to each hash value.

Figure 22:
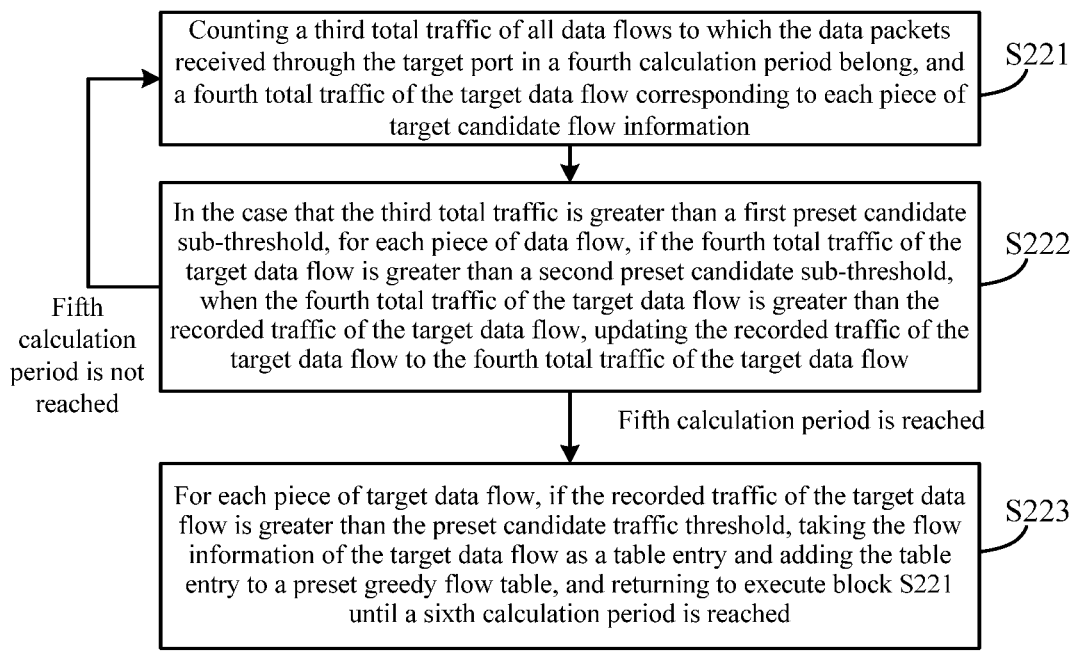
FIG. 22 is a first schematic flow diagram of a flow statistics method of data flows corresponding to target candidate flow information provided by an example of the present disclosure.

In another example of the present disclosure, on the basis of FIG. 17, the example of the present disclosure also provides a traffic statistics method of data flows corresponding to the target candidate flow information, as shown in FIG. 22. The method may include the following blocks:

Block S221, counting a third total traffic of all data flows to which the data packets received through the target port in a fourth calculation period belong, and a fourth total traffic of the target data flow corresponding to each piece of target candidate flow information.

Block S222, in the case that the third total traffic is greater than a first preset candidate sub-threshold, for each piece of data flow, if the fourth total traffic of the target data flow is greater than a second preset candidate sub-threshold, when the fourth total traffic of the target data flow is greater than the recorded traffic of the target data flow, updating the recorded traffic of the target data flow to the fourth total traffic of the target data flow.

If the fifth calculation period has not been reached, returning to execute block S221. If the fifth calculation period is reached, executing block S223.

Block S223, for each piece of target data flow, if the recorded traffic of the target data flow is greater than the preset candidate traffic threshold, taking the flow information of the target data flow as a table entry and adding the table entry to a preset greedy flow table, and returning to execute block S221 until a sixth calculation period is reached.

Figure 23:
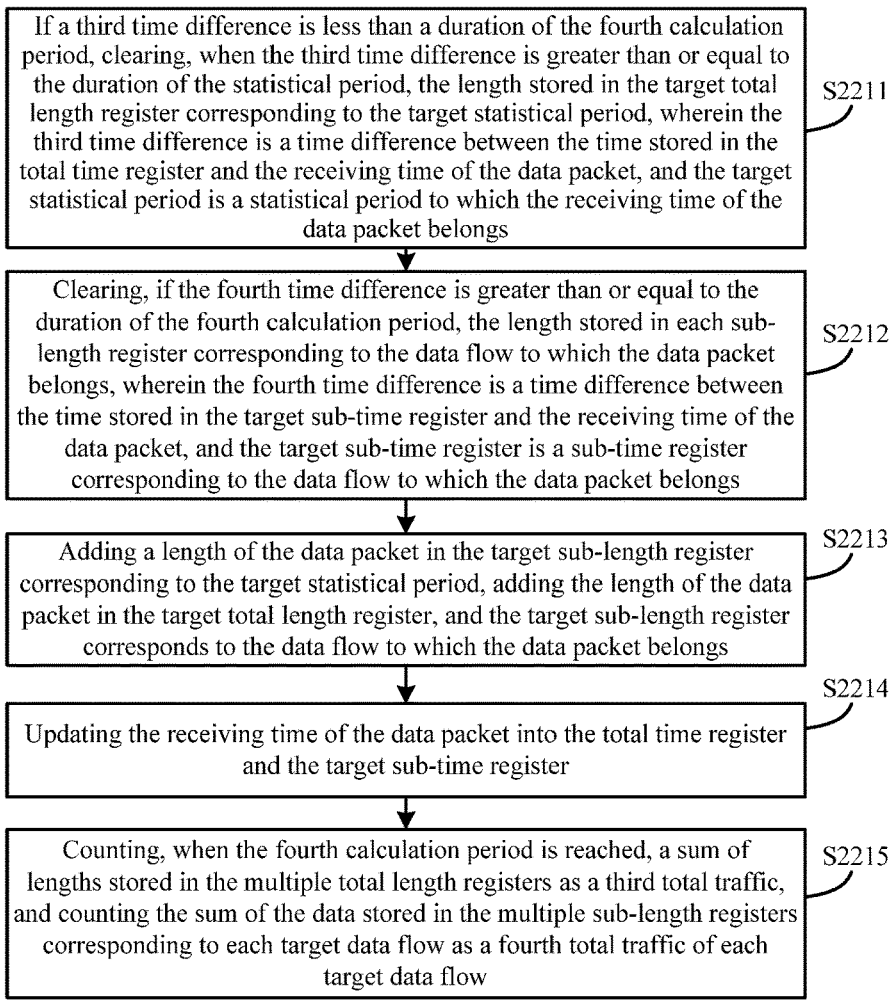
FIG. 23 is a second schematic flow diagram of a flow statistics method of data flows corresponding to target candidate flow information provided by an example of the present disclosure.

In another example of the present disclosure, on the basis of FIG. 22, the example of the present disclosure also provides a traffic statistics method of data flows corresponding to the target candidate flow information, as shown in FIG. 23. In this method, the fourth calculation period is divided into multiple statistical periods, each statistical period corresponds to one sub-length register array, each statistical period corresponds to one total length register, and each sub-length register array includes multiple first sub-length registers and one second sub-length register, a target data flow corresponds to a first sub-time register, and the second sub-length register corresponds to all data flows except the target data flow.

In the above block S221, for each data packet received through the target port, the following blocks can be performed:

block S2211, if a third time difference is less than a duration of the fourth calculation period, clearing, when the third time difference is greater than or equal to the duration of the statistical period, a length stored in a target total length register corresponding to a target statistical period, wherein the third time difference is a time difference between time stored in the total time register and a receiving time of the data packet, and the target statistical period is a statistical period to which the receiving time of the data packet belongs.

Block S2212, clearing, if a fourth time difference is greater than or equal to the duration of the fourth calculation period, a length stored in each sub-length register corresponding to the data flow to which the data packet belongs, wherein the fourth time difference is a time difference between time stored in the target sub-time register and the receiving time of the data packet, and the target sub-time register is a sub-time register corresponding to the data flow to which the data packet belongs.

Block S2213, adding a length of the data packet in the target sub-length register corresponding to the target statistical period, adding the length of the data packet in the target total length register, and the target sub-length register corresponds to the data flow to which the data packet belongs.

Block S2214, updating the receiving time of the data packet into the total time register and the target sub-time register.

Block S2215, counting, when the fourth calculation period is reached, a sum of lengths stored in the multiple total length registers as a third total traffic, and counting the sum of the data stored in the multiple sub-length registers corresponding to each target data flow as a fourth total traffic of each target data flow.

Figure 24:
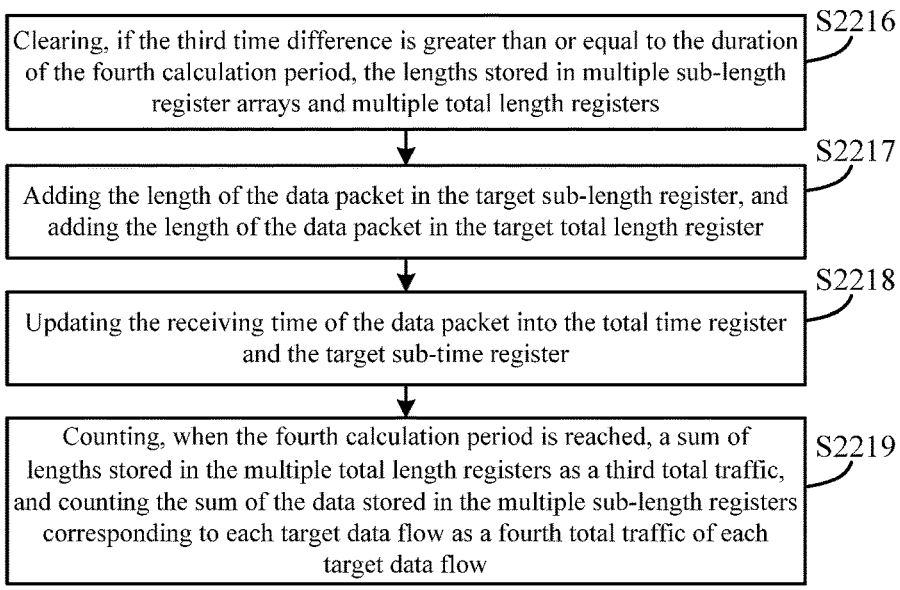
FIG. 24 is a third schematic flow diagram of a flow statistics method of data flows corresponding to target candidate flow information provided by an example of the present disclosure.

In another example of the present disclosure, on the basis of FIG. 23, the example of the present disclosure also provides a traffic statistics method of data flows corresponding to the target candidate flow information, as shown in FIG. 24. In the method, for each data packet received through the target port, the following blocks can be performed:

Block S2216, clearing, if the third time difference is greater than or equal to the duration of the fourth calculation period, the lengths stored in multiple sub-length register arrays and multiple total length registers.

Block S2217, adding the length of the data packet in the target sub-length register, and adding the length of the data packet in the target total length register.

Block S2218, updating the receiving time of the data packet into the total time register and the target sub-time register.

Block S2219, counting, when the fourth calculation period is reached, a sum of lengths stored in the multiple total length registers as a third total traffic, and counting the sum of the data stored in the multiple sub-length registers corresponding to each target data flow as a fourth total traffic of each target data flow.

Figure 25:
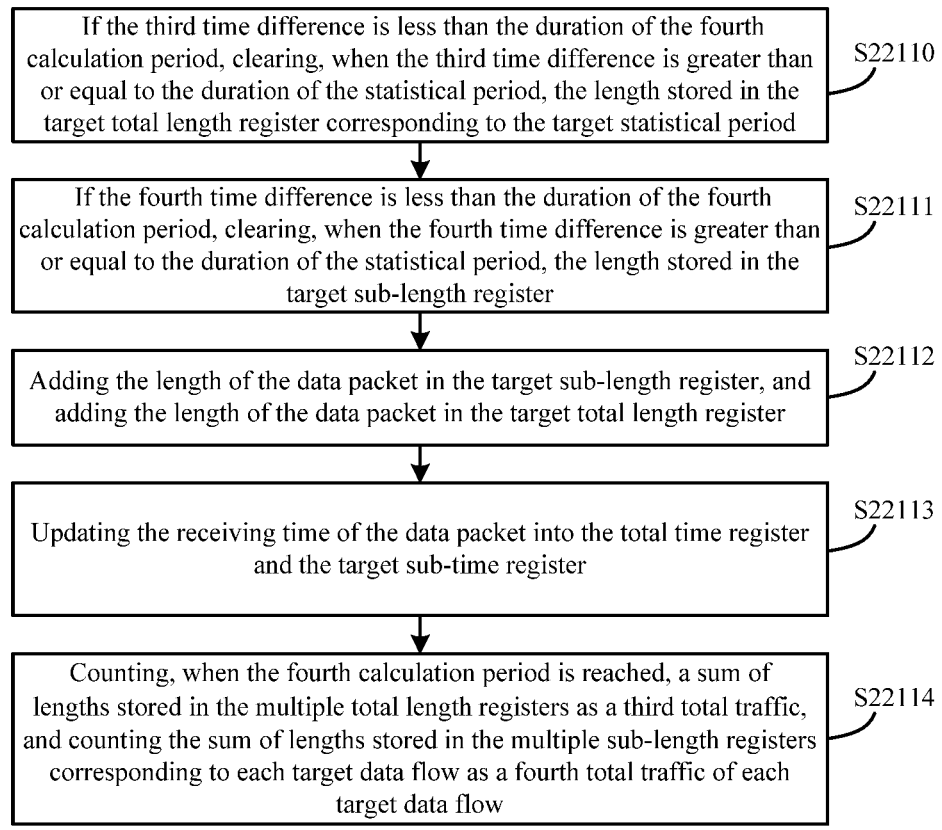
FIG. 25 is a fourth schematic flow diagram of a flow statistics method of data flows corresponding to target candidate flow information provided by an example of the present disclosure.

In another example of the present disclosure, on the basis of FIG. 23 and FIG. 24, the example of the present disclosure also provides a traffic statistics method of data flows corresponding to the target candidate flow information, as shown in FIG. 25. In the method, for each data packet received through the target port, the following blocks can be performed:

Block S22110, if the third time difference is less than the duration of the fourth calculation period, clearing, when the third time difference is greater than or equal to the duration of the statistical period, the length stored in the target total length register corresponding to the target statistical period.

Block S22111, if the fourth time difference is less than the duration of the fourth calculation period, clearing, when the fourth time difference is greater than or equal to the duration of the statistical period, the length stored in the target sub-length register.

Block S22112, adding the length of the data packet in the target sub-length register, and adding the length of the data packet in the target total length register.

Block S22113, updating the receiving time of the data packet into the total time register and the target sub-time register.

Block S22114, counting, when the fourth calculation period is reached, a sum of lengths stored in the multiple total length registers as a third total traffic, and counting the sum of lengths stored in the multiple sub-length registers corresponding to each target data flow as a fourth total traffic of each target data flow.

In the example of the present disclosure, through the above-mentioned manners of FIGS. 19-25, the statistics of the traffic are easily and quickly realized through the registers, thereby improving the efficiency of constructing the subsequent preset greedy flow table.

The description of the above-mentioned FIGS. 19-25 is relatively simple. For details, please refer to the description of the above-mentioned FIG. 10.

Figure 26:
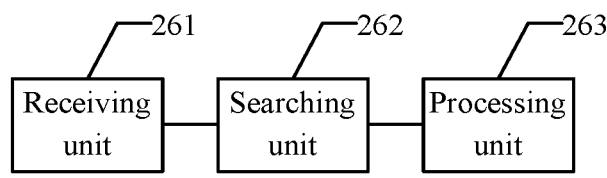
FIG. 26 is a schematic diagram of a data processing apparatus provided by an example of the present disclosure.

Corresponding to the above congestion processing method, an example of the present disclosure also provides a congestion processing apparatus. As shown in FIG. 26, the apparatus includes:
  a receiving unit 261, to receive a first data packet carrying a congestion mark through a target port;
  a searching unit 262, to search, in a preset greedy flow table, a target table entry that includes target flow information carried in the first data packet and an identifier of the target port, and the preset greedy flow table stores flow information of a data flow whose traffic is greater than a preset traffic threshold and an identifier of a port that receives a data flow corresponding to the flow information;
  a processing unit 263, to process, if the target table entry is found, the first data packet; and to remove, if the target table entry is not found, the congestion mark carried in the first data packet to obtain a second data packet, and process the second data packet.

In one optional example, each table entry in the preset greedy flow table is set with an initial active value, and the above-mentioned congestion processing apparatus may further include:
  a setting unit, to subtract, if a target table entry is found, a first preset value from a current active value of the target table entry, to obtain an adjusted active value of the target table entry;
  a deleting unit, to delete, if the adjusted active value of the target table entry is a second preset value, the target table entry from the preset greedy flow table.

In one optional example, the processing unit 263 is specifically to:
  if the first data packet is a CNP, remove, if the target flow information is included in a forwarding table, the identifier of the target port carried in the first data packet; forward the first data packet with the identifier of the target port removed, and reset an aging count of the target table entry to an initial aging number; otherwise, discard the first data packet; or, remove, if target flow information is included in the forwarding table, the identifier of the target port carried in the second data packet; forward the second data packet with the identifier of the target port removed; otherwise, discarding the second data packet.

In one optional example, the processing unit 263 is specifically to:

if the first data packet is an ECN data packet, forward, if target flow information is included in the forwarding table, the CNP corresponding to the first data packet; and reset an aging count of the target table entry to an initial aging number; otherwise, discard the first data packet; or, remove, if target flow information is included in the forwarding table, the identifier of the target port carried in the second data packet; forward the second data packet with the identifier of the target port removed; otherwise, discard the second data packet.

In one optional example, the above-mentioned congestion processing apparatus may further include:

a first statistics unit to count, before receiving a first data packet carrying the congestion mark through the target port, traffic of a data flow to which multiple data packets received through the target port in a first calculation period belong;

a determining unit to determine, from candidate flow information included in a forwarding table, candidate flow information of a preset number of data flows with the largest traffic as target candidate flow information, wherein the candidate flow information is flow information whose hash value is the same as the hash value of the flow information of the candidate flow, the candidate flow is a data flow whose counted traffic is greater than a preset candidate traffic threshold;

an adding unit to take, for each piece of target candidate flow information, if traffic of a target data flow corresponding to the target candidate flow information is greater than a preset traffic threshold, the target candidate flow information and the identifier of the target port as a table entry and add the table entry to the preset greedy flow table.

In one optional example, a first statistical unit is specifically to:

count a first total traffic of all data flows to which the data packets received through the target port in the second calculation period belong, and a second total traffic of each group of data flows, wherein the hash values of the flow information of the group of data flows are the same;

in the case that the first total traffic is greater than a first preset candidate sub-threshold, for each group of data flows, if the second total traffic of the group of data flows is greater than a second preset candidate sub-threshold, when the second total traffic of the group of data flows is greater than the recorded total traffic of the group of data flows, update the recorded total traffic of the group of data flows to the second total traffic of the group of data flows;

if a third calculation period has not been reached, return to the block of counting a first total traffic of all data flows to which the data packets received through the target port in the second calculation period belong, and the second total traffic of each group of data flows;

if the third calculation period is reached, for each group of data flows, if the recorded total traffic of the group of data flows is greater than the preset candidate traffic threshold, then take the flow information of the group of data flows as a table entry and add the table entry to a preset candidate greedy flow table, and return to the block of counting the first total traffic of all data flows to which the data packets received through the target port in the second calculation period belong and the second total traffic of each group of data flows, until the first calculation period is reached.

In one optional example, the second calculation period is divided into multiple statistical periods, each statistical period corresponds to one sub-length register array, each statistical period corresponds to one total length register, each sub-length register array includes sub-length registers corresponding to multiple hash values, and one hash value corresponds to one sub-time register.

In this case, the first statistical unit is specifically to:

for each packet received through the target port, perform the following operations:

if a first time difference is less than a duration of the second calculation period, clearing, when the first time difference is greater than or equal to a duration of the statistical period, a length stored in the target total length register corresponding to a target statistical period, wherein the first time difference is a time difference between time stored in a total time register and a receiving time of the data packet, and the target statistical period is a statistical period to which the receiving time of the data packet belongs;

clearing, if a second time difference is greater than or equal to the duration of the second calculation period, a length stored in each sub-length register corresponding to a target hash value, wherein the second time difference is a time difference between time stored in a target sub-time register and the receiving time of the data packet, and the target sub-time register is a sub-time register corresponding to the target hash value of flow information carried in the data packet;

adding a length of the data packet in a target sub-length register corresponding to the target statistical period, adding the length of the data packet in the target total length register, and the target sub-length register corresponds to the target hash value;

updating the receiving time of the data packet into the total time register and the target sub-time register;

counting, when the second calculation period is reached, a sum of lengths stored in the multiple total length registers as the first total traffic, and counting a sum of the data stored in the multiple sub-length registers corresponding to each hash value as the second total traffic of a group of data flows corresponding to each hash value.

In one optional example, a first statistical unit is also to:

for each packet received through the target port, perform the following operations:

clearing, if the first time difference is greater than or equal to the duration of the second calculation period, lengths stored in multiple sub-length register arrays and multiple total length registers;

adding the length of the data packet in the target sub-length register, and adding the length of the data packet in the target total length register;

updating the receiving time of the data packet into the total time register and the target sub-time register;

counting, when the second calculation period is reached, a sum of lengths stored in the multiple total length registers as a first total traffic, and counting the sum of the data stored in the multiple sub-length registers corresponding to each hash value as a second total traffic of a group of data flows corresponding to each hash value.

In one optional example, a first statistical unit is also to: for each packet received through the target port, perform the following operations:

if the first time difference is less than the duration of the second calculation period, clearing, when the first time difference is greater than or equal to the duration of the statistical period, the length stored in the target total length register corresponding to the target statistical period;

if the second time difference is less than the duration of the second calculation period, clearing, when the second time difference is greater than or equal to the duration of the statistical period, the length stored in the target sub-length register;

adding the length of the data packet in the target sub-length register, and adding the length of the data packet in the target total length register;

updating the receiving time of the data packet into the total time register and the target sub-time register;

counting, when the second calculation period is reached, a sum of lengths stored in the multiple total length registers as the first total traffic, and counting a sum of lengths stored in the multiple sub-length registers corresponding to each hash value as the second total traffic of a group of data flows corresponding to each hash value.

In one optional example, the above-mentioned congestion processing apparatus may further include:

a second statistical unit to count traffic of the target data flow corresponding to each piece of target candidate flow information, specifically through the following operations:

counting a third total traffic of all data flows to which the data packets received through the target port in a fourth calculation period belong, and a fourth total traffic of a target data flow corresponding to each piece of target candidate flow information;

in the case that the third total traffic is greater than a first preset candidate sub-threshold, for each target data flow, if the fourth total traffic of the target data flow is greater than a second preset candidate sub-threshold, when the fourth total traffic of the target data flow is greater than a recorded traffic of the target data flow, updating the recorded traffic of the target data flow to the fourth total traffic of the target data flow;

if a fifth calculation period is not reached, returning to perform counting a third total traffic of all data flows to which the data packets received through the target port in a fourth calculation period belong and the fourth total traffic of the target data flow corresponding to each piece of target candidate flow information;

if the fifth calculation period is reached, for each target data flow, if the recorded traffic of the target data flow is greater than a preset traffic threshold, then taking flow information of the target data flow as a table entry and adding the table entry to the preset greedy flow table, and returning to perform counting the third total traffic of all data flows to which the data packets received through the target port in the fourth calculation period belong and the fourth total traffic of the target data flow corresponding to each piece of target candidate flow information, until a sixth calculation period is reached.

In one optional example, the fourth calculation period is divided into multiple statistical periods, each statistical period corresponds to one total length register, and each sub-length register array includes multiple first sub-length registers and a second sub-length register, a target data flow corresponds to a first sub-time register, and the second sub-length register corresponds to all data flows except the target data flow.

The second statistical unit is specifically to:

for each packet received through the target port, perform the following operations:

if a third time difference is less than a duration of the fourth calculation period, clearing, when the third time difference is greater than or equal to the duration of the statistical period, a length stored in a target total length register corresponding to a target statistical period, wherein the third time difference is a time difference between time stored in the total time register and a receiving time of the data packet, and the target statistical period is a statistical period to which the receiving time of the data packet belongs;

clearing, if a fourth time difference is greater than or equal to the duration of the fourth calculation period, a length stored in each sub-length register corresponding to the data flow to which the data packet belongs, wherein the fourth time difference is a time difference between time stored in the target sub-time register and the receiving time of the data packet, and the target sub-time register is a sub-time register corresponding to the data flow to which the data packet belongs;

adding a length of the data packet in the target sub-length register corresponding to the target statistical period, adding the length of the data packet in the target total length register, and the target sub-length register corresponds to the data flow to which the data packet belongs;

updating the receiving time of the data packet into the total time register and the target sub-time register;

counting, when the fourth calculation period is reached, a sum of lengths stored in the multiple total length registers as a third total traffic, and counting a sum of the data stored in the multiple sub-length registers corresponding to each target data flow as a fourth total traffic of each target data flow.

In the technical solution provided by the examples of the present disclosure, a greedy flow table is preset to identify greedy flows in the network, so as to retain the congestion control of the greedy flows, and remove the congestion control of the non-greedy flows, which reduces the damage of mouse flow, and improves the fairness of the congestion control.

In addition, because the technical solutions provided by the examples of the present disclosure are aimed at the processing after the ECN threshold is triggered, greedy flows that exceed the ECN threshold can be independently identified, and the congestion control of the greedy flows is retained. Therefore, even if the ECN threshold is set larger, the impact on the congestion processing in the example of the present disclosure is not great. Therefore, the technical solution provided by the examples of the present disclosure can use a larger ECN threshold for congestion control, which reduces the damage to the mouse flow, improves the fairness of congestion control, and can effectively improve the utilization of network bandwidth.

Figure 27:
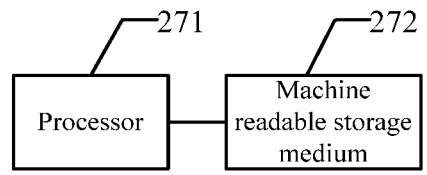
FIG. 27 is a schematic diagram of a network device according to an example of the present disclosure.

Corresponding to the above congestion processing method, an example of the present disclosure further provides a network device, as shown in FIG. 27, including a processor 271 and a machine-readable storage medium 272, where the machine-readable storage medium 272 stores machine-executable instructions that can be executed by the processor 271, and the processor 271 is caused by the machine executable instructions to implement the following operations:

receiving a first data packet carrying a congestion mark through a target port;

searching, in a preset greedy flow table, a target table entry that includes target flow information carried in the first data packet and an identifier of the target port, and the preset greedy flow table stores flow information of a data flow whose traffic is greater than a preset traffic threshold and an identifier of a port that receives a data flow corresponding to the flow information;

processing, if the target table entry is found, the first data packet; removing, if the target table entry is not found, the congestion mark carried in the first data packet to obtain a second data packet, and processing the second data packet.

In an example, each table entry in the preset greedy flow table is set with an initial active value, and the processor is caused by machine executable instructions to further implement the following operations:

subtracting, if a target table entry is found, a first preset value from a current active value of the target table entry, to obtain an adjusted active value of the target table entry;

deleting, if the adjusted active value of the target table entry is less than or equal to the second preset value, the target table entry from the preset greedy flow table.

In an example, the processor is caused by machine executable instructions to further implement the following operations:

when the first data packet is a CNP, removing, if target flow information is included in the forwarding table, the identifier of the target port carried in the first data packet; forwarding the first data packet with the identifier of the target port removed, and resetting an aging count of the target table entry to an initial aging number; otherwise, discarding the first data packet; or, removing, if the target flow information is included in the forwarding table, the identifier of the target port carried in the second data packet; forwarding the second data packet with the identifier of the target port removed; otherwise, discarding the second data packet.

In an example, the processor is caused by machine executable instructions to further implement the following operations:

when the first data packet is an ENC data packet, forwarding, if target flow information is included in the forwarding table, a first data packet corresponding to the first data packet; and resetting the aging count of the target table entry to the initial aging number; otherwise, discarding the first data packet; or, removing, if target flow information is included in the forwarding table, the identifier of the target port carried in a second data packet; forwarding the second data packet with the identifier of the target port removed; otherwise, discarding the second data packet.

In an example, the processor is caused by machine executable instructions to further implement the following operations:

counting, before receiving the first data packet carrying the congestion mark through the target port, the traffic of data flow to which multiple data packets received through the target port in the first calculation period belong;

determining, from candidate flow information included in a forwarding table, candidate flow information of a preset number of data flows with the largest traffic as target candidate flow information, wherein the candidate flow information is flow information whose hash value is the same as the hash value of the flow information of the candidate flow, the candidate flow is a data flow whose counted traffic is greater than a preset candidate traffic threshold;

for each piece of target candidate flow information, if traffic of a target data flow corresponding to the target candidate flow information is greater than a preset traffic threshold, taking the target candidate flow information and the identifier of the target port as a table entry and adding the table entry to the preset greedy flow table.

In an example, the processor is caused by machine executable instructions to further implement the following operations:

counting a first total traffic of all data flows to which the data packets received through the target port in the second calculation period belong, and a second total traffic of each group of data flows, wherein the hash values of the flow information of the group of data flows are the same;

in the case that the first total traffic is greater than a first preset candidate sub-threshold, for each group of data flows, if a second total traffic of the group of data flows is greater than a second preset candidate sub-threshold, when the second total traffic of the group of data flows is greater than the recorded total traffic of the group of data flows, updating the recorded total traffic of the group of data flows to the second total traffic of the group of data flows;

if a third calculation period has not been reached, returning to perform counting a first total traffic of all data flows to which the data packets received through the target port in the second calculation period belong and the second total traffic of each group of data flows;

if the third calculation period is reached, for each group of data flows, if the recorded total traffic of the group of data flows is greater than the preset candidate traffic threshold, then taking the flow information of the group of data flows as a table entry and adding the table entry to a preset candidate greedy flow table, and returning to perform counting the first total traffic of all data flows to which the data packets received through the target port in the second calculation period belong and the second total traffic of each group of data flows, until the first calculation period is reached.

In one optional example, the second calculation period is divided into multiple statistical periods, each statistical period corresponds to one sub-length register array, each statistical period corresponds to one total length register, each sub-length register array includes multiple sub-length registers, and one hash value corresponds to one sub-time register.

The processor is caused by machine executable instructions to further implement the following operations:

for each packet received through the target port, performing the following operations:
if a first time difference is less than a duration of the second calculation period, clearing, when the first time difference is greater than or equal to the duration of the statistical period, the length stored in the target total length register corresponding to the target statistical period, wherein the first time difference is a time difference between the time stored in the total time register and the receiving time of the data packet, and the target statistical period is a statistical period to which the receiving time of the data packet belongs;
clearing, if the second time difference is greater than or equal to the duration of the second calculation period, the length stored in each sub-length register corresponding to the target hash value, wherein the second time difference is a time difference between the time stored in the target sub-time register and the receiving time of the data packet, and the target sub-time register is a sub-time register corresponding to the target hash value of the flow information carried in the data packet;
adding the length of the data packet in the target sub-length register corresponding to a target statistical period, adding the length of the data packet in the target total length register, and the target sub-length register corresponds to the target hash value;
updating the receiving time of the data packet into the total time register and the target sub-time register;
counting, when the second calculation period is reached, a sum of lengths stored in the multiple total length registers as a first total traffic, and counting the sum of the data stored in the multiple sub-length registers corresponding to each hash value as a second total traffic of a group of data flows corresponding to each hash value.

In an example, the processor is caused by machine executable instructions to further implement the following operations:
for each packet received through the target port, performing the following operations: clearing, if the first time difference is greater than or equal to the duration of the second calculation period, the lengths stored in multiple sub-length register arrays and multiple total length registers;
adding the length of the data packet in the target sub-length register, and adding the length of the data packet in the target total length register;
updating the receiving time of the data packet into the total time register and the target sub-time register;
counting, when the second calculation period is reached, a sum of lengths stored in the multiple total length registers as the first total traffic, and counting a sum of the data stored in the multiple sub-length registers corresponding to each hash value as the second total traffic of a group of data flows corresponding to each hash value.

In an example, the processor is caused by machine executable instructions to further implement the following operations:
for each packet received through the target port, performing the following operations: if the first time difference is less than the duration of the second calculation period, clearing, when the first time difference is greater than or equal to the duration of the statistical period, the length stored in the target total length register corresponding to the target statistical period;
if the second time difference is less than the duration of the second calculation period, clearing, when the second time difference is greater than or equal to the duration of the statistical period, the length stored in the target sub-length register;
adding the length of the data packet in the target sub-length register, and adding the length of the data packet in the target total length register;
updating the receiving time of the data packet into the total time register and the target sub-time register;
counting, when the second calculation period is reached, a sum of lengths stored in the multiple total length registers as the first total traffic, and counting a sum of lengths stored in the multiple sub-length registers corresponding to each hash value as the second total traffic of a group of data flows corresponding to each hash value.

In an example, the processor is caused by machine executable instructions to implement the operation: counting the traffic of the target data flow corresponding to each piece of target candidate flow information through the following operations:
counting a third total traffic of all data flows to which the data packets received through the target port in a fourth calculation period belong, and a fourth total traffic of the target data flow corresponding to each piece of target candidate flow information;
in the case that the third total traffic is greater than a first preset candidate sub-threshold, for each target data flow, if the fourth total traffic of the target data flow is greater than a second preset candidate sub-threshold, when the fourth total traffic of the target data flow is greater than a recorded traffic of the target data flow, updating the recorded traffic of the target data flow to the fourth total traffic of the target data flow;
if the fifth calculation period is not reached, returning to perform the block of counting a third total traffic of all data flows to which the data packets received through the target port in a fourth calculation period belong, and a fourth total traffic of the target data flow corresponding to each piece of target candidate flow information;
if the fifth calculation period is reached, for each target data flow, if the recorded traffic of the target data flow is greater than a preset traffic threshold, then taking flow information of the target data flow as a table entry and adding the table entry to the preset greedy flow table, and returning to perform counting the third total traffic of all data flows to which the data packets received through the target port in the fourth calculation period belong and the fourth total traffic of the target data flow corresponding to each piece of target candidate flow information, until a sixth calculation period is reached.

In an example, the fourth calculation period is divided into multiple statistical periods, each statistical period corresponds to one sub-length register array, each statistical period corresponds to one total length register, and each sub-length register array includes multiple first sub-length registers and one second sub-length register, a target data flow corresponds to a first sub-time register, and the second sub-length register corresponds to all data flows except the target data flow.

In this case, the processor is caused by machine executable instructions to implement the operation:
for each packet received through the target port, performing the following operations:

if a third time difference is less than a duration of the fourth calculation period, clearing, when the third time difference is greater than or equal to the duration of the statistical period, a length stored in a target total length register corresponding to a target statistical period, wherein the third time difference is a time difference between time stored in the total time register and a receiving time of the data packet, and the target statistical period is a statistical period to which the receiving time of the data packet belongs;

clearing, if a fourth time difference is greater than or equal to the duration of the fourth calculation period, a length stored in each sub-length register corresponding to the data flow to which the data packet belongs, wherein the fourth time difference is a time difference between time stored in the target sub-time register and the receiving time of the data packet, and the target sub-time register is a sub-time register corresponding to the data flow to which the data packet belongs;

adding a length of the data packet in the target sub-length register corresponding to the target statistical period, adding the length of the data packet in the target total length register, and the target sub-length register corresponds to the data flow to which the data packet belongs;

updating the receiving time of the data packet into the total time register and the target sub-time register;

counting, when the fourth calculation period is reached, a sum of lengths stored in the multiple total length registers as a third total traffic, and counting a sum of the data stored in the multiple sub-length registers corresponding to each target data flow as a fourth total traffic of each target data flow.

In the technical solution provided by the examples of the present disclosure, a greedy flow table is preset to identify greedy flows in the network, so as to retain the congestion control of the greedy flows, and remove the congestion control of the non-greedy flows, which reduces the damage of mouse flow, and improves the fairness of the congestion control.

In addition, because the technical solutions provided by the examples of the present disclosure are aimed at the processing after the ECN threshold is triggered, greedy flows that exceed the ECN threshold can be independently identified, and the congestion control of the greedy flows is retained. Therefore, even if the ECN threshold is set larger, the impact on the congestion processing in the example of the present disclosure is not great. Therefore, the technical solution provided by the examples of the present disclosure can use a larger ECN threshold for congestion control, which can effectively improve the utilization rate of network bandwidth while reducing the damage to the mouse flow and improving the fairness of congestion control.

Corresponding to the above congestion processing method, an example of the present disclosure further provides a machine-readable storage medium, where a computer program is stored in the machine-readable storage medium. When the computer program is executed by the processor, any of the blocks of the congestion processing method described above are implemented.

Corresponding to the above congestion processing method, an example of the present disclosure further provides a computer program, which implements any of the blocks of the above mentioned congestion processing method when the computer program is executed by a processor.

The machine readable storage medium can include a random access memory (RAM), or can include a non-volatile memory (NVM), for example at least one disk memory. In an example, the machine readable storage medium can also be at least one storage device located away from the processor described above.

The processor can be a general-purpose processor, such as a central processing unit (CPU), a network processor (NP), or the like; it can also be a digital signal processor (DSP), an application specific integrated circuit (ASIC), a field-programmable gate array (FPGA) or other programmable logic device, a discrete gate or transistor logic device, a discrete hardware component.

In the aforementioned examples, it may be implemented in whole or in part by software, hardware, firmware, or any combination thereof. When implemented by software, it may be implemented in whole or in part in the form of a computer program product. The computer program product includes one or more computer instructions. The processes or functions described in accordance with the examples of the present invention is produced in whole or in part, when the computer program instructions are loaded and executed on a computer. The computer may be a general-purpose computer, a dedicated computer, a computer network, or other programmable device. The computer instructions may be stored in a computer-readable storage medium or may be transmitted from one computer-readable storage medium to another computer-readable storage medium, for example, the computer instructions may be transmitted from a web site, a computer, a server, or a data center to another web site, another computer, another server, or another data center via a cable (such as a coaxial cable, an optical fiber, a digital subscriber line (DSL)) or wireless (such as infrared, wireless, microwave, etc.). The computer-readable storage medium may be any available medium that may be accessed by a computer or a data storage device such as a server or a data center containing one or more available medium integrations. The available media may be magnetic media (such as floppy disks, hard disks, magnetic tapes), optical media (such as DVDs), or semiconductor media (such as solid state disk (SSD)), etc.

It should be noted that, the relationship terms herein such as "first", "second" and the like are only used to distinguish one entity or operation from another entity or operation, but do not necessarily require or imply that there is actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a." or "include(s) a." do not exclude that there are other identical elements in the processes, methods, articles, or devices which include these elements.

All the examples are described in corresponding ways, same or similar parts in each of the examples can be referred to one another, and the parts emphasized are differences to other examples. For examples of the apparatus, network device, machine readable storage medium and computer program, since they are similar to the examples of the method, the description thereof is relatively simple; the relating parts could refer to the parts of the description of examples of the method.

The examples described above are merely preferred examples of the present disclosure, and not intended to limit the scope of the present disclosure. Any modifications, equivalents, improvements or the like within the spirit and principle of the disclosure should be included in the scope of the disclosure.

What is claimed is:

1. A congestion processing method, comprising:
 receiving a first data packet carrying a congestion mark through a target port;
 searching, in a preset greedy flow table, a target table entry that includes target flow information carried in the first data packet and an identifier of the target port, and the preset greedy flow table stores flow information of a data flow whose traffic is greater than a preset traffic threshold and an identifier of a port that receives a data flow corresponding to the flow information;
 processing, if the target table entry is found, the first data packet;
 removing, if the target table entry is not found, the congestion mark carried in the first data packet to obtain a second data packet, and processing the second data packet,
 wherein each table entry in the preset greedy flow table is set with an initial active value, if the target table entry is found, the method further comprises:
 subtracting a first preset value from a current active value of the target table entry, to obtain an adjusted active value of the target table entry;
 deleting, if the adjusted active value of the target table entry is less than or equal to a second preset value, the target table entry from the preset greedy flow table.

2. The method of claim 1, wherein if the first data packet is a congestion notification packet CNP, processing the first data packet comprises:
 removing, if the target flow information is included in a forwarding table, the identifier of the target port carried in the first data packet; forwarding the first data packet with the identifier of the target port removed, and resetting an aging count of the target table entry to an initial aging number; otherwise, discarding the first data packet;
 processing the second data packet comprises:
 removing, if the target flow information is included in the forwarding table, the identifier of the target port carried in the second data packet; forwarding the second data packet with the identifier of the target port removed; otherwise, discarding the second data packet;
 or,
 wherein if the first data packet is an explicit congestion notification ECN data packet, processing the first data packet comprises:
 forwarding, if the target flow information is included in a forwarding table, a congestion notification packet CNP corresponding to the first data packet; and resetting an aging count of the target table entry to an initial aging number; otherwise, discarding the first data packet;
 processing the second data packet comprises:
 removing, if the target flow information is included in the forwarding table, the identifier of the target port carried in the second data packet; forwarding the second data packet with the identifier of the target port removed; otherwise, discarding the second data packet.

3. The method of claim 1, wherein before receiving a first data packet carrying a congestion mark through a target port, the method further comprises:
 counting traffic of a data flow to which multiple data packets received through the target port in a first calculation period belong;
 determining, from candidate flow information included in a forwarding table, candidate flow information of a preset number of data flows with the largest traffic as target candidate flow information, wherein the candidate flow information is flow information whose hash value is the same as the hash value of the flow information of the candidate flow, the candidate flow is a data flow whose counted traffic is greater than a preset candidate traffic threshold;
 for each piece of target candidate flow information, if traffic of a target data flow corresponding to the target candidate flow information is greater than a preset traffic threshold, taking the target candidate flow information and the identifier of the target port as a table entry and adding the table entry to the preset greedy flow table.

4. The method of claim 3, wherein counting the traffic of the data flows to which multiple data packets received through the target port in the first calculation period belong comprises:
 counting a first total traffic of all data flows to which the data packets received through the target port in a second calculation period belong, and a second total traffic of each group of data flows, wherein the hash values of the flow information of each group of data flows are the same;
 in the case that the first total traffic is greater than a first preset candidate sub-threshold, for each group of data flows, if a second total traffic of the group of data flows is greater than a second preset candidate sub-threshold, when the second total traffic of the group of data flows is greater than a recorded total traffic of the group of data flows, updating the recorded total traffic of the group of data flows to the second total traffic of the group of data flows;
 if a third calculation period has not been reached, returning to perform counting a first total traffic of all data flows to which the data packets received through the target port in the second calculation period belong and the second total traffic of each group of data flows;
 if the third calculation period is reached, for each group of data flows, if the recorded total traffic of the group of data flows is greater than the preset candidate traffic threshold, then taking the flow information of the group of data flows as a table entry and adding the table entry to a preset candidate greedy flow table, and returning to perform counting the first total traffic of all data flows to which the data packets received through the target port in the second calculation period belong and the second total traffic of each group of data flows, until the first calculation period is reached.

5. The method of claim 4, wherein the second calculation period is divided into multiple statistical periods, each statistical period corresponds to one sub-length register array, each statistical period corresponds to one total length register, each sub-length register array includes multiple sub-length registers, and one hash value corresponds to one sub-time register;
 counting the first total traffic of all data flows to which the data packets received through the target port in the second calculation period belong and the second total traffic of each group of data flows comprises:
 for each packet received through the target port, performing the following operations:
 if a first time difference is less than a duration of the second calculation period, clearing, when the first time difference is greater than or equal to a duration of the statistical period, a length stored in a target total length register corresponding to a target statistical period, wherein the first time difference is a time difference between time stored in a total time register and receiving time of the data packet, and the target statistical period is a statistical period to which the receiving time of the data packet belongs;

clearing, if a second time difference is greater than or equal to the duration of the second calculation period, a length stored in each sub-length register corresponding to a target hash value, wherein the second time difference is a time difference between time stored in a target sub-time register and the receiving time of the data packet, and the target sub-time register is a sub-time register corresponding to the target hash value of flow information carried in the data packet;

adding a length of the data packet in a target sub-length register corresponding to the target statistical period, adding the length of the data packet in the target total length register, and the target sub-length register corresponds to the target hash value;

updating the receiving time of the data packet into the total time register and the target sub-time register;

counting, when the second calculation period is reached, a sum of lengths stored in multiple total length registers as the first total traffic, and counting a sum of the data stored in multiple sub-length registers corresponding to each hash value as the second total traffic of a group of data flows corresponding to each hash value.

6. The method of claim 5, further comprising:
for each packet received through the target port, performing the following operations:
clearing, if the first time difference is greater than or equal to the duration of the second calculation period, lengths stored in multiple sub-length register arrays and multiple total length registers;
adding the length of the data packet in the target sub-length register, and adding the length of the data packet in the target total length register;
updating the receiving time of the data packet into the total time register and the target sub-time register;
counting, when the second calculation period is reached, a sum of lengths stored in the multiple total length registers as the first total traffic, and counting a sum of the data stored in the multiple sub-length registers corresponding to each hash value as the second total traffic of a group of data flows corresponding to each hash value;
or,
the method further comprising:
for each packet received through the target port, performing the following operations:
if the first time difference is less than the duration of the second calculation period, clearing, when the first time difference is greater than or equal to the duration of the statistical period, the length stored in the target total length register corresponding to the target statistical period;
if the second time difference is less than the duration of the second calculation period, clearing, when the second time difference is greater than or equal to the duration of the statistical period, the length stored in the target sub-length register;
adding the length of the data packet in the target sub-length register, and adding the length of the data packet in the target total length register;

updating the receiving time of the data packet into the total time register and the target sub-time register;
counting, when the second calculation period is reached, a sum of lengths stored in the multiple total length registers as the first total traffic, and counting a sum of lengths stored in the multiple sub-length registers corresponding to each hash value as the second total traffic of a group of data flows corresponding to each hash value.

7. The method of claim 3, wherein counting traffic of the target data flow corresponding to each piece of target candidate flow information through the following operations:
counting a third total traffic of all data flows to which the data packets received through the target port in a fourth calculation period belong, and a fourth total traffic of a target data flow corresponding to each piece of target candidate flow information;
in the case that the third total traffic is greater than a first preset candidate sub-threshold, for each target data flow, if the fourth total traffic of the target data flow is greater than a second preset candidate sub-threshold, when the fourth total traffic of the target data flow is greater than a recorded traffic of the target data flow, updating the recorded traffic of the target data flow to the fourth total traffic of the target data flow;
if a fifth calculation period is not reached, returning to perform counting a third total traffic of all data flows to which the data packets received through the target port in a fourth calculation period belong and the fourth total traffic of the target data flow corresponding to each piece of target candidate flow information;
if the fifth calculation period is reached, for each target data flow, if the recorded traffic of the target data flow is greater than a preset traffic threshold, then taking flow information of the target data flow as a table entry and adding the table entry to the preset greedy flow table, and returning to perform counting the third total traffic of all data flows to which the data packets received through the target port in the fourth calculation period belong and the fourth total traffic of the target data flow corresponding to each piece of target candidate flow information, until a sixth calculation period is reached.

8. The method of claim 7, wherein the fourth calculation period is divided into multiple statistical periods, each statistical period corresponds to one sub-length register array, each statistical period corresponds to one total length register, and each sub-length register array includes multiple first sub-length registers and one second sub-length register, a target data flow corresponds to a first sub-time register, and the second sub-length register corresponds to all data flows except the target data flow;
counting a third total traffic of all data flows to which the data packets received through the target port in a fourth calculation period belong, and a fourth total traffic of the target data flow corresponding to each piece of target candidate flow information, comprises:
for each packet received through the target port, performing the following operations:
if a third time difference is less than a duration of the fourth calculation period, clearing, when the third time difference is greater than or equal to the duration of the statistical period, a length stored in a target total length register corresponding to a target statistical period, wherein the third time difference is a time difference between time stored in the total time register and a receiving time of the data packet, and the target statistical period is a statistical period to which the receiving time of the data packet belongs;

clearing, if a fourth time difference is greater than or equal to the duration of the fourth calculation period, a length stored in each sub-length register corresponding to the data flow to which the data packet belongs, wherein the fourth time difference is a time difference between time stored in the target sub-time register and the receiving time of the data packet, and the target sub-time register is a sub-time register corresponding to the data flow to which the data packet belongs;

adding a length of the data packet in the target sub-length register corresponding to the target statistical period, adding the length of the data packet in the target total length register, and the target sub-length register corresponds to the data flow to which the data packet belongs;

updating the receiving time of the data packet into the total time register and the target sub-time register;

counting, when the fourth calculation period is reached, a sum of lengths stored in the multiple total length registers as a third total traffic, and counting a sum of the data stored in the multiple sub-length registers corresponding to each target data flow as a fourth total traffic of each target data flow.

9. A non-transitory machine readable storage medium, wherein a computer program is stored in the machine readable storage medium, and when the computer program is executed by a processor, the method of claim 1 is implemented.

10. A network device, comprising a processor and a machine-readable storage medium, where the machine-readable storage medium stores machine-executable instructions that can be executed by the processor, and the processor is caused by the machine executable instructions to implement the following operations:

receiving a first data packet carrying a congestion mark through a target port;

searching, in a preset greedy flow table, a target table entry that includes target flow information carried in the first data packet and an identifier of the target port, and the preset greedy flow table stores flow information of a data flow whose traffic is greater than a preset traffic threshold and an identifier of a port that receives a data flow corresponding to the flow information;

processing, if the target table entry is found, the first data packet; removing, if the target table entry is not found, the congestion mark carried in the first data packet to obtain a second data packet, and processing the second data packet, wherein each table entry in the preset greedy flow table is set with an initial active value, the processor is caused by the machine executable instructions to further implement the following operations:

subtracting, if the target table entry is found, a first preset value from a current active value of the target table entry, to obtain an adjusted active value of the target table entry;

deleting, if the adjusted active value of the target table entry is less than or equal to a second preset value, the target table entry from the preset greedy flow table.

11. The network device of claim 10, wherein the processor is caused by the machine executable instructions to further implement the following operations:

when the first data packet is a congestion notification packet CNP, removing, if the target flow information is included in a forwarding table, the identifier of the target port carried in the first data packet; forwarding the first data packet with the identifier of the target port removed, and resetting an aging count of the target table entry to an initial aging number; otherwise, discarding the first data packet; or, removing, if the target flow information is included in the forwarding table, the identifier of the target port carried in the second data packet; forwarding the second data packet with the identifier of the target port removed; otherwise, discarding the second data packet;

or, the processor is caused by the machine executable instructions to further implement the following operations:

when the first data packet is an explicit congestion notification ECN data packet, forwarding, if the target flow information is included in a forwarding table, a congestion notification packet CNP corresponding to the first data packet; and resetting an aging count of the target table entry to an initial aging number; otherwise, discarding the first data packet; or, removing, if the target flow information is included in the forwarding table, the identifier of the target port carried in the second data packet; forwarding the second data packet with the identifier of the target port removed; otherwise, discarding the second data packet.

12. The network device of claim 10, wherein the processor is caused by the machine executable instructions to further implement the following operations:

counting, before receiving the first data packet carrying a congestion mark through a target port, traffic of a data flow to which multiple data packets received through the target port in a first calculation period belong;

determining, from candidate flow information included in a forwarding table, candidate flow information of a preset number of data flows with the largest traffic as target candidate flow information, wherein the candidate flow information is flow information whose hash value is the same as the hash value of the flow information of the candidate flow, the candidate flow is a data flow whose counted traffic is greater than a preset candidate traffic threshold;

for each piece of target candidate flow information, if traffic of a target data flow corresponding to the target candidate flow information is greater than a preset traffic threshold, taking the target candidate flow information and the identifier of the target port as a table entry and adding the table entry to the preset greedy flow table.

13. The network device of claim 12, wherein the processor is caused by the machine executable instructions to further implement the following operations:

counting a first total traffic of all data flows to which the data packets received through the target port in a second calculation period belong, and a second total traffic of each group of data flows, wherein the hash values of the flow information of each group of data flows are the same;

in the case that the first total traffic is greater than a first preset candidate sub-threshold, for each group of data flows, if a second total traffic of the group of data flows is greater than a second preset candidate sub-threshold, when the second total traffic of the group of data flows is greater than a recorded total traffic of the group of data flows, updating the recorded total traffic of the group of data flows to the second total traffic of the group of data flows;

if a third calculation period has not been reached, returning to perform counting a first total traffic of all data flows to which the data packets received through the target port in the second calculation period belong and the second total traffic of each group of data flows;

if the third calculation period is reached, for each group of data flows, if the recorded total traffic of the group of data flows is greater than the preset candidate traffic threshold, then taking the flow information of the group of data flows as a table entry and adding the table entry to a preset candidate greedy flow table, and returning to perform counting the first total traffic of all data flows to which the data packets received through the target port in the second calculation period belong and the second total traffic of each group of data flows, until the first calculation period is reached.

14. The network device of claim 13, wherein the second calculation period is divided into multiple statistical periods, each statistical period corresponds to one sub-length register array, each statistical period corresponds to one total length register, each sub-length register array includes multiple sub-length registers, and one hash value corresponds to one sub-time register;

wherein the processor is caused by the machine executable instructions to further implement the following operations:

for each packet received through the target port, performing the following operations:

if a first time difference is less than a duration of the second calculation period, clearing, when the first time difference is greater than or equal to a duration of the statistical period, a length stored in a target total length register corresponding to a target statistical period, wherein the first time difference is a time difference between time stored in a total time register and receiving time of the data packet, and the target statistical period is a statistical period to which the receiving time of the data packet belongs;

clearing, if a second time difference is greater than or equal to the duration of the second calculation period, a length stored in each sub-length register corresponding to a target hash value, wherein the second time difference is a time difference between time stored in a target sub-time register and the receiving time of the data packet, and the target sub-time register is a sub-time register corresponding to the target hash value of flow information carried in the data packet;

adding a length of the data packet in a target sub-length register corresponding to the target statistical period, adding the length of the data packet in the target total length register, and the target sub-length register corresponds to the target hash value;

updating the receiving time of the data packet into the total time register and the target sub-time register;

counting, when the second calculation period is reached, a sum of lengths stored in multiple total length registers as the first total traffic, and counting a sum of the data stored in multiple sub-length registers corresponding to each hash value as the second total traffic of a group of data flows corresponding to each hash value.

15. The network device of claim 14, wherein the processor is caused by the machine executable instructions to further implement the following operations:

for each packet received through the target port, performing the following operations:

clearing, if the first time difference is greater than or equal to the duration of the second calculation period, lengths stored in multiple sub-length register arrays and multiple total length registers;

adding the length of the data packet in the target sub-length register, and adding the length of the data packet in the target total length register;

updating the receiving time of the data packet into the total time register and the target sub-time register;

counting, when the second calculation period is reached, a sum of lengths stored in the multiple total length registers as the first total traffic, and counting a sum of the data stored in the multiple sub-length registers corresponding to each hash value as the second total traffic of a group of data flows corresponding to each hash value;

or, wherein the processor is caused by the machine executable instructions to further implement the following operations:

for each packet received through the target port, performing the following operations:

if the first time difference is less than the duration of the second calculation period, clearing, when the first time difference is greater than or equal to the duration of the statistical period, the length stored in the target total length register corresponding to the target statistical period;

if the second time difference is less than the duration of the second calculation period, clearing, when the second time difference is greater than or equal to the duration of the statistical period, the length stored in the target sub-length register;

adding the length of the data packet in the target sub-length register, and adding the length of the data packet in the target total length register;

updating the receiving time of the data packet into the total time register and the target sub-time register;

counting, when the second calculation period is reached, a sum of lengths stored in the multiple total length registers as the first total traffic, and counting a sum of lengths stored in the multiple sub-length registers corresponding to each hash value as the second total traffic of a group of data flows corresponding to each hash value.

16. The network device of claim 12, wherein the processor is caused by the machine executable instructions to implement the operation:

counting the traffic of the target data flow corresponding to each piece of target candidate flow information through the following operations:

counting a third total traffic of all data flows to which the data packets received through the target port in a fourth calculation period belong, and a fourth total traffic of a target data flow corresponding to each piece of target candidate flow information;

in the case that the third total traffic is greater than a first preset candidate sub-threshold, for each target data flow, if the fourth total traffic of the target data flow is greater than a second preset candidate sub-threshold, when the fourth total traffic of the target data flow is greater than a recorded traffic of the target data flow, updating the recorded traffic of the target data flow to the fourth total traffic of the target data flow;

if a fifth calculation period is not reached, returning to perform counting a third total traffic of all data flows to which the data packets received through the target port in a fourth calculation period belong and the fourth total traffic of the target data flow corresponding to each piece of target candidate flow information;

if the fifth calculation period is reached, for each target data flow, if the recorded traffic of the target data flow is greater than a preset traffic threshold, then taking flow information of the target data flow as a table entry and adding the table entry to the preset greedy flow table, and returning to perform counting the third total traffic of all data flows to which the data packets received through the target port in the fourth calculation period belong and the fourth total traffic of the target data flow corresponding to each piece of target candidate flow information, until a sixth calculation period is reached.

17. The network device of claim 16, wherein the fourth calculation period is divided into multiple statistical periods, each statistical period corresponds to one sub-length register array, each statistical period corresponds to one total length register, and each sub-length register array includes multiple first sub-length registers and one second sub-length register, a target data flow corresponds to a first sub-time register, and the second sub-length register corresponds to all data flows except the target data flow;

the processor is caused by the machine executable instructions to implement the operations:

for each packet received through the target port, performing the following operations:

if a third time difference is less than a duration of the fourth calculation period, clearing, when the third time difference is greater than or equal to the duration of the statistical period, a length stored in a target total length register corresponding to a target statistical period, wherein the third time difference is a time difference between time stored in the total time register and a receiving time of the data packet, and the target statistical period is a statistical period to which the receiving time of the data packet belongs;

clearing, if a fourth time difference is greater than or equal to the duration of the fourth calculation period, a length stored in each sub-length register corresponding to the data flow to which the data packet belongs, wherein the fourth time difference is a time difference between time stored in the target sub-time register and the receiving time of the data packet, and the target sub-time register is a sub-time register corresponding to the data flow to which the data packet belongs;

adding a length of the data packet in the target sub-length register corresponding to the target statistical period, adding the length of the data packet in the target total length register, and the target sub-length register corresponds to the data flow to which the data packet belongs;

updating the receiving time of the data packet into the total time register and the target sub-time register;

counting, when the fourth calculation period is reached, a sum of lengths stored in the multiple total length registers as a third total traffic, and counting a sum of the data stored in the multiple sub-length registers corresponding to each target data flow as a fourth total traffic of each target data flow.

* * * * *

UNITED STATES PATENT AND TRADEMARK OFFICE
CERTIFICATE OF CORRECTION

| | |
|---|---|
| PATENT NO. | : 12,199,870 B2 |
| APPLICATION NO. | : 18/003942 |
| DATED | : January 14, 2025 |
| INVENTOR(S) | : Guo |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 92 days.

Signed and Sealed this
Sixth Day of May, 2025

Coke Morgan Stewart
*Acting Director of the United States Patent and Trademark Office*